(12) United States Patent
Arikan et al.

(10) Patent No.: US 9,355,476 B2
(45) Date of Patent: May 31, 2016

(54) SMOOTHING ROAD GEOMETRY

(71) Applicant: Apple Inc., Cupertino, CA (US)

(72) Inventors: Okan Arikan, Mountain View, CA (US);
Vincent Dumont, San Francisco, CA (US); Billy P. Chen, Santa Clara, CA (US); Christopher Blumenberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 665 days.

(21) Appl. No.: 13/632,001

(22) Filed: Sep. 30, 2012

(65) Prior Publication Data

US 2013/0328916 A1 Dec. 12, 2013

Related U.S. Application Data

(60) Provisional application No. 61/656,032, filed on Jun. 6, 2012, provisional application No. 61/656,043, filed on Jun. 6, 2012, provisional application No. 61/657,880, filed on Jun. 10, 2012, provisional application No. 61/699,855, filed on Sep. 11, 2012, provisional application No. 61/699,862, filed on Sep. 11, 2012.

(51) Int. Cl.
| | |
|---|---|
| G09G 5/00 | (2006.01) |
| G06T 11/20 | (2006.01) |
| G06T 17/05 | (2011.01) |
| G06T 7/00 | (2006.01) |
| G06T 11/60 | (2006.01) |
| G01C 21/32 | (2006.01) |
| G06T 11/00 | (2006.01) |

(52) U.S. Cl.
CPC ............... *G06T 11/20* (2013.01); *G01C 21/32* (2013.01); *G06T 7/0004* (2013.01); *G06T 11/00* (2013.01); *G06T 11/60* (2013.01); *G06T 17/05* (2013.01); *G09G 5/00* (2013.01)

(58) Field of Classification Search
None
See application file for complete search history.

(56) References Cited

U.S. PATENT DOCUMENTS

| | | | |
|---|---|---|---|
| 5,787,233 A | 7/1998 | Akimoto | |
| 5,848,375 A | 12/1998 | Nunobiki et al. | |

(Continued)

FOREIGN PATENT DOCUMENTS

| | | |
|---|---|---|
| EP | 0822529 | 11/2003 |
| EP | 1788541 | 5/2007 |

(Continued)

OTHER PUBLICATIONS

Jiuxiang Hu et al.; "Road Network Extraction and Intersection Detection from Aerial Images by Tracking Road Footprints"; Dec. 2007; IEEE Transactions on Geoscience and Remote Sensing, pp. 4144-4157.*

(Continued)

*Primary Examiner* — Peter Hoang
(74) *Attorney, Agent, or Firm* — Adeli LLP

(57) ABSTRACT

Some embodiments provide a method for a mapping service. For a set of road segments that intersect at a junction in a map region, the method generates an initial set of geometries for use in generating downloadable map information for the map region. For each corner formed by the geometries at the junction, the method determines whether to perform a smoothing operation. When a particular corner meets a set of criteria, the method modifies the geometries of at least one road segment to smooth the corner.

27 Claims, 53 Drawing Sheets

(56) References Cited

U.S. PATENT DOCUMENTS

| | | |
|---|---|---|
| 5,878,368 A | 3/1999 | DeGraaf |
| 6,163,269 A | 12/2000 | Millington et al. |
| 6,178,380 B1 | 1/2001 | Millington |
| 6,202,026 B1 | 3/2001 | Nimura et al. |
| 6,295,503 B1 | 9/2001 | Inoue et al. |
| 6,480,783 B1 | 11/2002 | Myr |
| 6,487,305 B2 | 11/2002 | Kambe et al. |
| 6,496,189 B1 | 12/2002 | Yaron et al. |
| 6,539,300 B2 | 3/2003 | Myr |
| 6,577,946 B2 | 6/2003 | Myr |
| 6,587,784 B1 | 7/2003 | Okude et al. |
| 6,597,354 B2 | 7/2003 | Sakamoto et al. |
| 6,615,130 B2 | 9/2003 | Myr |
| 7,054,742 B2 | 5/2006 | Khavakh et al. |
| 7,158,876 B2 | 1/2007 | Crook |
| 7,437,279 B2 | 10/2008 | Agrawala et al. |
| 7,440,875 B2 | 10/2008 | Cuthbert et al. |
| 7,480,565 B2 | 1/2009 | Ikeuchi et al. |
| 7,551,172 B2 | 6/2009 | Yaron et al. |
| 7,746,343 B1 | 6/2010 | Charaniya et al. |
| 7,761,227 B2 | 7/2010 | Kropp |
| 8,237,713 B2 | 8/2012 | Yaron et al. |
| 8,249,259 B2 | 8/2012 | Marumoto et al. |
| 8,301,378 B2 | 10/2012 | Nishibashi et al. |
| 8,306,730 B2 | 11/2012 | Nishibashi et al. |
| 8,600,654 B2 | 12/2013 | Kishikawa et al. |
| 8,681,176 B1 | 3/2014 | Maurer et al. |
| 8,705,892 B2 | 4/2014 | Aguilera et al. |
| 8,738,284 B1 | 5/2014 | Jones |
| 8,880,345 B2 | 11/2014 | Kazama et al. |
| 2001/0028350 A1 | 10/2001 | Matsuoka et al. |
| 2003/0231190 A1 | 12/2003 | Jawerth et al. |
| 2004/0212627 A1 | 10/2004 | Sumizawa et al. |
| 2004/0236507 A1 | 11/2004 | Maruyama et al. |
| 2005/0107993 A1 | 5/2005 | Cuthbert et al. |
| 2006/0025923 A1 | 2/2006 | Dotan et al. |
| 2006/0217879 A1 | 9/2006 | Ikeuchi et al. |
| 2007/0276597 A1 | 11/2007 | Kato et al. |
| 2008/0016145 A1 | 1/2008 | Takase et al. |
| 2008/0059889 A1 | 3/2008 | Parker et al. |
| 2008/0238941 A1 | 10/2008 | Kinnan et al. |
| 2009/0187335 A1 | 7/2009 | Muhlfelder et al. |
| 2009/0262117 A1 | 10/2009 | Soulchin et al. |
| 2010/0002007 A1 | 1/2010 | Rajagopalan |
| 2010/0250536 A1 | 9/2010 | Broadbent |
| 2010/0266161 A1 | 10/2010 | Kmiecik et al. |
| 2011/0207446 A1 | 8/2011 | Iwuchukwu |
| 2011/0264708 A1 | 10/2011 | Smartt |
| 2011/0285717 A1 | 11/2011 | Schmidt et al. |
| 2012/0050489 A1* | 3/2012 | Gupta et al. .............. 348/46 |
| 2012/0206469 A1 | 8/2012 | Hulubei et al. |
| 2012/0209518 A1 | 8/2012 | Nowak et al. |
| 2012/0259539 A1 | 10/2012 | Sumizawa |
| 2013/0021382 A1 | 1/2013 | Morlock et al. |
| 2013/0035853 A1 | 2/2013 | Stout et al. |
| 2013/0076784 A1 | 3/2013 | Maurer et al. |
| 2013/0328937 A1 | 12/2013 | Pirwani et al. |

FOREIGN PATENT DOCUMENTS

| | | |
|---|---|---|
| EP | 2080985 | 7/2009 |
| WO | WO 2005/103624 | 11/2005 |
| WO | WO 2011/146141 | 11/2011 |
| WO | WO 2012/034581 | 3/2012 |

OTHER PUBLICATIONS

Charalambos Poullis et al.; "Delineation and geometric modeling of road networks"; Nov. 2009; ISPRS Journal of Photogrammetry and Remote Sensing; p. 165-181.*

Chen, Ching-Chien, et al., "Automatically Conflating Road Vector Data with Orthoimagery," GeoInformatica, Mar. 2006, pp. 495-530, Springer Science + Business Media, LLC.

Dal Poz, A.P., et al, "Automated Extraction of Road Network from Medium- and High-Resolution Images," Pattern Recognition and Image Analysis, Apr.-Jun. 2006, pp. 239-248, vol. 16, No. 2, Pleiades Publishing, Inc.

Author Unknown, "(SC4) Sim City for Highways & Autobahns," Aug. 12, 2011, pp. 1-35, available at http://www.skyscrapercity.com/showthread.php?t=639496&page=14.

Author Unknown, "Resolve Road Conflicts (Cartography)," ARCGIS help 10.1, Nov. 11, 2011, 4 pages, Esri, available at http://help.arcgis.com/en/arcgisdesktop/10.0/help/index.html#//007000000019000000.htm.

* cited by examiner

2800

2600

SMOOTHING ROAD GEOMETRY

CLAIM OF BENEFIT TO PRIOR APPLICATIONS

This application claims the benefit of U.S. Provisional Application 61/656,032, entitled "Camera Animation During Navigation", filed Jun. 6, 2012; U.S. Provisional Application 61/656,043, entitled "Camera Animation During Navigation", filed Jun. 6, 2012; U.S. Provisional Application 61/657,880, entitled "Generating and Presenting Immersive and Non-Immersive 3D Map Presentations for Browsing and Navigation", filed Jun. 10, 2012; U.S. Provisional Application 61/699,855, entitled "Rendering Maps", filed Sep. 11, 2012; and U.S. Provisional Application 61/699,862, entitled "Generating Map Data for Rendering", filed Sep. 11, 2012. U.S. Applications 61/656,032, 61/656,043, 61/657,880, 61/699,855, and 61/699,862 are incorporated herein by reference.

BACKGROUND

Many map-based applications are available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes the relative location of streets, highways, points of interest, etc. in the map.

The maps used in such applications are usually two-dimensional (2D) maps or three-dimensional (3D) maps. However, a large number of the applications use 2D maps due in part to the processing-intensive demands of viewing 3D maps. For the same reason, the applications that use 3D maps are often slow, inefficient, plain, and/or simple, to the point that renders the application useless.

BRIEF SUMMARY

Some embodiments of the invention provide novel methods for generating and presenting immersive and non-immersive 3D map presentations for browsing and navigation. In some embodiments, the immersive and non-immersive 3D map presentations can be alternatively and/or sequentially displayed on a device (e.g., a mobile device) that has a touch-sensitive screen and a multi-touch interface that allow a user to interact with the presentations through touch and gestural inputs on the screen. In other embodiments, the presentations are provided on a device that does not have a touch-sensitive screen.

In some embodiments, these 3D presentations are provided by an integrated mapping application that provides several useful modalities, such as location browsing, map searching, route identifying, and route navigation operations. However, in other embodiments, the mapping application does not employ all of these modalities. For instance, in some embodiments, the mapping application does not provide route navigation.

In order to display immersive and non-immersive 3D map presentations, some embodiments have to generate a variety of tiles for client devices to render to generate roads, building, and surrounding scenery. In some embodiments, examples of such tiles include road and building tiles used for non-immersive 3D presentations, and navigation and building tiles used for immersive 3D presentations.

Before generating these tiles, a set of servers has to generate the description of the road, building, and other geometries that are placed in each of the tiles. This task involves multiple sub-tasks such as (1) receiving map data from a variety of vendors, (2) processing such data to produce one dimensional (1D) roads, (3) smoothing the 1D road graphs, (4) defining data to specify intersections, (5) generating 2D road geometries and land cover, (6) smoothing the 2D road geometries, (7) generating data (e.g., estimated height data) regarding buildings, (8) using such data to define building geometries, (9) constructing road geometries details (such as islands, lane markings, and distances and land cover between road geometries), and (10) identifying geometry edge node characteristics and propagating such characteristics.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

Figure 1:
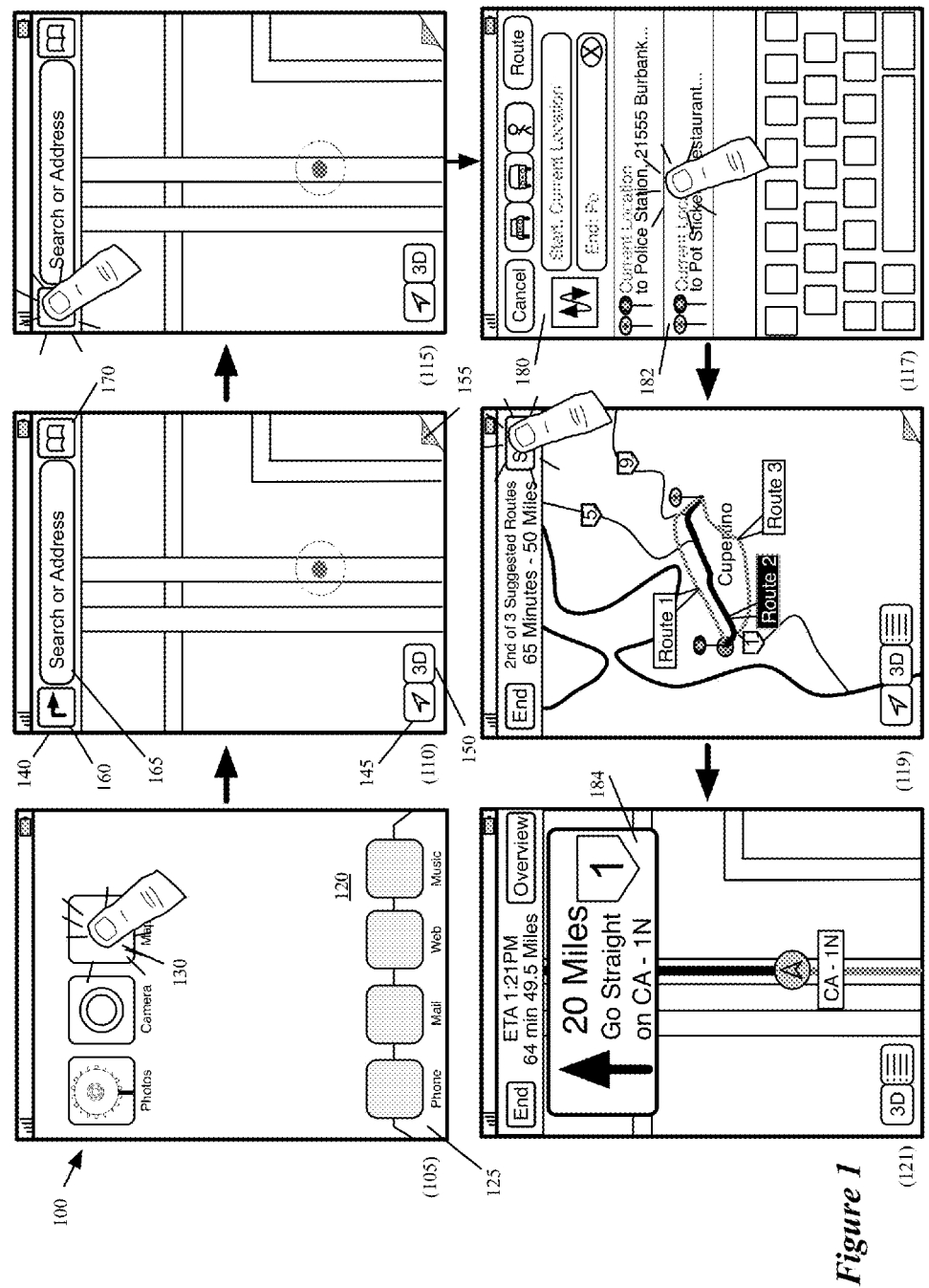
FIG. 1 illustrates an example of a device that executes an integrated mapping application of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for generating and presenting immersive and non-immersive 3D map presentations for browsing and navigation. In some embodiments, the immersive and non-immersive 3D map presentations can be alternatively and/or sequentially displayed on a device (e.g., a mobile device) that has a touch-sensitive screen and a multi-touch interface that allow a user to interact with the presentations through touch and gestural inputs on the screen. In other embodiments, the presentations are provided on a device that does not have a touch-sensitive screen.

In some embodiments, these 3D presentations are provided by an integrated mapping application that provides several useful modalities, such as location browsing, map searching, route identifying, and route navigation operations. However, in other embodiments, the mapping application does not employ all of these modalities. For instance, in some embodiments, the mapping application does not provide route navigation.

In order to display immersive and non-immersive 3D map presentations, some embodiments have to generate a variety of tiles for client devices to render to generate roads, building, and surrounding scenery. In some embodiments, examples of such tiles include road and building tiles used for non-immersive 3D presentations, and navigation and building tiles used for immersive 3D presentations.

Before generating these tiles, a set of servers has to generate the description of the road, building, and other geometries that are placed in each of the tiles. This task involves multiple sub-tasks such as (1) receiving map data from a variety of vendors, (2) processing such data to produce one dimensional (1D) roads, (3) smoothing the 1D road graphs, (4) defining data to specify intersections, (5) generating 2D road geometries and land cover, (6) smoothing the 2D road geometries, (7) generating data (e.g., estimated height data) regarding buildings, (8) using such data to define building geometries, (9) constructing road geometries details (such as islands, lane markings, and distances and land cover between road geometries), and (10) identifying geometry edge node characteristics and propagating such characteristics.

Once generated on the mapping service side, the tiles are used by a mapping application on a client device to present 3D maps to users of the client devices. The mapping application of some embodiments uses a variety of novel techniques to present a 3D presentation of a map while the map is being browsed or while the map is providing a navigation presentation. For instance, the mapping application renders the 3D presentation from the vantage point of a virtual camera, and uses various methods for moving the virtual camera (i.e., moving the perspective rendering position) automatically in certain situations to achieve a desired 3D presentation. One such example occurs when the mapping application of some embodiments moves the position of the virtual camera from a perspective rendering position behind a current position of a moving device to a top-down view of the current position when the device is about to make a turn along a route. Another example is the zoom in/out animations that are provided, which show objects in the scene growing and shrinking with the zoom in operation and the zoom out operation.

Also, in some embodiments, the mapping application provides two different types of 3D presentations—an immersive 3D presentation and a non-immersive 3D presentation. The immersive presentation in some embodiments not only displays more geometries but also displays more details for the geometries that are displayed in the non-immersive presentation. The mapping application also provides smooth transitions between the non-immersive and immersive presentations.

To achieve such smooth transitions and generate other novel effects, the mapping application of some embodiments uses a novel image processing pipeline. This pipeline performs a variety of pre-load operations to download, retrieve and/or decompress map tiles that may be needed for a navigation presentation, to prepare its rendering pipeline for its rendering operations, and to prepare a duplicate pipeline to smoothly transition between the immersive and non-immersive 3D presentations. The virtual camera and rendering aspects of the mapping application of some embodiments are described in detail in the U.S. Provisional Patent Application 61/699,855, entitled "Rendering Maps", filed Sep. 11, 2012; and concurrently filed U.S. patent application Ser. No. 13/632,040, entitled "Virtual Camera for 3D Maps", issued as U.S. Pat. No. 9,269,178. The provisional application 61/699,855 and the above-mentioned concurrently filed patent application are incorporated herein by reference.

Section I below describes the mapping application of some embodiments of the invention. Section II then describes server side operations for generating the tiles needed to produce immersive and non-immersive 3D presentations. Section III then describes electronic devices that employ the mapping application of some embodiments. Section IV lastly describes location services uses by some embodiments of the invention.

I. Navigation User Interface

A. Start

The navigation application of some embodiments is part of an integrated mapping application that includes several useful modalities, including location browsing, map searching, route identifying and route navigating operations. This integrated application (referred to below as the mapping application, the navigation application or the integrated application) in some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

FIG. 1 illustrates an example of a device 100 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows six stages 105, 110, 115, 117, 119, 121 of interaction with the mapping application. The first stage 105 shows a device's UI 120, which includes several icons of several applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments (1) displays a map of the current location of the device, and (2) several UI controls arranged in a top bar 140, and as floating controls. As shown in FIG. 1, the floating controls include an indicator 145, a 3D control 150, and a page curl control 155, while the top bar 140 includes a direction control 160, a search field 165, and a bookmark control 170.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g. 'Wo' or 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows locations and routes to be bookmarked by the application. The position indicator 145 allows the current position of the device to be specifically noted on the map. Once this indicator is selected once, the application maintains the current position of the device in the center of the map. In some embodiments, it can also identify the direction to which the device currently points.

The 3D control 150 is a control for viewing a map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map.

The page curl control 155 is a control that allows the application to minimize the number of on-screen controls, by placing certain less frequently used actions in a secondary UI screen that is accessible through the "page curl" control that is displayed on the map. In some embodiments, the page curl is permanently displayed on at least some of the map views that the application provides. For instance, in some embodiments, the application displays the page curl permanently on the starting page (illustrated in second stage 110) that it provides for allowing a user to browse or search a location or to identify a route.

The direction control 160 opens a direction entry page 180 through which a user can request a route to be identified between a starting location and an ending location. The third stage 115 of FIG. 1 illustrates that the selection of the direction control 160 opens the direction entry page 180, which is shown in the fourth stage 117. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

The fourth stage 117 shows that the direction entry page 180 includes starting and ending fields for providing starting and ending locations for a route, and a table that lists recent routes that the application has provided to the user. Other controls on this page are controls for starting a route, for reversing the order of the start and end locations, for canceling the direction request, and for picking walking, auto, or public transit routes. These controls and other aspects of the mapping application are described in U.S. Provisional Patent Application 61/656,080, entitled "Integrated Location Browsing, Map Searching, Route Identifying, and Route Navigating Application", filed Jun. 6, 2012; U.S. Provisional Patent Application 61/699,841, entitled "Problem Reporting", filed Sep. 11, 2012; and concurrently filed U.S. patent application Ser. No. 13/632,102, entitled "Problem Reporting in Maps", published as U.S. Patent Publication 2013-0326407. The Provisional Applications 61/656,080 and 61/699,841, as well as the above-mentioned concurrently filed patent application, are incorporated herein by reference.

The fourth stage illustrates the user selecting one of the recent directions that was auto-populated in the table 182. The fifth stage 119 then shows three routes on a 2D map view between the specified start and end locations specified through the page 180. It also shows the selection of the second route and some information about this route in a bar at the top of the layout. This bar is shown to include start and end buttons. The start button is shown to be selected in the fifth stage.

As shown by the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 184 that identifies the distance from the current location of the device to the next maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be located along a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 184 to the top edge of the presentation a short time period after starting the navigation presentation. In some embodiments, the application requires the user to tap on the navigated map to bring back the top bar, its controls and the floating controls, and requires another tap to remove these controls again from the map. Other embodiments provide other mechanisms for viewing and removing these controls. The navigation user interface and other aspects of the navigation mode of some embodiments are described in greater detail in U.S. Provisional Patent Application 61/655,997, entitled "Route Navigating Method and Apparatus", filed Jun. 5, 2012; U.S. Provisional Patent Application 61/657,864, entitled "Route Navigating Method and Apparatus", filed Jun. 10, 2012; U.S. Provisional Patent Application 61/699,851, entitled "Voice Instructions During Navigation", filed Sep. 11, 2012; and concurrently filed U.S. patent application Ser. No. 13/632,121, entitled "Context-Aware Voice Guidance", published as U.S. Patent Publication 2013-0322634. The provisional applications 61/655,997, 61/657,864, and 61/699,851, as well as the above-mentioned concurrently filed patent application, are incorporated herein by reference.

B. 2D and 3D Navigation

Figure 2:
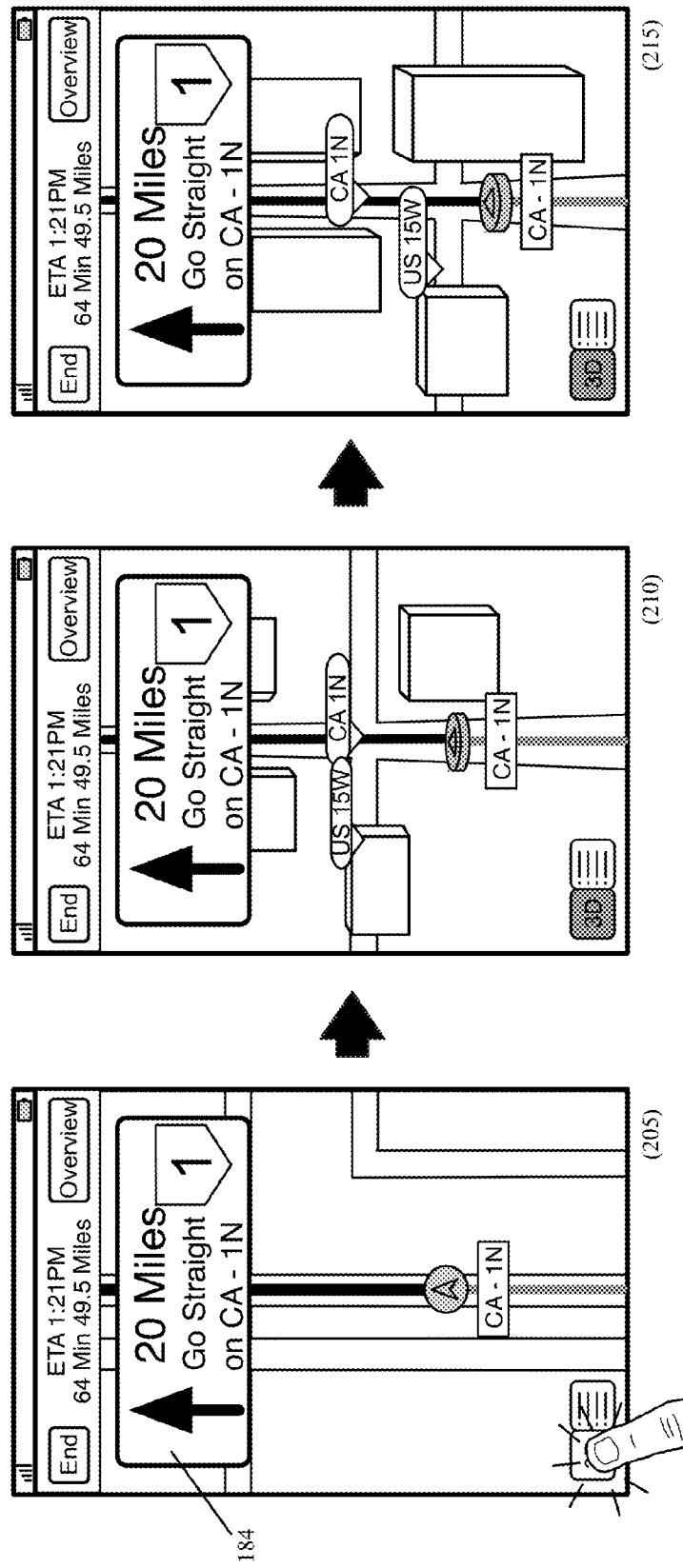
FIG. 2 illustrates how the navigation application of some embodiments provides a 3D control as a quick mechanism of entering a 3D navigating mode.

The navigation application of some embodiments can display a map for navigation in either a 2D mode or a 3D mode. As mentioned above, one of the floating controls is the 3D control 150 that allows a user to view a navigation presentation in three dimensions (3D). FIG. 2 illustrates how the navigation application of some embodiments provides the 3D control 150 as a quick mechanism of entering a 3D navigating mode. This figure illustrates this operation in three stages 205-215. The first stage 205 illustrates the user selecting the 3D control 150 while viewing a two-dimensional navigation presentation.

The second stage 210 illustrates the navigation presentation in the midst of its transition into a 3D presentation. As shown in this figure, the 3D control appears highlighted at this stage to indicate that the navigation presentation has entered a 3D mode. In some embodiments, the navigation application generates the 3D view of the navigated map by rendering the map view from a particular position in the three dimensional scene that can be conceptually thought of as the position of a virtual camera that is capturing the map view. This rendering will be further described below by reference to FIG. 3.

The third stage 215 then illustrates the navigation presentation at the end of its transition into its 3D appearance. As shown by the difference between the heights of the buildings in the second and third stages, the transition from 2D to 3D navigation in some embodiments includes an animation that shows three dimensional objects in the navigated map becoming larger.

1. Virtual Camera

Figure 3:
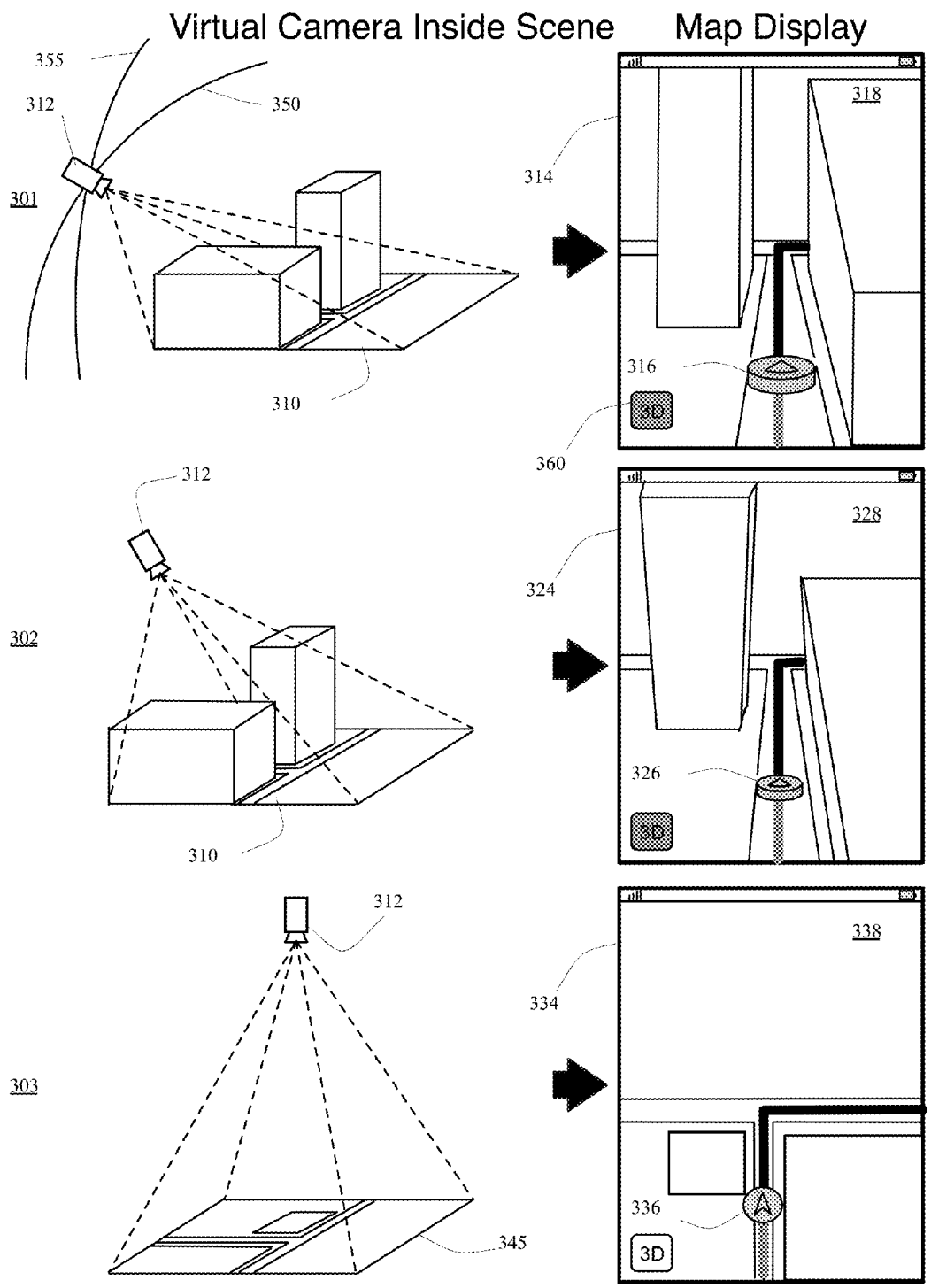
FIG. 3 presents a simplified example to illustrate the concept of a virtual camera.

The navigation application of some embodiments is capable of displaying navigation maps from multiple perspectives. The application can show maps in three dimensions (3D) or in two dimensions (2D). The 3D maps are generated simulations of a virtual scene as seen by a virtual camera. FIG. 3 presents a simplified example to illustrate the concept of a virtual camera 312. When rendering a 3D navigation map, a virtual camera is a conceptualization of the position in the 3D map scene from which the device renders a 3D view of the scene. FIG. 3 illustrates a location in a 3D navigation map scene 310 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 301 shows the virtual camera 312 at a first position pointing downwards at an angle (e.g., a 30° angle) towards the 3D scene 310. By rendering the 3D scene from the position and angle shown in stage 301 the application generates the 3D map view 318. From this position, the camera is pointing at a location that is a moving position in front of the device. The virtual camera 312 is kept behind the current location of the device. "Behind the current location" in this case means backward along the navigation application's defined path in the opposite direction from the current direction that the device is moving in.

The navigation map view 318 looks as though it was shot by a camera from above and behind the device's location indicator 316. The location and angle of the virtual camera places the location indicator 316 near the bottom of the navigation map view 318. This also results in the majority of the screen being filled with the streets and buildings ahead of the present location of the device. In contrast, in some embodiments, the location indicator 316 is in the center of the screen, with half of the screen representing things ahead of the device and the other half representing things behind the device. In order to simplify the figure, no road signs are depicted for the views 318, 328, and 338.

The second stage 302 shows the virtual camera 312 at a different position, pointing downwards towards the scene 310 at a larger second angle (e.g., a 45° angle). The application renders the scene 310 from this angle, resulting in the 3D navigation map view 328. The buildings and the roads are smaller than their illustration in the first navigation map view 318. Once again the virtual camera 312 is above and behind the location indicator 326 in the scene 310. This again results in the location indicator appearing in the lower part of the 3D map view 328. The location and orientation of the camera also results again in the majority of the screen displaying things ahead of the car, which is what someone navigating needs to know.

The third stage 303 shows the virtual camera 312 at a top-down view that looks downwards on a location on a 2D map 345 that corresponds to the location in the 3D map scene 310 that was used to render the 3D views 318 and 328. The scene that is rendered from this perspective is the 2D map view 338. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application, as cropping a portion of a 2D map is not a perspective rendering operation.

At the third stage 303, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses a perspective rendering operation to render a 3D scene from a top-down virtual camera position. In these embodiments, the 2D map view that is generated is somewhat different than the map view 338 illustrated in the third stage 303, because any object that is away from the center of the view is distorted, with the distortions being greater the further the object's distance from the center of the view.

The virtual camera 312 moves along different trajectories in different embodiments. Two such trajectories 350 and 355 are illustrated in FIG. 3. In both these trajectories, the camera moves in an arc and rotates more downward as the camera moves upwards on the arc. The trajectory 355 differs from the trajectory 350 in that in the trajectory 355 the camera moves further away from its point of focus (and the user's current location) as it moves up the arc.

While moving along one of the arcs, the camera rotates to maintain a point ahead of the location indicator at the focal point of the camera. In some embodiments, the user can turn off the three dimensional view and go with a purely two dimensional view. For example, the applications of some embodiments allow a three dimensional mode to be turned on and off by use of a 3D button 360. The 3D button 360 is highly useful to the turn-by-turn navigation feature, where it has a role as an indicator and toggle. When 3D is turned off, the camera will maintain a 2D navigation experience, but when 3D is turned on, there may still be some top-down perspectives when 3D viewing angles don't make sense (e.g., when going around a corner that would be obstructed in 3D mode).

2. User Adjustment of Camera Height

Figure 4:
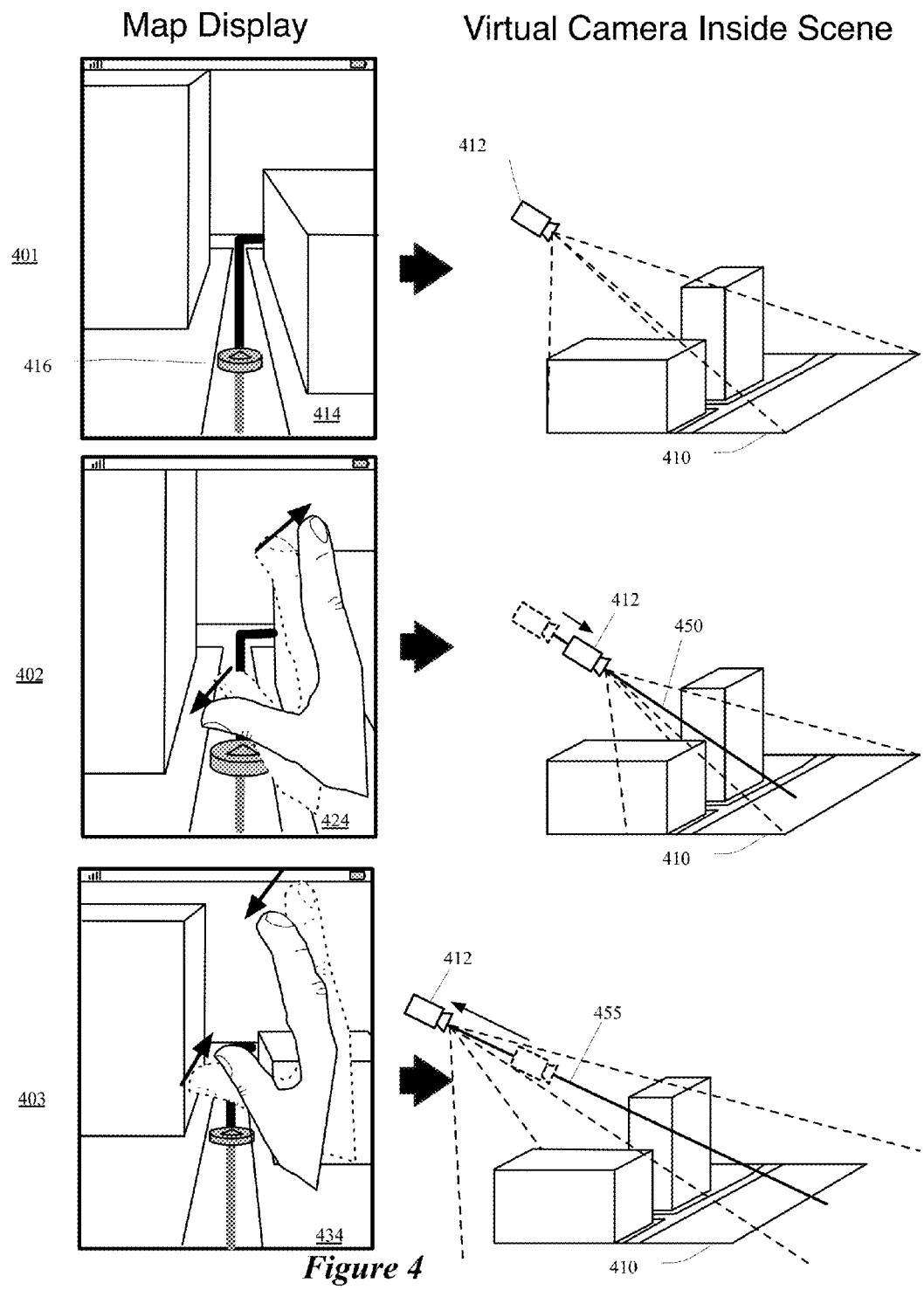
FIG. 4 illustrates the adjustment of the distance of a virtual camera by contracting and expanding gestures.

Besides (or instead of) having the navigation application control the camera (e.g., turning from 3D to 2D when going around corners) some embodiments also allow the user to adjust the level of the camera. Some embodiments allow the user to make a command gesture with two fingers to adjust the distance (height) and angle of the camera. Some embodiments even allow multiple types of gestures to control the camera. FIG. 4 illustrates the adjustment of the distance of a virtual camera by contracting and expanding gestures. The figure is shown in three stages. In stage 401, the application shows a basic scene 410 with a virtual camera 412 at the default level for 3D viewing and the screen view 414 rendered from the scene 410. The basic scene contains two buildings and a T-junction. In stage 401, the buildings are viewed from a 45 degree downward angle and a particular height that makes them seem a particular size. The location indicator 416 is also shown at a particular size.

In stage 402, the user makes a gesture by placing two finger tips 420 near each other on the screen of the device, on the screen view 424 and moving the fingertips apart while they are on the screen. Moving the fingertips 420 apart has the effect of making the map (both the part between the fingers and the rest of the map) larger. In order to make the things in the map appear larger, the application causes the virtual camera 412 to zoom in. In some embodiments, the line 450 along which the mapping application moves the virtual camera 412 is a line formed by the front of the virtual camera 412 and the virtual camera 412's point of focus. The mapping application of some embodiments moves the virtual camera 412 along a line formed by the front of the virtual camera 412 and a location in the 3D map 410 based on the user's input to zoom into (or out of) the view of the 3D map 410.

After zooming in for stage 402, the user decides to zoom out for stage 403. In this stage the user has placed two fingers 430 on the screen and brought them closer together. Bringing the fingers closer together has the effect of shrinking the map (both the part between the fingers and the rest of the map). The zoom-out adjustment is accomplished by moving the virtual camera 412 farther away from the 3D map 410 along the line 455. In some embodiments, the line 455 along which the mapping application moves the virtual camera 412 is a line formed by the front of the virtual camera 412 and the virtual camera 412's point of focus. The mapping application of some embodiments moves the virtual camera 412 along a line formed by the front of the virtual camera 412 and a location in the 3D map 410 based on the user's input to zoom into (or out of) the view of the 3D map 410.

Rendering a 3D map view using the virtual camera 412 at this position results in a 3D map view 434 in which the buildings and the roads appear farther than the position illustrated in the 3D map view 424. As shown by the dashed-line version of the virtual camera 412, the virtual camera 412 moved farther from the 3D map 410 along the line 455.

Figure 5:
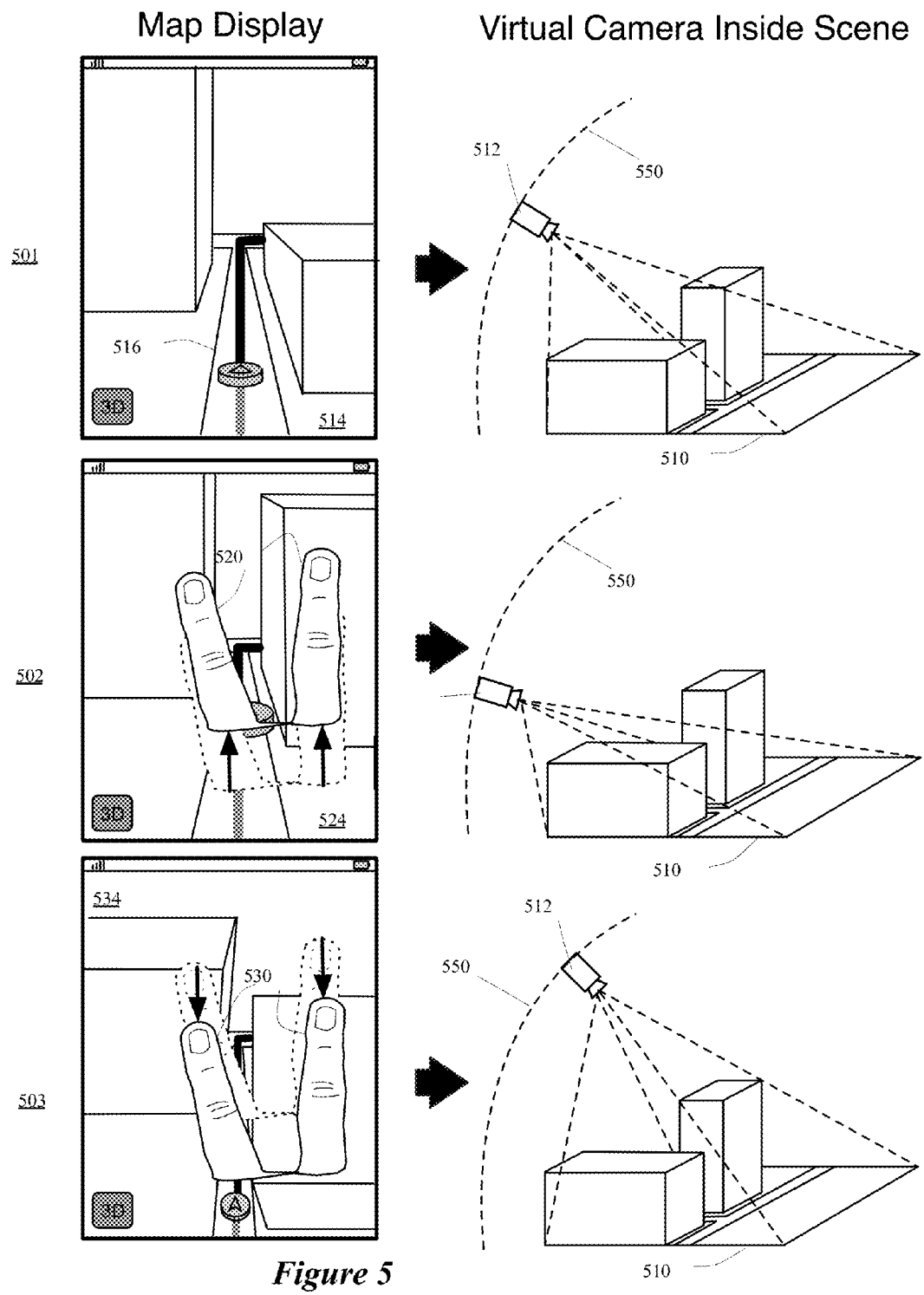
FIG. 5 illustrates an embodiment of a camera the angle of which can be adjusted by gestures.

In addition to being controllable by zooming in and out, some applications allow a user to change the angle of the virtual camera. FIG. 5 illustrates an embodiment of a camera the angle of which can be adjusted by gestures. The figure is shown in three stages 501-503. In stage 501, the camera is pointing downward at 45 degrees at scene 510. Scene 510 contains two buildings and a T-junction which are shown in screen view 514. The buildings are shown from a particular angle and a particular size. The location indicator 516 is also shown at a particular size.

In stage 502, the user has placed two fingers 520 on the screen approximately horizontal to each other and dragged up. This has the apparent effect of dragging the scene up with the fingers. The scene rising is accomplished by the virtual camera 512 lowering and changing its viewing angle from 45 degrees to 30 degrees. In the screen view 524, the buildings and the location indicator look taller than in stage 501.

After the user drags the scene up in stage 502, the user then drags the scene down in stage 503. To do this, the user again places two fingers 530 on the screen and drags downwards. This drags the scene down along with the fingers 530. The scene dropping is accomplished by the virtual camera 512 rising and changing its angle with the scene 510 to 60 degrees downward. In stage 503, the camera 512 has moved farther up and is angled down more than in stage 501. Accordingly, the buildings and location identifier 536 again look even shorter and smaller in stage 503 than in stage 501.

In some embodiments, the mapping application provides an inertia effect for different operations (e.g. panning, rotate, entering from 2D to 3D). When a user provides a particular type of input (e.g., input that terminates at a velocity greater than a threshold velocity) to pan the 3D map, the mapping application generates an inertia effect that causes the 3D map to continue panning and decelerate to a stop. The inertia effect in some embodiments provides the user with a more realistic interaction with the 3D map that mimics behaviors in the real world.

The application of some embodiments allows the distance and angle of the camera to be independently controlled. For example, it allows the distance to be controlled by the contracting and expanding finger gestures and the angle to be controlled by the dragging of horizontally placed fingers. Other embodiments use whichever gesture is being performed to set either a distance or an angle of the camera, with the other variable being set automatically. While FIGS. 4 and 5 show gestures performed in a certain direction leading to certain results, in some embodiments, one or both of these gestures could be reversed. For example, in some embodiments, dragging horizontally placed fingers down may bring the camera down rather than bringing the scene down. That would have the effect of moving the scene down when the fingers move up and moving the scene up when the fingers move down.

II. Server Side Generation of Map Tiles

In order to display both immersive and non-immersive 3D map presentations, some embodiments have to generate a variety of tiles for client devices to render to generate roads, building, and surrounding scenery. In some embodiments, examples of such tiles include road and building tiles used for non-immersive 3D presentations, and navigation and building tiles used for immersive 3D presentations.

Before generating these tiles, a set of servers has to generate the description of the road, building, and other geometries that are placed in each of the tiles. This task involves multiple sub-tasks such as (1) receiving map data from a variety of vendors, (2) processing such data to produce one dimensional (1D) roads, (3) smoothing the 1D road graphs, (4) defining data to specify intersections, (5) generating 2D road geometries and land cover, (6) smoothing the 2D road geometries, (7) generating data (e.g., estimated height data) regarding buildings, (8) using such data to define building geometries, (9) constructing road geometries details (such as islands, lane markings, and distances and land cover between road geometries), and (10) identifying geometry edge node characteristics and propagating such characteristics.

The mapping service of some embodiments generates downloadable map tile data through offline processing of map data (e.g., data received from map vendors). In some embodiments, this offline processing takes map object location input (e.g., latitude/longitude data for roads, administrative boundaries, natural boundaries, etc.) and generates aggregated roads and relationships between the aggregated roads. From the aggregated roads and their relationships, the mapping service processing generates road geometries. The mapping service also generates geometries for land cover (e.g., parks, oceans, states, etc.) using the map object location input. Some embodiments use scalable distributed processing to create downloadable map tiles from the geometric vector data. One of ordinary skill in the art will recognize that the "offline" processing described in this application may be performed by mapping service computing devices that are in fact connected to the network through which the mapping application requests tile data, but is used to represent that the processing is not performed in response to user requests for tiles.

Figure 6:
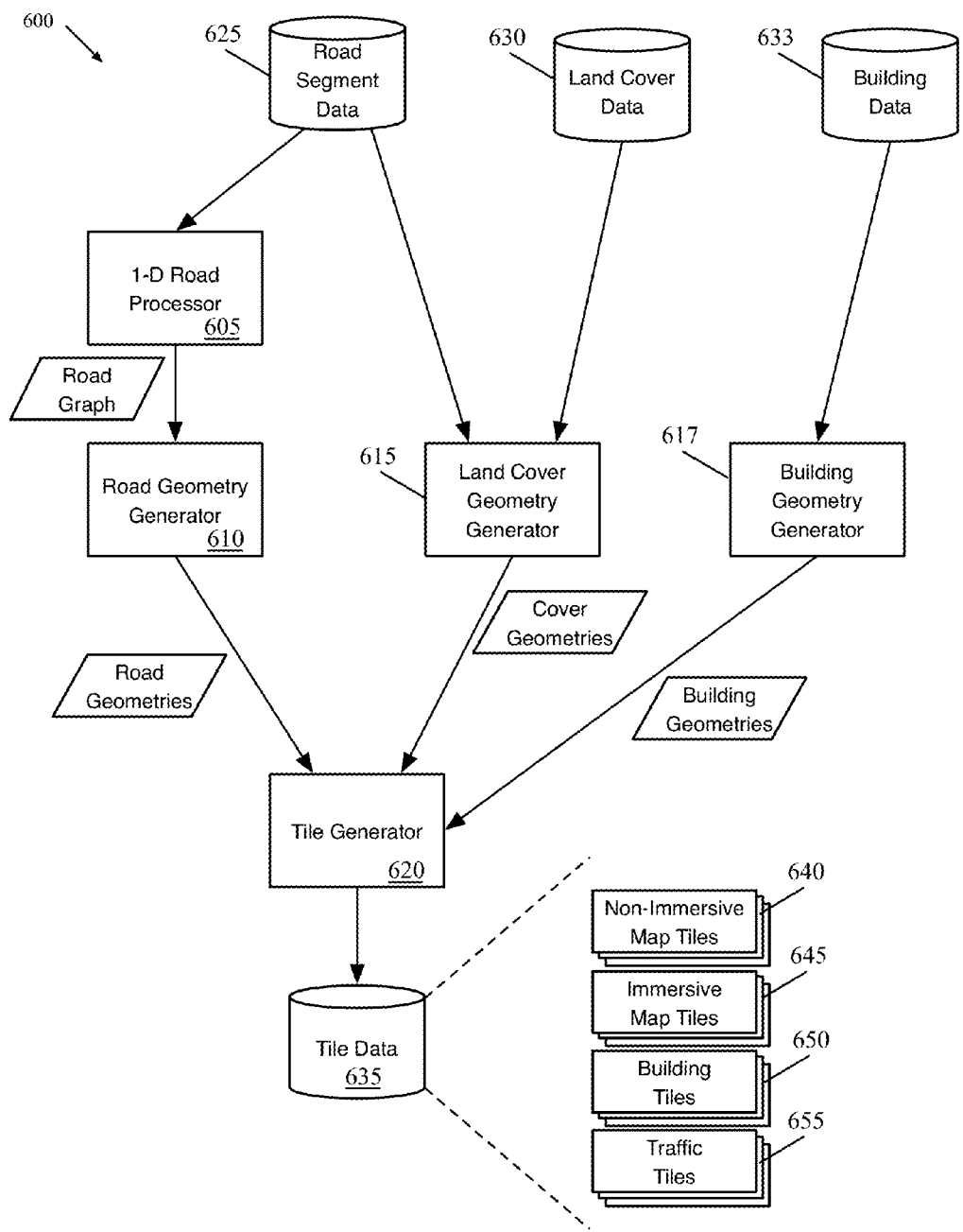
FIG. 6 conceptually illustrates the mapping service processing of some embodiments.

FIG. 6 conceptually illustrates the mapping service processing 600 of some embodiments. As mentioned, some embodiments perform this processing offline to generate various map tiles which can then be sent to client devices in response to real-time requests. The processing may be performed on a regular basis (e.g., hourly, daily, weekly) or may be performed any time new data becomes available (e.g., updates received through providers of map data, corrections received from users, etc.).

The mapping service processing 600 includes a 1-D road processor 605, a road geometry generator 610, a land cover geometry generator 615, a building geometry generator 617 and a tile generator 620. One of ordinary skill in the art will recognize that the various modular operations shown in FIG. 6 may all be performed on a single server or may be distributed across several computing devices. In fact, some of the operations (e.g., tile generation) may be performed as distributed processing operations that span multiple computing devices.

In addition to the processing operations, FIG. 6 illustrates road segment data 625, land cover data 630, and building data 633. Road segment data 625 stores data defining the location and properties of roads. In some embodiments, each road segment is assigned one or more names (e.g. "Lincoln Blvd.", "CA-1"), location data that indicates the path of the road segment, and attributes of the road segment (e.g., speed limit, width, number of lanes, road type, etc.). In some embodiments, the locations of junctions (also referred to as junctions) is part of the road segment data. The land cover data 630 stores data defining the location and properties of various types of non-road land cover. The land cover may include bodies of water (e.g., rivers, oceans, lakes, swimming pools, etc.), administrative bodies (e.g., boundaries of states, countries, cities, parks, etc.), area designations (e.g., rural/urban/suburban, desert/mountains/forest, etc.), or other data describing the land between roads. The building data 633 of some embodiments stores the location of buildings as well as data about the buildings. For instance, the building data may include ground elevation data and surface elevation from which building height may be calculated.

The road segment data 625, land cover data 630, and building data 635 may be received from a single source (e.g., a single vendor of map data) or several sources (e.g., several different vendors). For instance, a first vendor might provide road data for a first region while a second vendor provides road data for a second region, a third vendor provides land cover data for the first and second regions, and a fourth vendor provides elevation data (or other combinations, such as multiple different vendors of land cover data for different types of information).

The 1-D road processor 605 receives road segment data 625 and generates one or more road graphs from the data. A road graph, in some embodiments, links together a set of road segments and junctions of road segments. To generate the road graph, the 1-D road processor 605 identifies road segments that should be combined into aggregate roads (i.e., based on the names, start and end points, and common attributes of the segments). For example, when the end of a first segment shares a location with the start of a second segment, the segments have at least one name in common and the segments share at least some attributes, then the road processor 605 combines the segments into an aggregate road. The 1-D road processor additionally fills in data required for additional processing (e.g., elevation data, speed limit data, number of lanes) when this is missing from the road segment data.

In addition to forming the aggregate roads, the 1-D road processor 605 identifies and generates angle information for junctions of the roads (e.g., as described below) and identifies other relationships between roads (e.g., merging dual carriageways, establishing overlap relationships). A connected set of junctions and segments forms a road graph.

The road geometry generator 610 generates geometries for the roads (i.e., sets of vertices for drawing the roads at the client devices) based on the road graph using various processes. In some embodiments, the road geometry generator 610 grows road geometries out from the road centerlines (e.g., using lane #, width, and offset data), then performs various operations to refine the geometries. As examples, the road geometry generator 610 smoothes transitions between road segments with different numbers of lanes, creates more realistic rounded corners at intersections, smoothes road merges to remove excess road pieces and gaps between roads, and removes overlap between separate roads that do not intersect. In addition, in some embodiments the road geometry generator 610 assigns specific characteristics to the polygon vertices and/or edges, such as marking tunnel entries, marking road interior edges (e.g., between segments), marking sidewalks, and marking bridge casings where shadows should be drawn.

The land cover geometry generator 615 uses both the land cover data 630 and road segment data 625 in some embodiments to create the geometries (i.e., sets of vertices defining polygons) for the land cover. After growing geometries for the land cover, some embodiments use various operations to resolve boundaries between the geometries. For example, when combining data from different sources, the location data indicating object boundaries may not align perfectly and therefore there may be either gaps between the object geometries or overlap of the geometries. Some embodiments use different operations for resolving boundaries between different geometries, depending on the types of objects. In addition, the land cover geometry generator 615 uses the road segment data to fill in the land cover geometry and ensure that gaps are not left between the land cover and the roads. Some embodiments grow the land cover geometries outside of their marked boundaries towards the roads, stopping the geometries at road centerline locations. While this creates an overlap between the land cover geometry and road geometry, in some embodiments the client mapping applications include instructions to render road geometry on top of land cover geometry.

The building geometry generator 617 of some embodiments generates building geometries using the building data 633. In some embodiments, as mentioned, the building data 633 includes ground elevation and surface elevation data, in addition to locations of the buildings. To generate building geometry, some embodiments calculate the building height for various points within the location of the building. The building geometry generator 617 retrieves the ground elevation and subtracts this from the surface elevation data to calculate the building height. In other embodiments, the building geometry generator 617 (or another module) uses 3D satellite data to calculate the height data. To calculate a height for the building as a whole, the building geometry generator 617 calculates an overall height as the mean of the various calculated heights at different points, plus a bias factor constant multiplied by the standard deviation of the point heights. The bias factor, in some embodiments, is a constant determined from ground truth (e.g., data determined at the actual location) and experiments.

Some embodiments also determine whether the building is flat or non-flat (e.g., with a pointy roof). When the standard deviation of the point heights is above a threshold (which may also be based on ground truth and experiments), the building geometry generator 617 designates the roof as non-flat. When the standard deviation of the point heights is below the threshold, the building geometry generator 617 designates the roof as flat. When generating the geometry vertices, some embodiments create pointy roofs (e.g., triangular prisms or pyramids) for non-flat buildings.

The road, land cover, and building geometries are sent to the tile generator 620. In some embodiments, the tile generator 620 creates several tiles for a map region, at different levels of detail (i.e., zoom levels). Some embodiments define the tile location boundaries for the different zoom levels (e.g., with a tile at a first zoom level containing four tiles at the next zoom level), then use distributed processing techniques to assign the different geometries (both roads and land cover) to the various tiles. After assigning the geometries to tiles (each geometry may be assigned to one or more tiles at each zoom level), the tile generator 620 uses additional distributed processing to generate and compress the tiles. In some embodiments, map tiles contain vector data describing the polygons to generate for rendering the data as a 2D or 3D map. To reduce the amount of vector data (and thereby reduce the size of the files for easier transmission), some embodiments use a transient rasterization process that reduces the vector data to raster information, then revectorizes the data with fewer vertices.

As shown, the tile generator 620 outputs tile data 635 to storage. The stored tile data 635 is the data accessed by client mapping applications in order for the applications to generate maps for viewing by a user. As shown, the tile data of some embodiments includes non-immersive map tiles 640, immersive map tiles 645, building tiles 650, and traffic tiles 655. The non-immersive map tiles 640 and immersive map tiles 645 provide different levels of data. In some embodiments, the mapping application includes an immersive 3D view and a non-immersive 3D view, with the immersive 3D view providing additional detail (e.g., asphalt view of roads, more realistic land cover and buildings, closer simulation of driving view, etc.). Some embodiments use separate tile sets for the different views, with the immersive map tiles 645 including a greater level of detail about the roads and land cover. In addition to the road segment and land cover data, the map tiles may contain additional data. For instance, the tiles may include various sets of label data (e.g., road labels, place labels, land cover labels, etc.). As shown, the tile data 635 also includes building tiles that indicate geometry for drawing buildings (based on the height and location information) in some embodiments, as well as traffic tiles 655 that are updated regularly with traffic information. Some embodiments use the building tiles for both the immersive and non-immersive 3D views.

A. Road Data and Road Graph Generation

Figure 7:
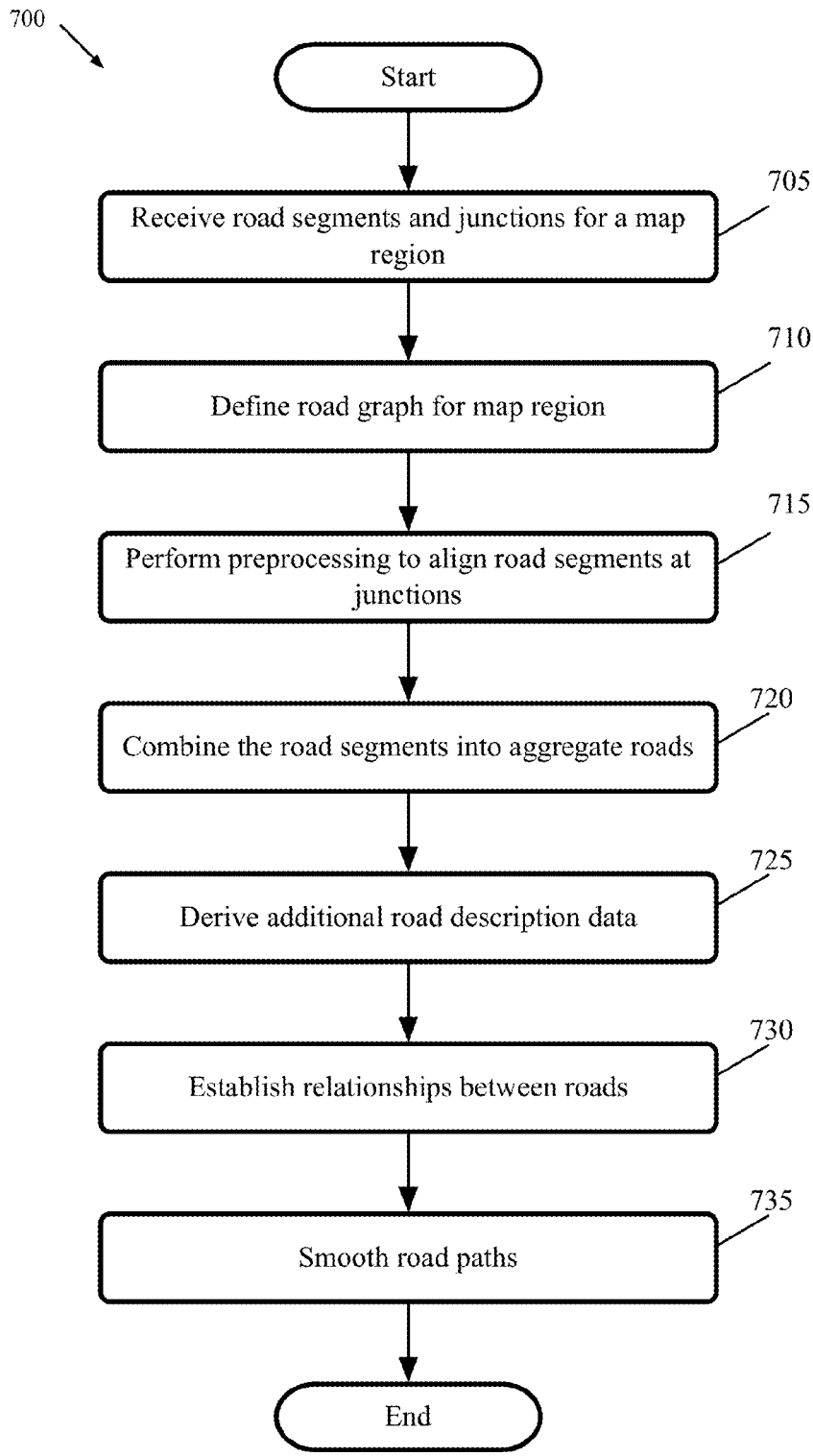
FIG. 7 conceptually illustrates a process of some embodiments for generating a road graph.

As stated above, some embodiments receive road segment data (i.e., from one or more sources) and generate a road graph from the road segments. FIG. 7 conceptually illustrates a process 700 of some embodiments for generating a road graph. The process 700 will be described by reference to FIG. 8, which illustrates various data structures of some embodiments for the roads within a map region. These data structures, which will be described in greater detail below, include road segments 800, edges 805, roads 810, junctions 815, and a road graph 820.

As shown, the process 700 begins by receiving (at 710) a set of road segments and junctions for a map region. In some embodiments, the process 700 (or a similar road graph generation process) is run separately for different map regions (e.g., for states, rectangular geographic areas, land masses, etc.). The road segments for a map region may be received from a single source or from several different sources. In some embodiments, a road segment is a consistent stretch of road that has a single consistent set of attributes (i.e., same number of lanes, speed limit, etc.). When a road attribute changes (e.g., speed limit changes from 45 mph to 35 mph, or a lane is added), a new road segment is defined.

The junctions for a map region are generally received from the same source as the roads that meet at the junctions. In some embodiments, a junction defines an intersection of at least two roads—i.e., that two or more road segments not only cross the same location (which can be determined from the road segment data) but also that the road segments actually intersect each other so that a vehicle can transition from one road segment to the other at the junction.

Figure 8:
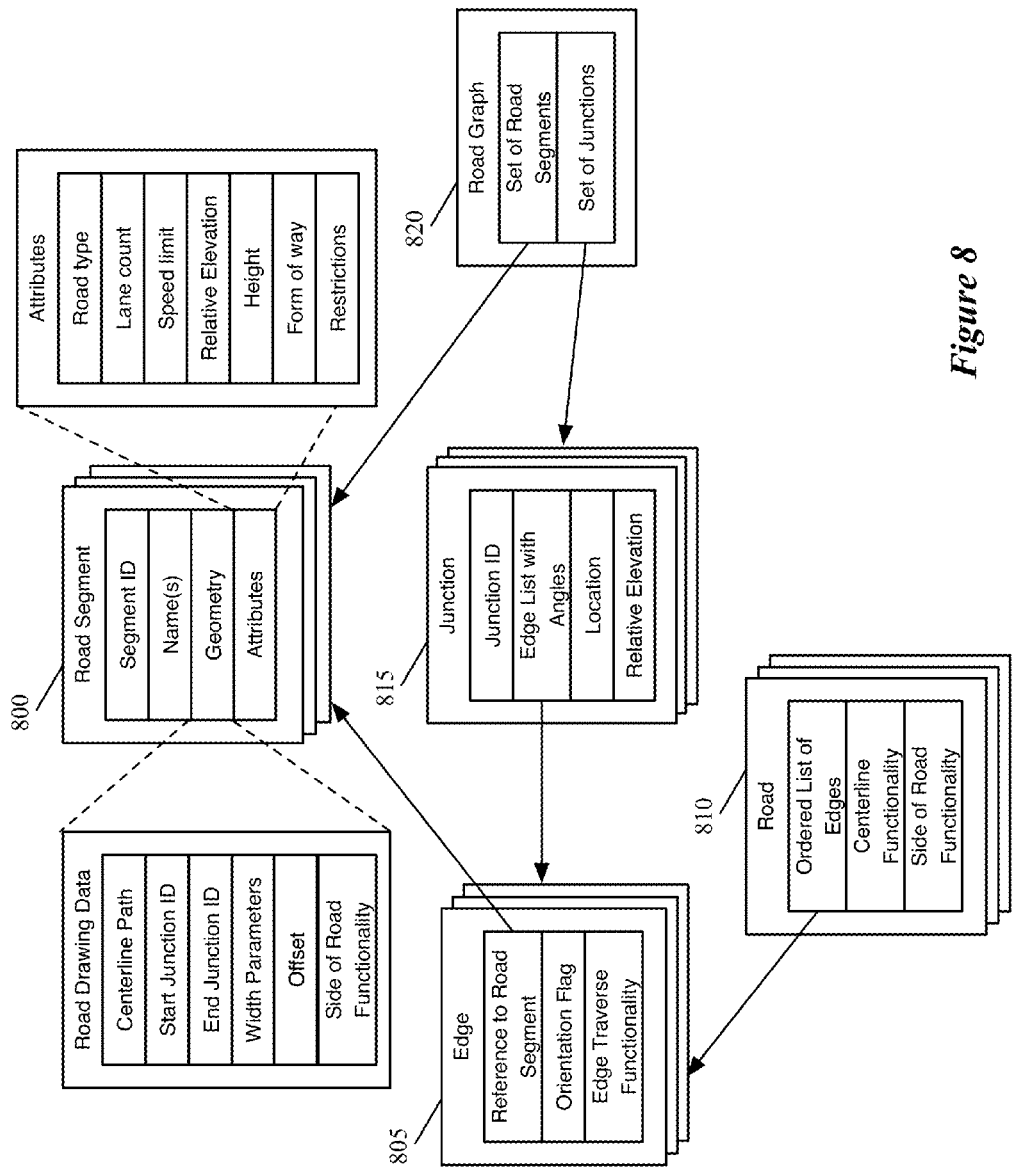
FIG. 8 illustrates various data structures of some embodiments for the roads within a map region.

FIG. 8 illustrates the data structure 800 of some embodiments for a road segment as well as the data structure 815 for a junction. As shown, the road segment includes a segment ID (i.e., a unique identification), one or more names, geometry information, and attribute information. The geometry information (which is different than the road geometries created for defining vector data) defines the path and other geometric information about a road segment. As shown, the geometry information includes centerline path data (e.g., an ordered string of coordinates that define the center of the road), start and end junction information, parameters to indicate the width and offset with respect to the centerline, and functionality enabling evaluation of the sides of the road at any point along the road segment. In some embodiments, this is a function on the road segment class that utilizes the centerline, offset, and width information to calculate the location of the sides of the road. While this diagram shows the road drawing data including start and end junctions, some embodiments do not define one as the start and one as the end, but rather simply indicate two junction IDs as endpoints (or a single junction ID if the road segment dead-ends).

The attribute information describes metadata about the road segment, such as the road type (or functional road class, which defines the level of importance of a road, from freeway down to pseudopath), the number of lanes, the speed limit, the relative elevation of the road (which may contain references to one or more other road segments and/or junctions, indicating that the present road segment runs below or above the referenced object), the height of the road (relevant for identifying elevation), the form of way (which defines a path as a dual carriageway, single carriageway, walkway, stairs, connector road, slip road, etc.), restrictions (e.g., toll restrictions, vehicle type restrictions, indications that a road is private, etc.).

In addition, as shown in FIG. 8, some embodiments define an edge 805 for each road segment. An edge data structure contains a reference (e.g., a pointer) to a road segment to which the edge corresponds, an orientation flag that indicates whether the edge is oriented in the same direction as the road segment, and a functionality to calculate the right and left sides of the edge using the width and centerline data of the referenced road segment. In some embodiments, this functionality exists as a function on the edge class. The edges, in some embodiments, are data constructs used to create the road graph. For a road segment that has both a start and end junction, some embodiments define two edges (one in each direction), so that each junction can reference an edge leading out from the junction.

As shown in FIG. 8, the junction data structure 815 includes a unique junction ID, an ordered list of edges with associated angles, a location, and an elevation order. While this data structure shows an edge list, some embodiments additionally include a list of road segments referred to by the segment IDs, from which the edge list is generated. In some embodiments, the junction ID, list of segment IDs, and elevation order are received from the road data source, while the angles and edge list are calculated by the mapping service. As each road segment is associated with one or more edges, the mapping service processing can determine the appropriate directed edges to list for the junction (the edges directed away from the junction). For many surface street junctions, the relative elevation is not especially meaningful, as the junction and all roads at the location will be at the same level. However, at intersections such as interchanges, or when a road segment passes under or over a freeway, the elevation order indicates which junctions are on top of other junctions and/or road segments.

After receiving the road segments, the process defines (at 710) a road graph for the map region from the road segments and junctions. As shown in FIG. 8, the road graph data structure 820 includes a set of road segments and a set of junctions. In some embodiments, the application traverses the edges and junctions to identify connected sets of edges, then maps these edges to the road segments. Other embodiments use the start and end junctions stored in each of the road segments, and the list of segments stored for each junction to define the connectivity of the segments and junctions. Some embodiments define a single road graph for a map region. However, some embodiments will define multiple road graphs when there are multiple connected sets that do not intersect.

Next, the process 700 performs (at 715) preprocessing on the road graph to align road segments at junctions. In order to identify angles of roads at junctions properly, and to generate polygon geometries for the roads, the roads intersecting at a junction should all end/start at exactly the same location.

However, the road centerline for each of the segments that meet at a particular junction may not end at the exact same location in the received map data. Thus, for each junction, some embodiments calculate an average position of the segment path ends, and assign this position to the junction for its location. In addition, the mapping service processing modifies the road segment path data for each of the segments that meet at the junction so that the centerlines all end at the calculated average position.

Figure 9:
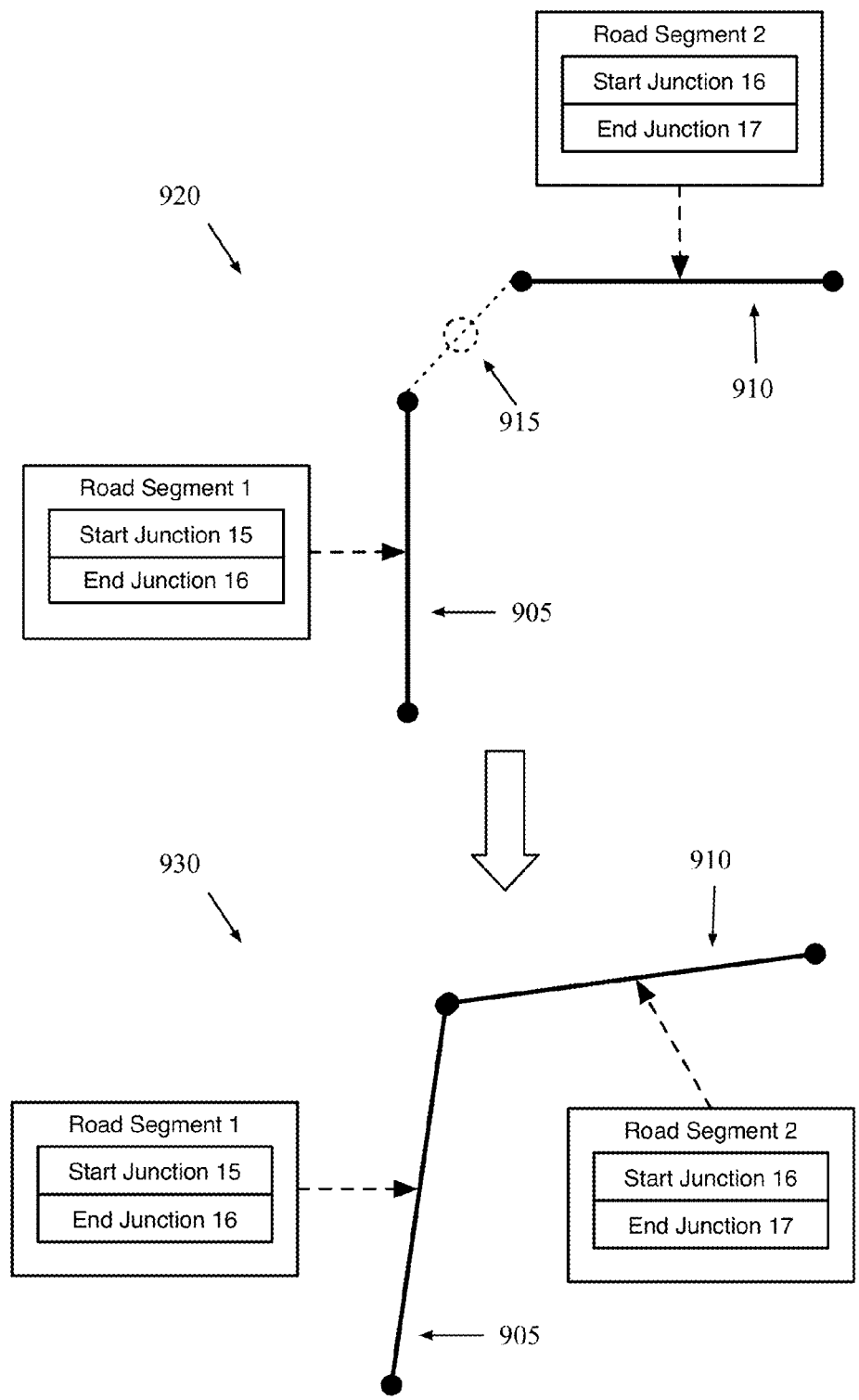
FIG. 9 illustrates an example of a modification for two road segments that meet at a junction.

FIG. 9 illustrates an example of such a modification for two road segments 905 and 910 that meet at a junction, over two stages 920 and 930. As shown, each road segment includes a start junction and an end junction, with the end junction of the first road segment 905 and the start junction of the second road segment 910 being the same (both referring to a junction with an ID of 16). However, as shown in the first stage 920, the centerline paths of the first road segment 905 and the second road segment 910 do not start/end at the same place (and, in fact, do not intersect at all). Thus, some embodiments identify the average position of the ends that should meet. For a junction with only two road segments, this location will be halfway along a line between the two path endpoints, as shown by location 915 in the figure. Each of the ending vertices of the centerlines has a pair of coordinate values (e.g., (x,y) coordinate values, or geolocation coordinates (latitude, longitude)). Some embodiments calculate an average among all of the ending vertices for each coordinate, and use this as the average location for the junction.

After identifying the junction location, the mapping service processing modifies the road segments so that the centerlines all end at the identified location. The second stage 930 shows one example of such a result. In some embodiments, when the road segments are received, the centerline paths may not have vertices at fixed distances. The mapping service processing of some embodiments standardizes the road segment vertices so that each vertex is at a fixed distance (e.g., 10 meters), enabling smoother (less kinked) road polygons. Some embodiments, for a particular road segment, identify a vertex a fixed distance from the end (e.g., 50 meters, 100 meters, etc.) and hold this point fixed, while modifying the other vertices between this point and the end vertex. In some embodiments, the vertices are moved by a lesser amount as they get further away from the endpoint. That is, a vector is calculated for the movement of the end vertex to the identified location, and the other vertices are moved by smaller iterations of this vector.

With preprocessing complete, the process combines (at 720) the road segments into aggregate roads. Some embodiments determine when road segments are in fact different portions of the same road, so that the segments can be treated as a single road for the purposes of defining a map (e.g., for generating labels) and for certain aspects of generating polygons for the roads. In some embodiments, the process uses various attribute and geometry data of the segments to determine whether two segments should be combined.

Some embodiments traverse the road graph to combine the road segments into aggregate roads. While traversing the graph, entering a junction from a particular road segment, the mapping service processing determines which of the other segments is a best match to be a continuation of the current road segment. Some embodiments score each of the segments and aggregate the roads in a greedy fashion.

To compute a score for a particular segment, the mapping service processing evaluates the difference in angle between the incoming road segment and the particular segment, the compatibility of the road segment names, and compares the road attributes. For the angle, the closer the segment is to 180° (i.e., a continuation straight through the junction), the higher the segment will generally score; typically, a road will continue straight or approximately straight through a junction, rather than turning. Some embodiments perform a fuzzy comparison between the road names associated with each segment. That is, the processing compares the string for the incoming road segment with the particular road segment using approximate string matching techniques. In some cases, one or more of the road segments may have multiple names, and the processing performs comparisons of each to find the best match or matches, and uses these best matches in computing the score (e.g., using the comparison of "San Diego Freeway South" to "San Diego Freeway South" rather than to "I-405 South").

In addition, at least some of the road attributes are compared to compute the comparison score in some embodiments. For instance, the mapping service processing of some embodiments compares the road type (i.e., highway, arterial road, minor road, etc.), number of lanes, speed limit, form of way (i.e., single carriageway, dual carriageway, etc.). Once the scores are computed, some embodiments select the segment with the highest score and determine whether it is above a threshold for continuing the road. In addition, some embodiments identify the selected best road segment, and perform a comparison between the selected road segment and each of the other segments. Only if a first segment is the best match for a second segment and the second segment is the best match for the first segment does the processing aggregate the roads. This prevents an incoming road segment that actually ends at a "T" intersection from being joined with one of the road segments that actually continues through the intersection.

Figure 10:
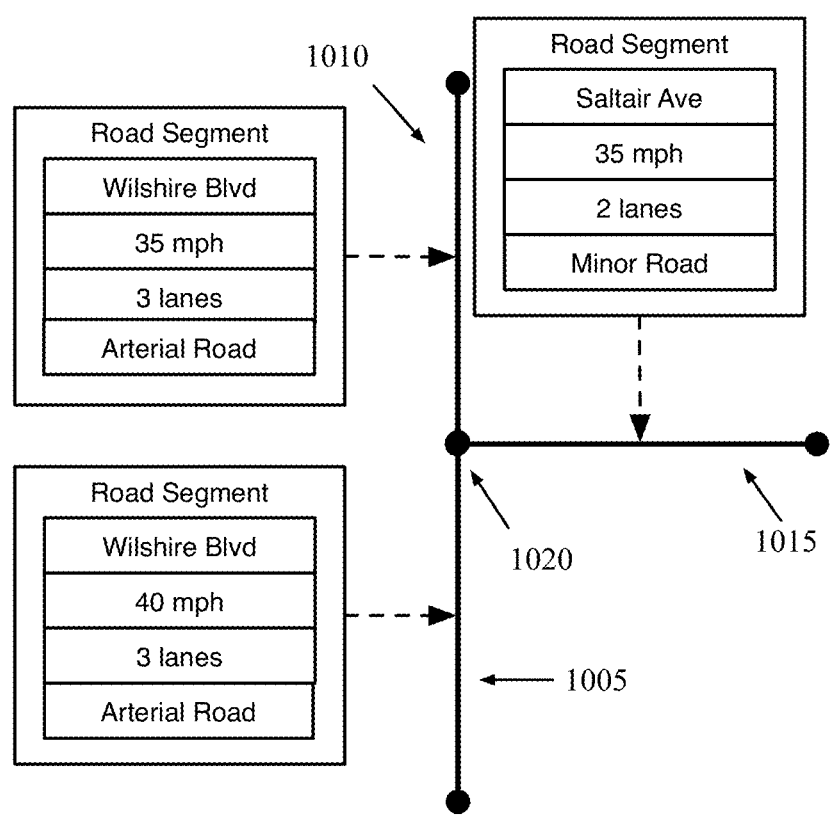
FIG. 10 illustrates an example of three road segments that are candidates for aggregation into a road at a junction.

FIG. 10 illustrates an example of three road segments 1005, 1010, and 1015 that are candidates for aggregation into a road at a junction 1020. As shown, the first segment 1005 has the name "Wilshire Blvd", a speed limit of 40 mph, and three lanes, and is an arterial road. The second segment 1010 also has the name "Wilshire Blvd" and three lanes, and is also an arterial road, but has a speed limit of 35 mph. The third segment 1015 has the name "Saltair Ave", a speed limit of 35 mph, and 2 lanes, and is characterized as a minor road. If the initial incoming segment is the third segment 1015, then the segment 1010 would be the higher-scoring road segment of the two possible continuations. However, for the second segment 1010, the third segment 1015 will not be the optimal road continuation, as the first segment 1005 will have a much higher continuation score (the angle, road name, road type, and number of lanes are the same, and the only difference is the 5 mph in speed limit). As such, the optimal result at this junction 1020 is for the road of which the third segment 1015 is a part to terminate, with the first segment 1005 and second segment 1010 linked together as a single road. Other embodiments do not perform the reciprocity test, but instead set a high enough threshold that bad matches are unlikely. Furthermore, while traversing the road graph, some embodiments allow a segment to be moved from one aggregate road to another when a better match occurs later in the traversal (e.g., if road segment 1015 is found to continue on into road segment 1010, but then the junction 1020 is reached again via road segment 1005, the segment 1010 may be moved from the first road to a new road that also contains road segment 1005.

FIG. 8 illustrates a road data structure 810 of some embodiments. As shown, the road data structure 810 includes an ordered list of edges (through which the road object contains references to its constituent segments). In addition, the road structure contains functionality to evaluate the road centerline and the sides of the road at any point along the road. In some embodiments, the centerline functionality exists as a function of the road class that refers to the centerline information of the constituent segments (and may also interpolate between any slightly mismatched centerlines). The side of road functionality also exists as a function of the road class, that uses the side of road function from the road segment objects contained by the road object.

Returning to FIG. 7, after combining the road segments, the process 700 derives (at 725) additional road description data. In some embodiments, this involves filling in missing data in the road segment information. As some embodiments implement the road segments (and other data) as objects, in some cases the object variables will have null values because the data has not been provided by the map data provider. For instance, speed limit data, road width, number of lanes, or other parameters may be missing. Some embodiments automatically fill in values for at least some of the missing data of a road segment when possible, either using other information from the road segment or information from neighboring road segments. For example, some embodiments might fill in missing speed limit information for a road segment based on the speed limits of the neighboring segments (e.g., if a first segment has a speed limit of 55 mph and a third segment has a speed limit of 35 mph, then the middle segment could be filled in with a 45 mph speed limit).

Other embodiments only fill in data necessary for generating the road geometry, such as the number of lanes and road width information. For example, some embodiments may use neighboring road segments within an aggregated road to generate the number of lanes (e.g., if segments on either side of a particular segment have a particular number of lanes, that particular number of lanes may be assigned to the particular segment as well). For the road width, some embodiments use the number of lanes (if it exists) to assign a width to the road (e.g., assume that each lane is 4 meters wide). On the other hand, some embodiments assign road widths based on the road type (i.e., freeways have a first width, major arterials have a second width, etc.). In fact, some embodiments derive the number of lanes from the road type (e.g., freeways always assigned three lanes, etc.), then generate the width based on the number of lanes.

In addition, some embodiments fill in missing data for height, or elevation, information. As described above, in some cases the map data specifically indicates that a particular road segment passes over (or under) another road segment, or over (or under) a junction, or that a particular junction passes over (or under) another junction. However, this relative elevation data may be missing in some cases. When a first segment (or junction) and second segment (or junction) have centerline paths that intersect in a flat plane, but for which no junction is defined, then the paths must be at different elevations. When the absolute elevation data is included from the map data provider, this data can be used to ascertain the relative elevation data (i.e., defining a relationship that a first segment with lower absolute elevation passes under a second segment with a higher absolute elevation.

Figure 11:
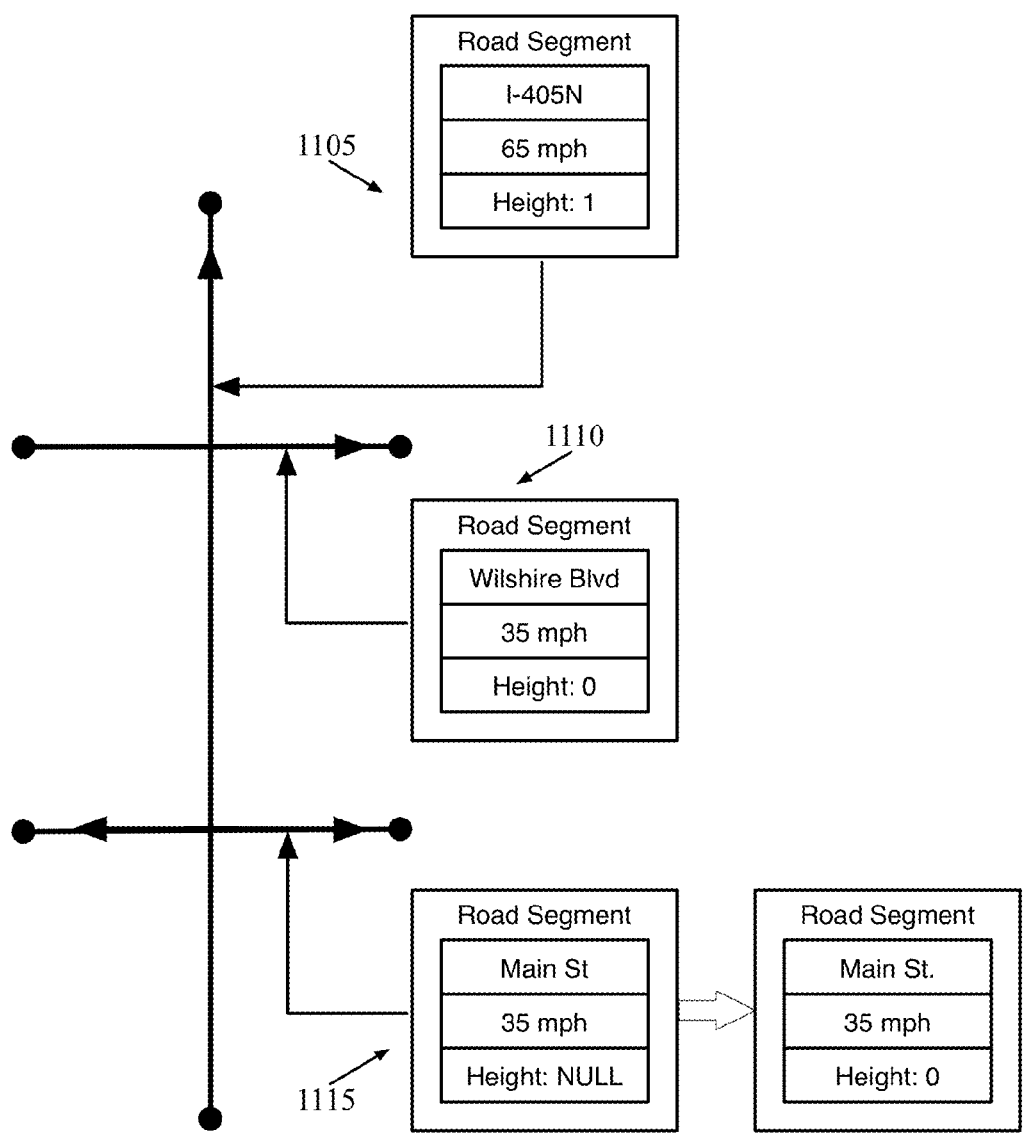
FIG. 11 illustrates a situation in which a first road segment is intersected (in a plane) by a second road segment and a third road segment.

When relative elevation data cannot be ascertained for a particular set of road segments that intersect in the plane but do not meet at a junction, some embodiments create a random relative ordering for segments. In other embodiments, a likely relative ordering may be derived from road types of the non-intersecting roads, but may also use attributes of other nearby road segments. FIG. 11 illustrates a situation in which a first road segment 1105 ("I-405N") is intersected (in a plane) by a second road segment 1110 ("Wilshire Blvd.") and a third road segment 1115 ("Main St."). However, in this case the map data does not indicate any junctions between these road segments. The I-405N segment has a height of 1 while the Wilshire segment has a height of 0. However, the Main St. segment has a null height (i.e., this information is not provided). Based on the fact that the I-405N segment travels over the Wilshire Blvd. segment, some embodiments also assume that the I-405N will travel over Main St. As such, the mapping service operations automatically fill in the height of the road segment data structure for Main St. with a value of 0, or will fill in a relative ordering indicating that the segment of Main St. travels under the segment of I-405N.

Figure 12:
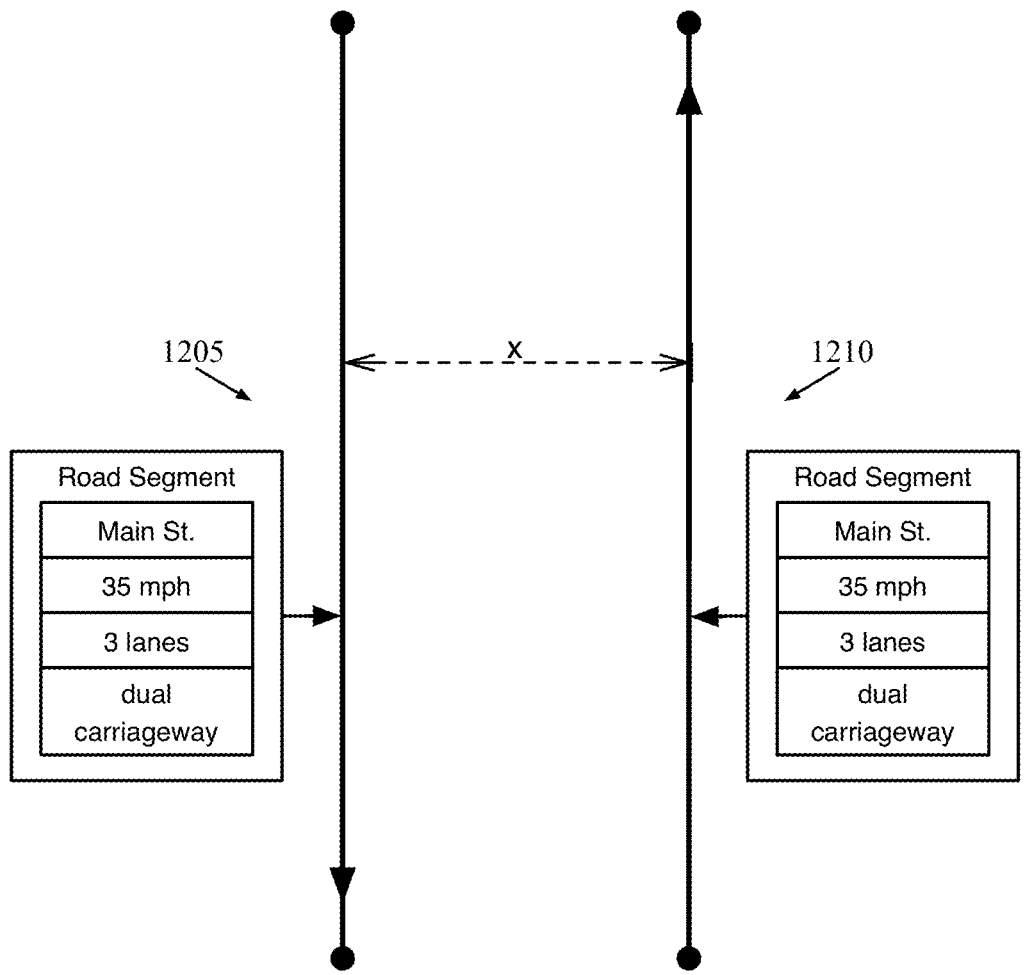
FIG. 12 illustrates two road segments that are a distance X apart, run parallel in opposite directions, and have the same name.

Additionally, the process 700 establishes (at 730) relationships between roads and road segments. In some embodiments, establishing relationships includes identifying semantic data, such as opposite sides of dual carriageway, and defining links between the related roads. In some embodiments, the process identifies roads containing road segments with the same or similar names (e.g., "I-5 N" and "I-5 S"), that are marked as dual carriageways (i.e., in a form of way field), and that are within a threshold distance of each other and a threshold angle of being parallel. FIG. 12 illustrates two road segments 1205 and 1210 that are a distance X apart, run parallel in opposite directions, and are both named "Main St." Assuming that the distance X is less than the threshold distance for roads with the same name, then these roads will be linked as associated dual carriageways, and turns between the roads can be classified as U-turns rather than separate left turns. Additional semantic data that may be propagated includes assigning names to connector/slip roads (e.g., freeway entrances, freeway interchanges, right turn slip roads, etc.).

Lastly, the process 700 generates (at 735) a smoothed version of the roads. In some embodiments, the centerline data may have noise. For instance, a five mile stretch of freeway may in actuality be straight, but the data may have slight back and forth in places. In addition, as the roads are defined as lines between centerline vertices, kinks might appear where the road has a smooth turn in reality. Furthermore, when road segments are joined at junctions, this may create sharp turns that should be smoother in reality. As this sort of noise is unwanted, some embodiments apply a smoothing operation, controlled by road properties, to the roads (e.g., either one road segment at a time, or to aggregate roads) in the road graph. To perform the smoothing, various different operations may be performed by different embodiments. Some embodiments use smoothing operations that move each vertex in the road a distance based on the locations of its neighbor vertices (e.g., Laplacian smoothing).

Figure 13:
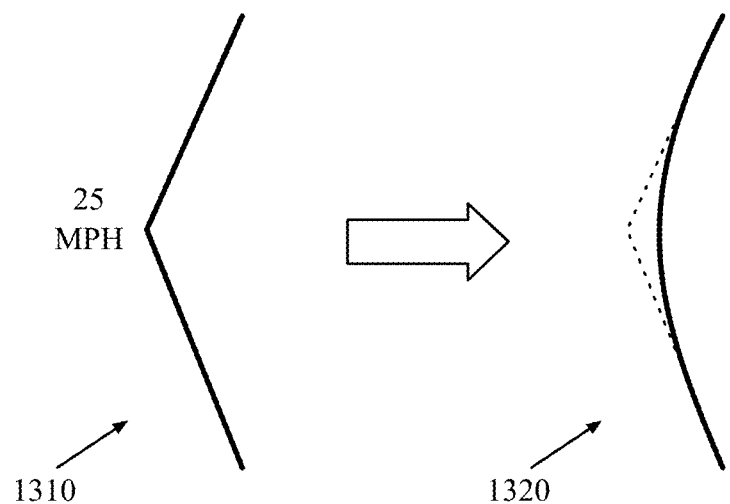
FIGS. 13 and 14 illustrate similarly kinked roads that have speed limits of 25 mph and 60 mph.
Figure 14:
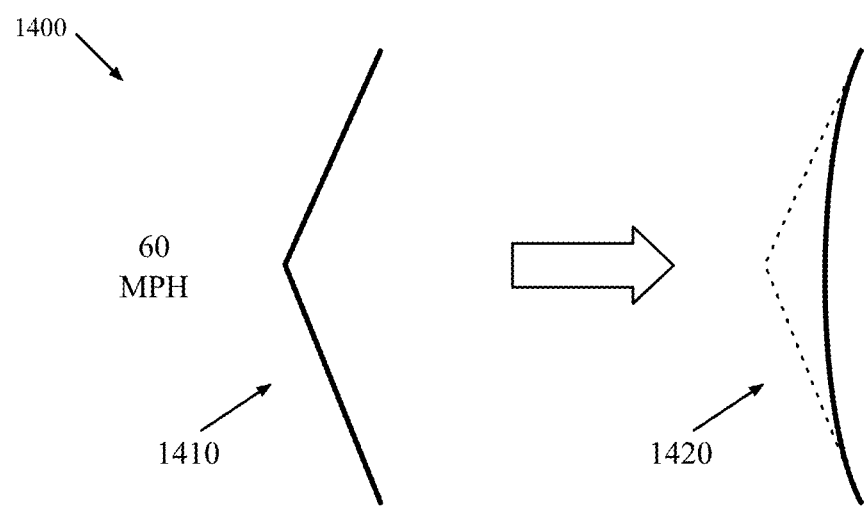

Some embodiments allow more smoothing for faster roads, because of the expectation that these roads (e.g., freeways) will be smoother and less likely to have sharp angles. Some embodiments use the speed limit data to control the smoothing. For example, some embodiments allow different deviations of the centerline from the received vertex data for roads with different speed limits (e.g., allowing up to a 5 meter deviation for speed limit 65 roads, and a 2 meter deviation for 30 mph roads). FIG. 13 illustrates a kinked road 1310 that has a speed limit of 25 mph. The result of applying the smoothing operation to the road is illustrated as modified road 1320. FIG. 14, on the other hand, illustrates a similarly kinked road 1410 with a speed limit of 60 mph. The result of applying a similar smoothing operation to the road is illustrated as modified road 1420. As shown, the modified road 1420 illustrates a greater level of curve smoothing because the speed limit of the road is larger. Some embodiments use other properties to modify the level of smoothing allowed, such as road types (which can serve as a proxy for speed limit).

In addition, some embodiments limit smoothing in special cases. For instance, a road might make a 90° turn (e.g., where two roads both end at a junction in a residential neighborhood, and have been joined together). In such a case, rather than smoothing the road too much, some embodiments fix two points close to the junction (one on either side of the 90° turn) and smooth a small elbow between these two points.

B. Generating Road Geometry

After generating the road graph from road segments and junctions, aggregating roads in the road graph, filling in missing data, smoothing the aggregate roads, etc., the offline processing of the mapping service of some embodiments generates geometry for the roads in the road graph. In some embodiments, the geometry comprises a set of vertices that define the edges of polygons to be rendered by the client mapping application. These geometries are included in vector map tiles that are sent to devices running mapping applications in order for the mapping applications to render the resultant polygons. The mapping service processing initially bases the geometry off of the road segment definitions (i.e., the centerline vertices and width data), but also performs various adjustment operations on the geometry, such as smoothing the polygons to create more realistic rendered roads and intersections, eliminating overlaps, and annotating vertices with data that marks features to draw (e.g., shadows, bridge casings, curbs, sidewalks, tunnels, etc.).

Figure 15:
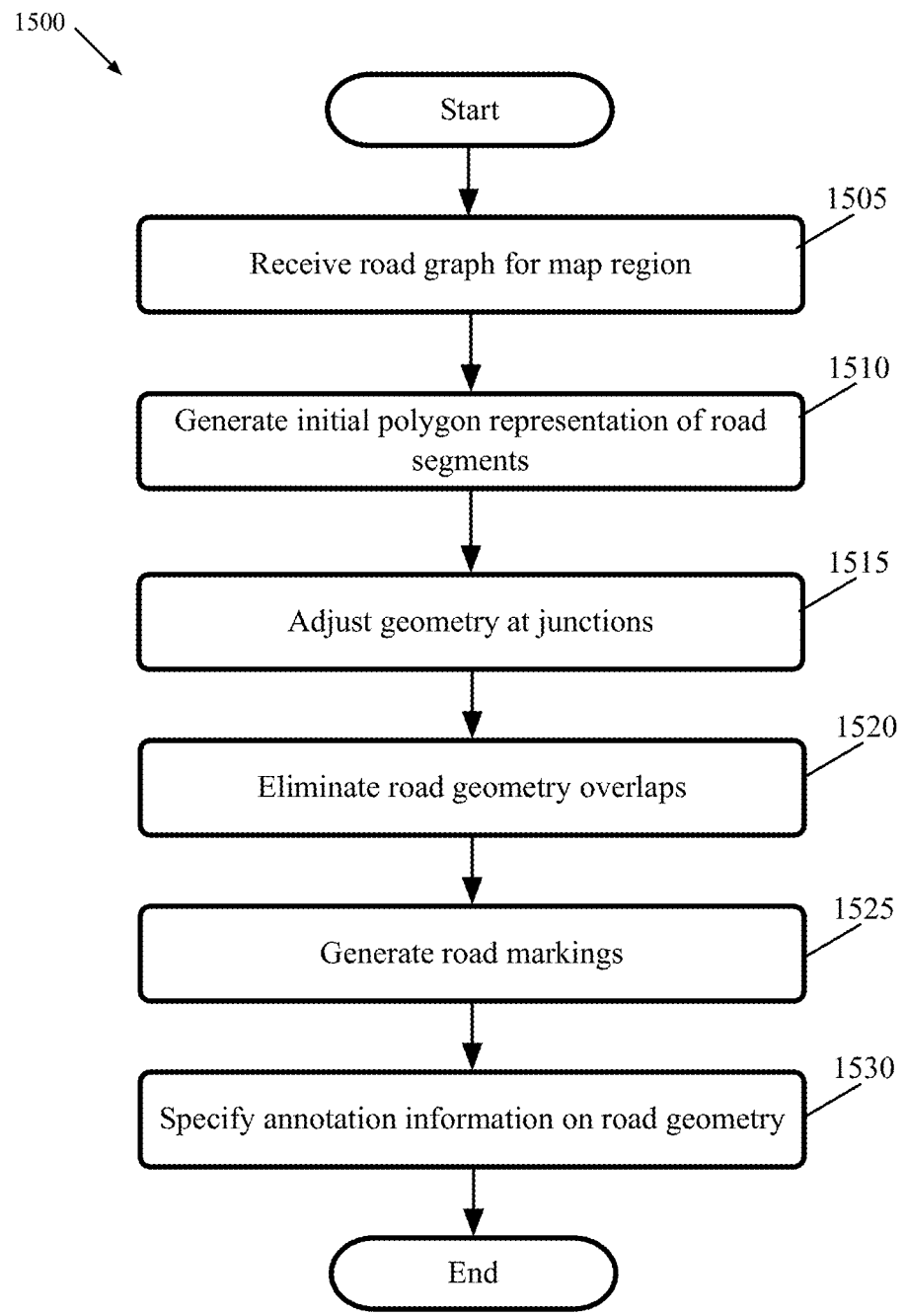
FIG. 15 conceptually illustrates a process of some embodiments for generating the road geometry to be used for generating road polygons on the client mapping application.

FIG. 15 conceptually illustrates a process 1500 of some embodiments for generating the road geometry to be used for generating road polygons on the client mapping application. As with the process 700, various embodiments perform the process 1500 as an offline process that may be performed on a single computing device or distributed across several computing devices.

As shown, the process 1500 begins by receiving (at 1505) a road graph for a map region. The road graph, as described above and shown in FIG. 8, is a connected set of road segments and junctions. In some embodiments, the process 700 (or a similar road graph generation process) is run separately for different map regions (e.g., for states, rectangular geographic areas, land masses, etc.).

The geometry generation process 1500 generates (at 1510) an initial polygon representation of the road segments in the road graph. Some embodiments expand the piecewise linear centerline representation (which should be reasonably smooth after inserting vertices at a regular distance and then smoothing these vertices, in a process such as process 700 described above) into a polygon that follows the path of the road, having the width specified by its road segment data structure. The resulting polygon is, essentially, a structure with parallel sides that may appear to be curved. However, these polygons will need to be adjusted in many situations in order to generate a more realistic road animation.

The polygon adjustment, in some embodiments, includes smoothing the polygons to create more realistic rendered roads and junctions, eliminating overlaps, and annotating vertices with data that marks features to draw (e.g., shadows, bridge casings, curbs, tunnels, etc.). The next several operations in process 1500 describe these adjustment operations in a particular order. However, one of ordinary skill in the art will recognize that the once the initial polygons are grown, these operations may be performed in various different orders.

The process 1500 adjusts (at 1515) the geometries at junctions. In general, with the exception of overlaps between two or more geometries, the smoothing is primarily required at the junctions of the road graph. Within a road segment, the smoothing of the vertices described above should prevent any sort of obtrusions or irregularities. Some embodiments traverse the road graph and, at each junction, determine whether any modifications to the geometry are necessary to ensure a smooth, appealing rendered road at the client mapping application (and then make those modifications). These junctions may involve nothing more than a road continuing in a straight line where the speed limit changes (which will not involve any smoothing in some embodiments if the road width stays constant), but may also include freeway merges, roads intersecting at various angles, intersections between large and small roads (of which a freeway merge is one example), lane expansions, etc.

The following will describe various types of these junction smoothing examples, along with figures for some of the examples. When a road expands or contracts its number of lanes, some embodiments perform a particular smoothing operation. In some embodiments, the mapping service processing first determines whether a junction includes only two edges, and then that those two edges are connected within a road. If this is the case, and the number of lanes changes, then some embodiments perform one of the following transition smoothing operations to prevent unnatural-looking sharp angles.

Figure 16:
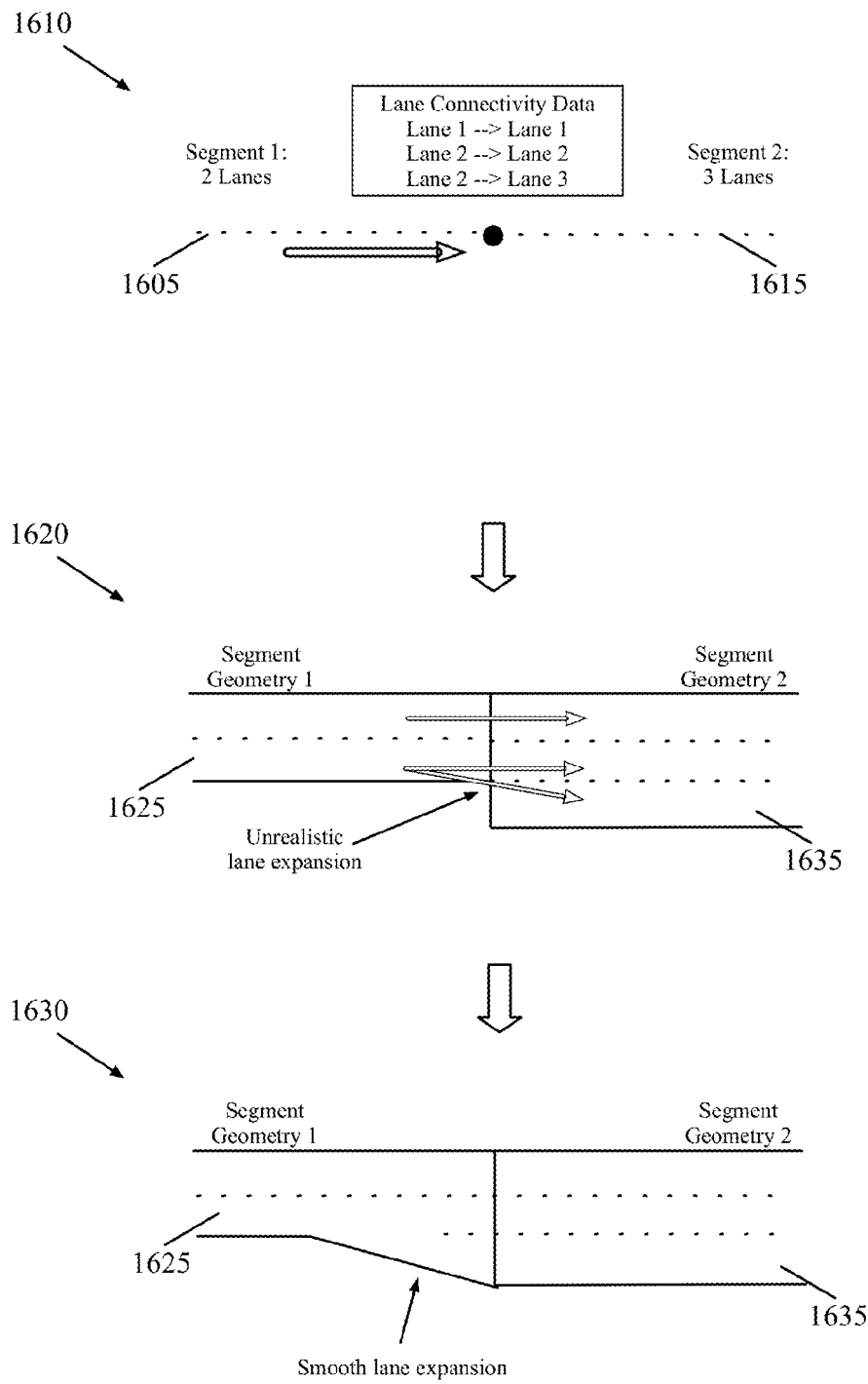
FIG. 16 illustrates an operation performed to smooth a lane expansion junction in which one of the sides of the roads stays straight (i.e., is "justified").

FIG. 16 illustrates a first operation performed to smooth a lane expansion junction in which one of the sides of the roads stays straight (i.e., is "justified"), over three stages 1610-1630. As shown in the first stage 1610, in this example a first road segment 1605 connects into a second road segment 1615. The first road segment 1605 has data indicating that it has two lanes, while the second road segment 1615 has data indicating that it has three lanes. In some cases, this data is indicated in the road segment data received from the map data provider. When the map data provider includes lane information, in some cases the provider additionally includes lane connectivity data. In some cases, the lanes are numbered (e.g., from left to right), and the connectivity data indicates which lane in a first segment (e.g., segment 1605) continues into which lane in a second segment (e.g., segment 1615). As shown in the first stage 1610, in this case lane 1 of the first segment 1605 continues into lane 1 of the second segment 1615, while lane 2 of the first segment continues into both lanes 2 and 3 of the second segment. This indicates that the lane expansion occurs on the right side of the road ("right" based on the travel direction of the road). This lane connectivity data may be stored with the junction, or with one or both of the segments in various embodiments.

The second stage 1620 illustrates the initially-grown segment geometries 1625 and 1635 for the first and second road segments. As can be seen, the second segment geometry 1635 is wider than the first segment geometry 1625, and all of this additional width is at the right side of the road, with the left side of the road justified. When lane connectivity data is provided, some embodiments generate the geometry with the additional lane appearing in the correct location. However, when rendered using this geometry, the asphalt would appear to have a 90 degree angle, with the lane appearing out of nowhere. While occasionally freeway lanes do start in this manner, typically they expand smoothly out of the existing lane.

Thus, some embodiments automatically taper the lane expansion, as shown in the third stage 1630. Some embodiments identify a point along the edge of the narrower segment geometry (the geometry with fewer lanes) and taper from this point to the start of the edge of the wider segment. Some embodiments use a fixed distance to identify the point (e.g., 25 meters, 50 meters, etc.). The taper may be a straight line, as shown, or a curve. In addition, some embodiments employ the transition within the wider geometry, or spread the transition across the two geometries.

Figure 17:
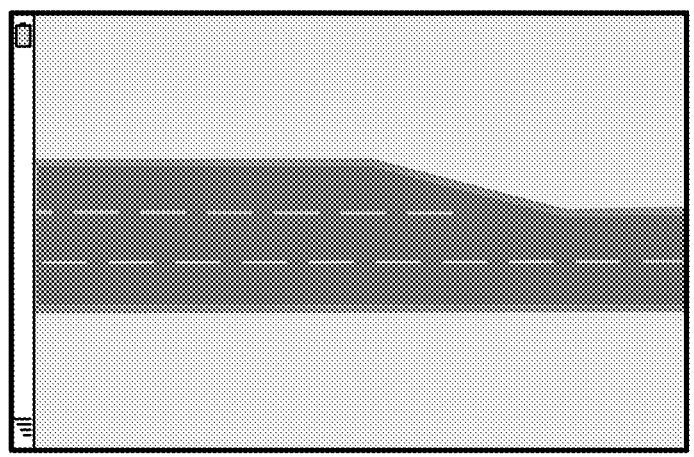
FIG. 17 illustrates the result of the smoothed lane expansion from FIG. 16 as rendered by a client mapping application of some embodiments.

FIG. 17 illustrates the result 1700 of the smoothed lane expansion as rendered by a client mapping application of some embodiments (e.g., on the display of a portable device). For this figure, as well as a number of figures within this section, the result of specific road segments as rendered on a client mapping application are shown. In these figures, various controls and features that would typically be present in the mapping application display (e.g., a user location indicator (or navigation puck), a route line, additional land cover and building features, UI controls, etc.) are not displayed, so as to highlight the various aspects of the road segments. In FIG. 17, the asphalt makes a smooth transition from two to three lanes, and lane markings begin a bit before the lane is fully formed. As will be described below, some embodiments add road casing (e.g., curbs, guardrails, etc.) and lane markings. In different embodiments, the instructions for drawing the road casing may be communicated to the client mapping applications as additional geometries or as annotations to the geometry, with instructions for rendering based on the annotation stored at the client device.

Figure 18:
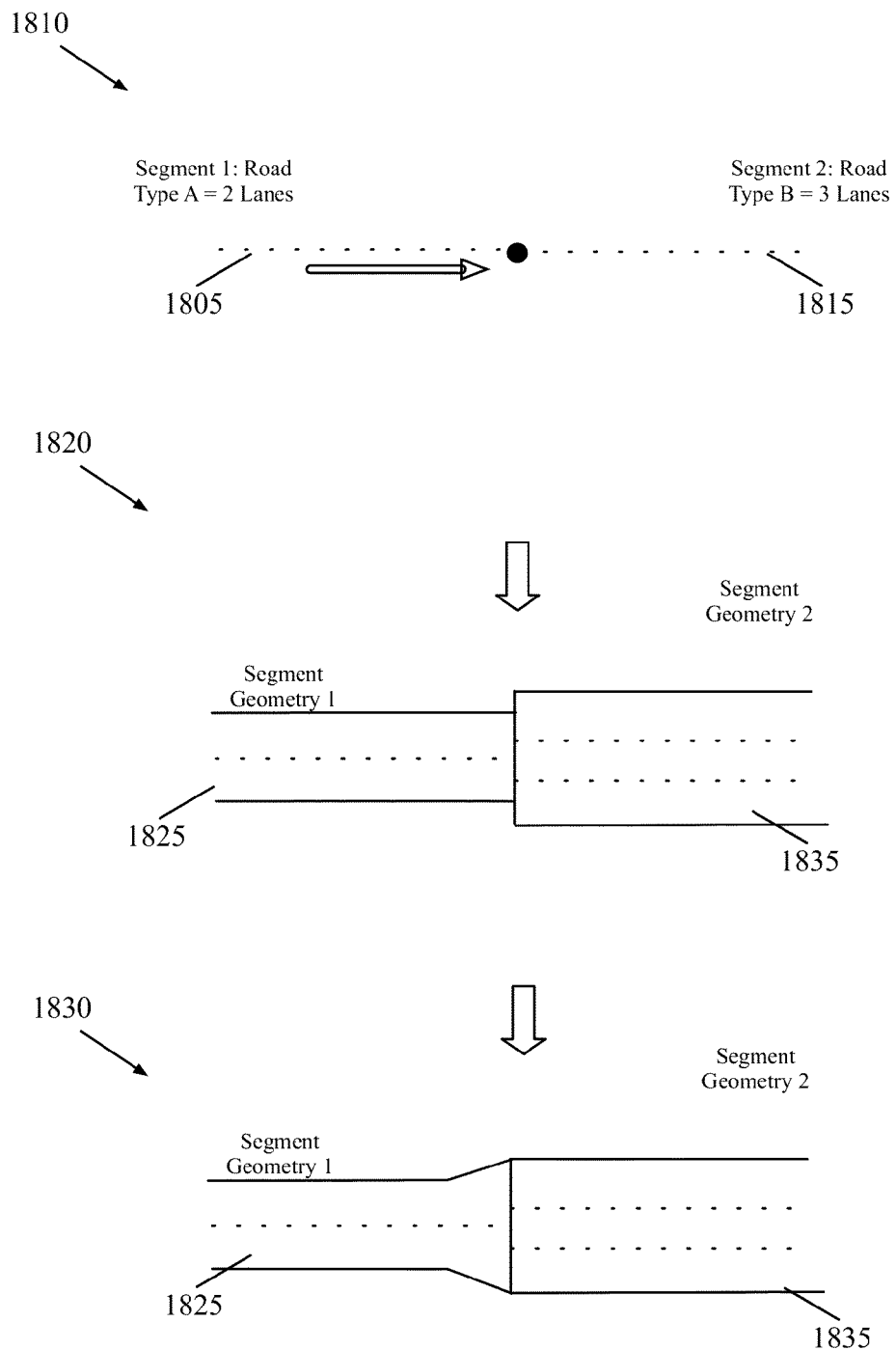
FIG. 18 illustrates an operation performed to smooth a lane expansion junction in which the road expands at both sides.

FIG. 18 illustrates a second operation performed to smooth a lane expansion junction in which the road expands at both sides, over three stages 1810-1830. As shown in the first stage 1810, in this example a first road segment 1805 connects into a second road segment 1815. In this case, there is no lane connectivity data, but the first road segment 1805 has two lanes while the second road segment 1815 has three lanes. The lane count data may be provided directly from the map provider, or derived from either the provided road width or the road type.

The second stage 1820 illustrates the initially-grown segment geometries 1825 and 1835 for the first and second road segments. As can be seen, the second segment geometry 1835 is wider than the first segment geometry 1825, with the additional width split between the two sides of the road. When no lane connectivity data is available, some embodiments use a default lane expansion that splits the difference between the two sides of the road. However, when rendered using this geometry, the asphalt would appear to have a 90 degree angle on either side. While occasionally freeway lanes might start in this manner, typically they expand smoothly out of the existing lane.

Thus, some embodiments automatically taper the lane expansion on either side, as shown in the third stage 1830. Some embodiments identify, for each side of the road, a point along the edge of the narrower segment geometry and taper from this point to the start of the edge of the wider segment. Some embodiments use a fixed distance to identify the point (e.g., 25 meters, 50 meters, etc.). The taper may be a straight line, as shown, or a curve. In addition, some embodiments employ the transition within the wider geometry, or spread the transition across the two geometries.

Figure 19:
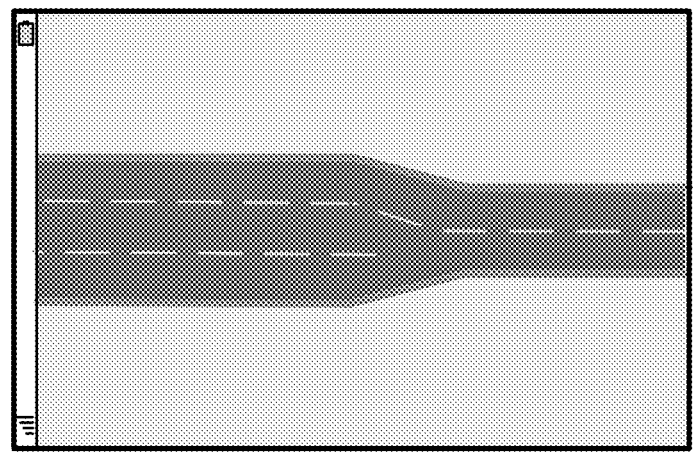
FIG. 19 illustrates the result of the smoothed lane expansion from FIG. 18 as rendered by a client mapping application of some embodiments.

FIG. 19 illustrates the result 1900 of the smoothed lane expansion as rendered by a client mapping application (e.g., on the display of a portable device). The asphalt makes a smooth transition from two to three lanes. Some embodiments bend two of the lanes in one direction and add the new lane on the other side in order to keep the lane markings continuous in some embodiments (e.g., choosing a random side for the new lane, or using a default).

The above examples are situations in which the junction in question only has two road segments. For junctions with three or more road segments, some embodiments identify special cases, and for other cases step through the list of road segments in the junction and perform corrections on geometries for subsequent pairs of roads. One such special case occurs when a bi-directional single carriageway road splits into a pair of corresponding dual carriageways. This often occurs when a median is introduced into a two-lane road (one lane in either direction). Some embodiments taper the road outwards (from the single carriageway to the dual carriageway) at the outer edges, and identify a merge point for the internal edges of the two dual carriageways. Some embodiments use lane information to determine the merge point (e.g., if one of the dual carriageways is one lane while the other is two lanes), while other embodiments use a default of a point at the center of the single carriageway, at its end.

When stepping through the list of road segments at a junction, some embodiments perform different corrections based on the angle between two segments. Some embodiments select a first road segment of the junction, then correct the corner formed by the left side of the segment geometry (as viewed exiting the junction) with the right side of the segment geometry (as viewed exiting the junction) for a second segment directly counterclockwise from the first segment. The second segment is then set as the first segment, and the process repeated for the next corner, until all of the corners have been corrected.

The following will describe various corrections performed for various junction angles, along with figures for some of the examples. These figures, though illustrating junctions with several road segments, show the geometries for only the two segment that are conformed to each other in the example.

Figure 20:
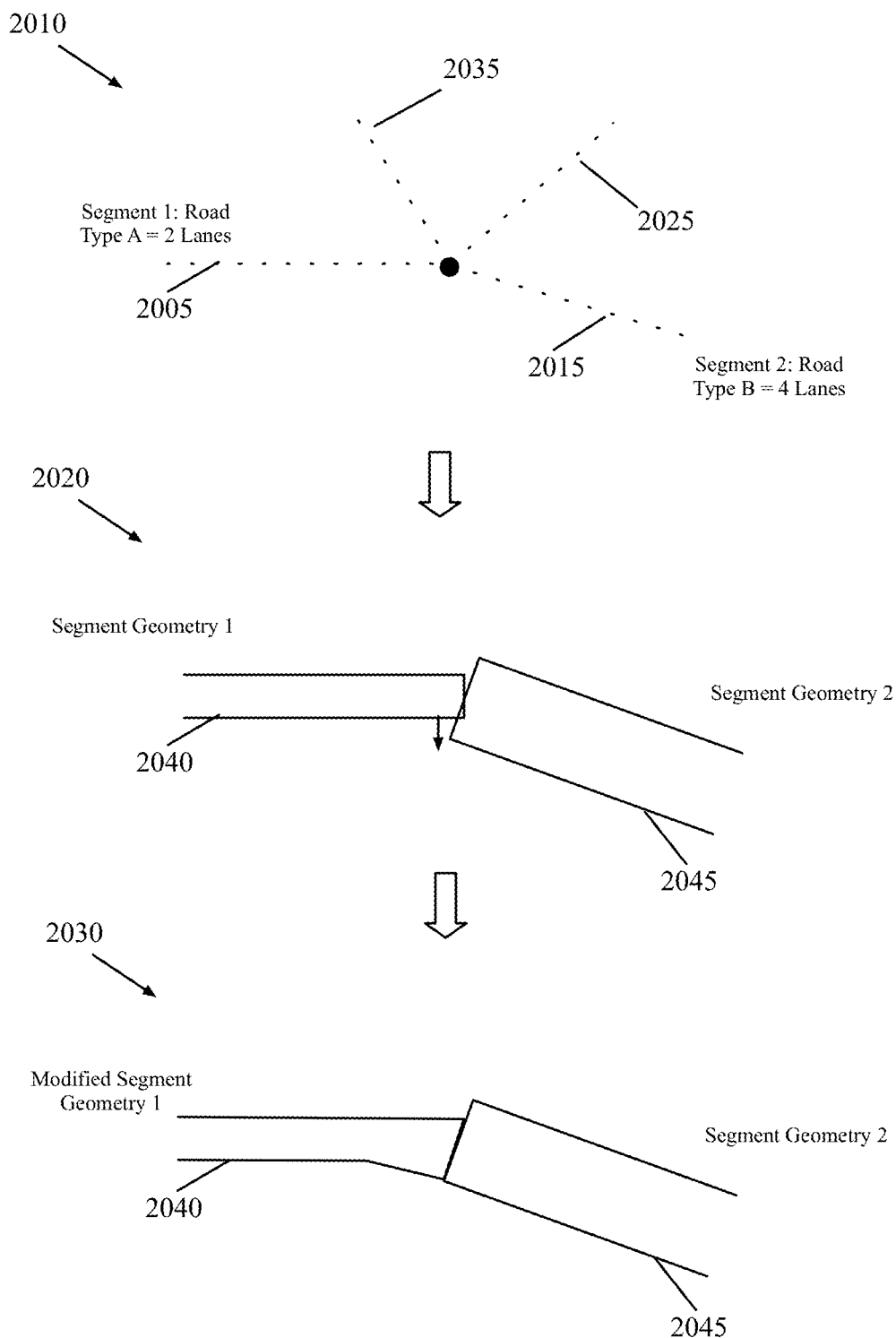
FIG. 20 illustrates a tapering operation performed to smooth a corner between road segment geometries when the angle between the segments is greater than a first threshold angle.

FIG. 20 illustrates a tapering operation performed to smooth a corner between road segment geometries when the angle between the segments is greater than a first threshold angle (e.g., 170°), over three stages 2010-2030. In such a case, some embodiments automatically taper the side of one of the roads to meet the side of the other road. As shown in the first stage 2010, in this example a first road segment 2005 intersects with a second road segment 2015 at a junction, as well as with two additional road segments 2025 and 2035.

The second stage 2020 illustrates the initially-grown segment geometries 2040 and 2045 for the two road segments 2005 and 2015. The geometries for the other two road segments are not illustrated in this figure, as the mapping service processing of some embodiments corrects one corner of the junction at a time, and this example illustrates the correction between the segments 2005 and 2015. The mapping service processing of some embodiments would then perform a correction on the corner between segment 2015 and segment 2025, a correction on the corner between segment 2025 and segment 2035, and finally a correction on the corner between segment 2035 and segment 2005. As shown at this second stage 2020, the initial corner between geometry 2040 and geometry 2045 involves a visually jarring (and unrealistic) discontinuity, owing in part to the roads having different widths (although some embodiments perform the same process for roads of the same width).

Thus, some embodiments automatically taper the side of the narrower road segment to the side of the wider road segment, as shown by the modified geometry 2040 in the third stage 2030. In this case, because the wider segment is the more counterclockwise of the two road segments, the processing tapers the left side of the narrower segment to the right side of the wider segment (for this and subsequent examples, the "right" and "left" sides of a particular road segment are viewed from the perspective of a vehicle leaving the junction along the particular road segment). When the wider segment is the more clockwise of the two segments, the processing tapers the right side of the narrower segment to the left side of the wider segment. To perform the tapering operation, some embodiments fix a point along the side of the narrower segment geometry and taper from this point to the start of the side of the wider geometry. Some embodiments use a fixed distance to identify the point (e.g., 25 meters, 50 meters, etc.). The taper may be a straight line, as shown, or a curve. This operation is similar to the tapering illustrated in FIG. 16, and may also be performed when only two roads of different widths meet at a junction.

Figure 21:
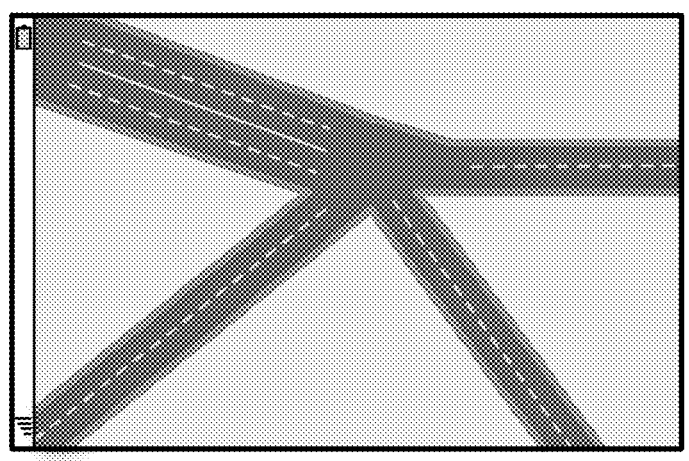
FIG. 21 illustrates the result of the smoothed junction from FIG. 20 as rendered by a client mapping application of some embodiments.

FIG. 21 illustrates the result 2100 of the smoothed junction as rendered by a client mapping application of some embodiments (e.g., on the display of a portable device). The asphalt indicates a smooth right turn from the first road segment (shown at the bottom of the display) to the second, wider segment (shown at the top right of the display). In addition, the display includes asphalt (and lane markings, road casing, etc.) for the other two segments that form the intersection. In different embodiments, the instructions for drawing the road casing may be communicated to the client mapping applications as additional geometries or as annotations to the geometry, with instructions for rendering based on the annotation stored at the client device.

Figure 22:
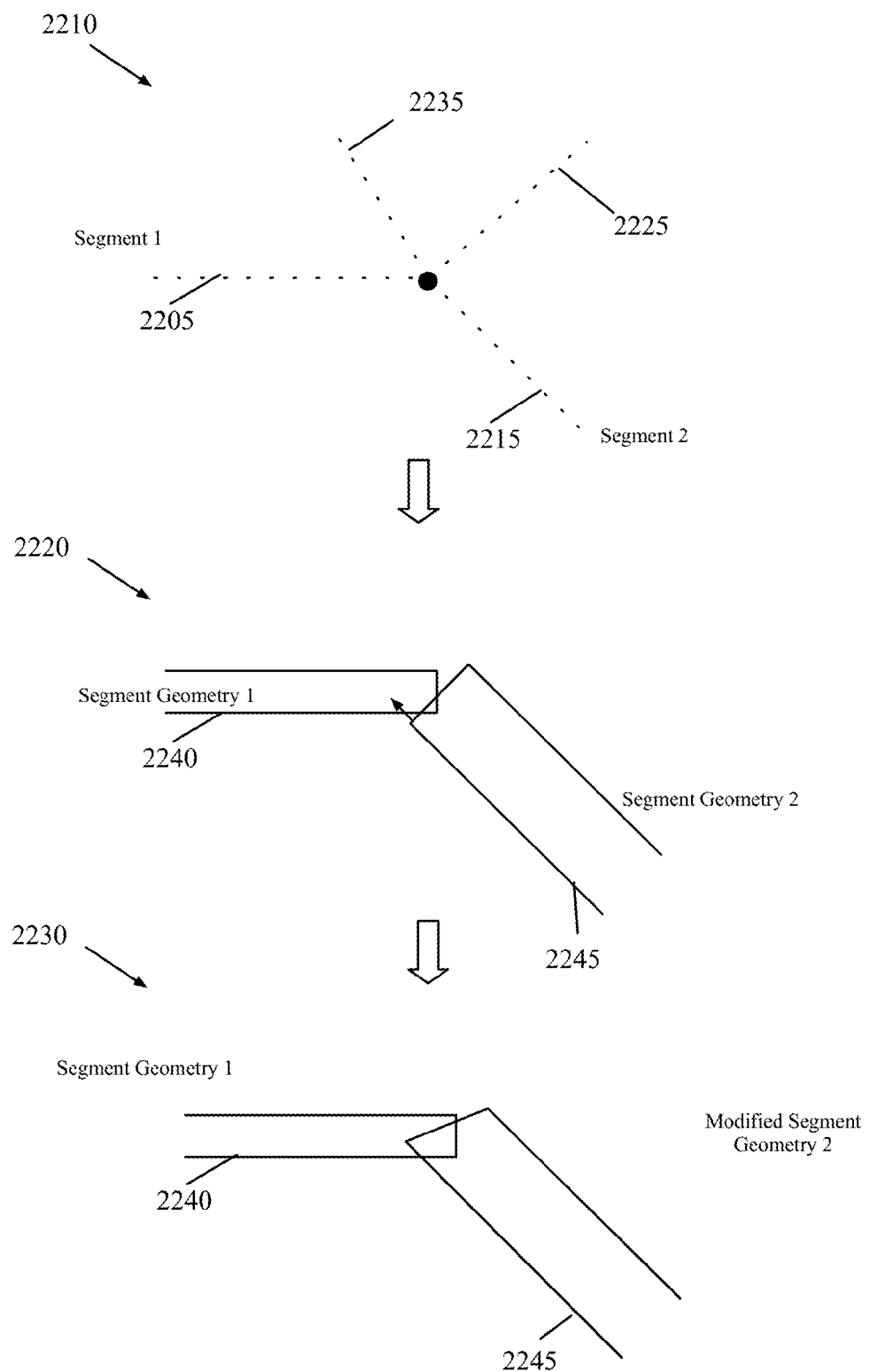
FIG. 22 illustrates a projection operation performed to smooth a corner between road segment geometries when the angle between the segments is less than a first threshold angle and greater than a second threshold angle.

FIG. 22 illustrates a projection operation performed to smooth a corner between road segment geometries when the angle between the segments is less than a first threshold angle and greater than a second threshold angle (e.g., between 120° and 170°), over three stages 2210-2230. In such a case, some embodiments automatically project the side of one of the roads to meet the side of the other road. As shown in the first stage 2210, in this example a first road segment 2205 intersects with a second road segment 2215 at a junction, as well as with two additional road segments 2225 and 2235.

The second stage 2220 illustrates the initially-grown segment geometries 2240 and 2245 for the two road segments 2205 and 2215. The geometries for the other two road segments are not illustrated in this figure, as the mapping service processing of some embodiments corrects one corner of the junction at a time, and this example illustrates the correction between the segments 2205 and 2215. The mapping service processing of some embodiments would then perform a correction on the corner between segment 2215 and segment 2225, a correction on the corner between segment 2225 and segment 2235, and finally a correction on the corner between segment 2235 and segment 2205. As shown at this second stage 2220, the initial corner between geometry 2240 and geometry 2245 involves a visually jarring (and unrealistic) discontinuity, owing in part to the roads having different widths (although some embodiments perform the same process for roads of the same width).

Whereas for the angle between the geometries shown in FIG. 20 the mapping service processing of some embodiments tapers the narrower road to the wider road, in this example the mapping service processing projects the side of the wider road onto the narrower road, as shown by the modified geometry 2240 in the third stage 2230. In this case, because the wider segment is the more counterclockwise of the two road segments, the processing projects the right side of the geometry 2245 onto the centerline (or the left side, in some embodiments) of the geometry 2240. When the wider segment is the more clockwise of the two road segments, the processing projects the left side of the wider segment onto the centerline (or right side, in some embodiments) of the narrower segment. Whereas the tapering operation involves changing the angle of the side of one of the segments, the projection simply extends the projected side in some embodiments, as shown in stage 2230.

Figure 23:
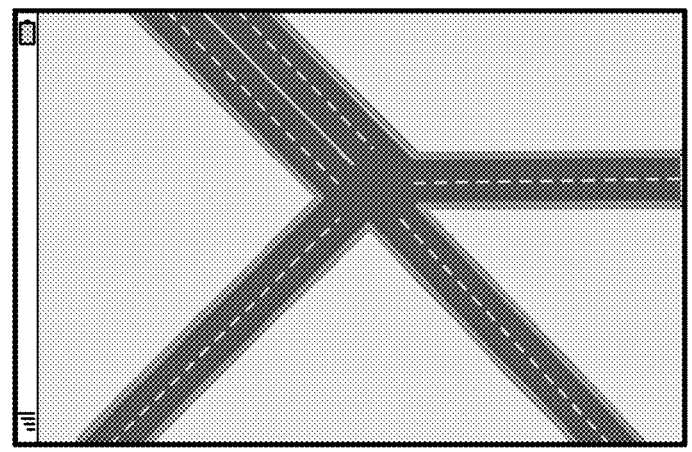
FIG. 23 illustrates the result of the smoothed junction from FIG. 22 as rendered by a client mapping application of some embodiments.

FIG. 23 illustrates the result 2300 of the smoothed junction as rendered by a client mapping application of some embodiments (e.g., on the display of a portable device). The asphalt indicates a smooth right turn from the first road segment (shown at the bottom of the display) to the second, wider segment (shown at the top right of the display). In addition, the display includes asphalt (and lane markings, road casing, etc.) for the other two segments that form the intersection. In different embodiments, the instructions for drawing the road casing may be communicated to the client mapping applications as additional geometries or as annotations to the geometry, with instructions for rendering based on the annotation stored at the client device.

Figure 24:
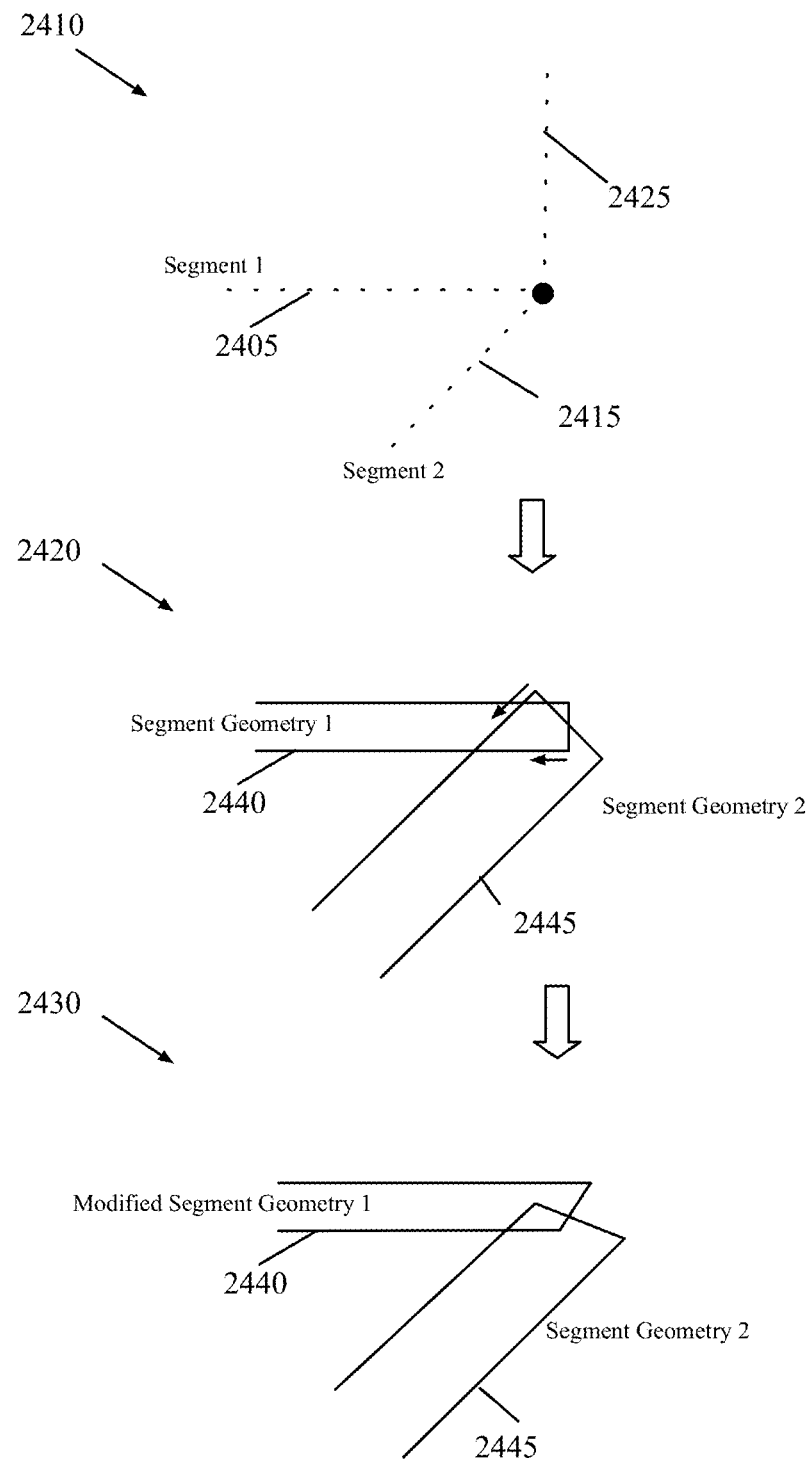
FIG. 24 illustrates a clipping operation performed to eliminate excess road for road segment geometries when the angle between the segments is less than a first threshold angle and greater than a second threshold angle.

FIG. 24 illustrates a clipping operation performed to eliminate excess road for road segment geometries when the angle between the segments is less than a first threshold angle and greater than a second threshold angle (e.g., between 30° and 80°), over three stages 2410-2430. In such a case, some embodiments automatically clip the side of one or both of the roads to avoid overshooting the other road. As shown in the first stage 2410, in this example a first road segment 2405 intersects with a second road segment 2415 at a junction, as well as with an additional road segment 2425.

Figure 25:
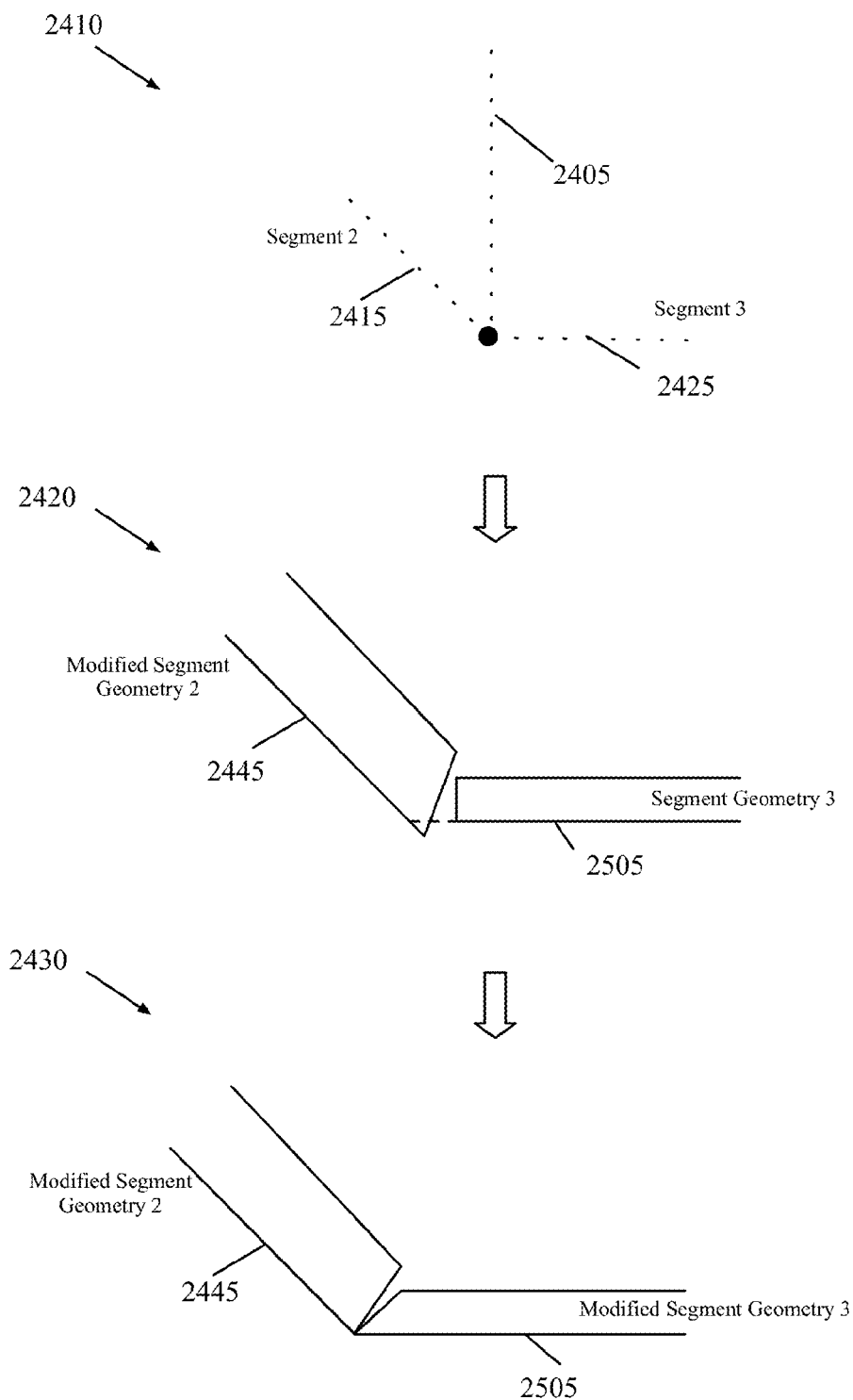
FIG. 25 illustrates an intersection operation performed to smooth a corner between two road segment geometries.

The second stage 2420 illustrates the initially-grown segment geometries 2440 and 2445 for the two road segments 2405 and 2415. The geometry for the other road segment is not illustrated in this figure, as the mapping service processing of some embodiments corrects one corner of the junction at a time, and this example illustrates the correction between segments 2405 and 2415. FIG. 25, described below, illustrates the correction between segments 2415 and 2425. As shown at this second stage 2420, the initial corner between geometry 2440 and 2445 is not problematic, but the right side of the geometry 2445 overshoots the right side of geometry 2440, owing in part to geometry 2440 being narrower than geometry 2445.

Thus, the mapping service processing of some embodiments clips the left side of the more clockwise segment back to the centerline of the more counterclockwise of the two segments, and correspondingly clips the right side of the more counterclockwise segment back to the centerline of the more clockwise segment, as shown by the modified geometries 2440 and 2445 in the third stage 2430. In some embodiments, only the side of the wider road segment is clipped, but other embodiments clip both geometries as shown. As illustrated in the third stage 2430, this removes the excess "ear" of road that would otherwise be sticking out of the intersection unrealistically.

FIG. 25 illustrates an intersection operation performed to smooth a corner between the road segment geometry 2445 and a road segment geometry 2505 for the road segment 2425, over three stages 2510-2530. Some embodiments perform the intersection operation for angles greater than 180°, due to the gap left between the road segment geometries at such large angles. In such a case, some embodiments identify an intersection between the tangents of the road sides, and extend or clip the road geometries so that the sides end at this intersection point.

The second stage 2520 illustrates the segment geometry 2445 as modified in the operation shown in FIG. 24, as well as the initially-grown segment geometry 2505 for the road segment 2425. As shown, this (i) leaves a gap between the two geometries and (2) results in the wider segment 2445 overshooting the segment 2505. The second stage also illustrates a dashed line that represents the intersection of the projection of the left side of the more clockwise geometry 2445 with the projection of the right side of the more counterclockwise geometry 2505.

As shown in the third stage 2530, some embodiments either clip or project the sides of the geometries to this intersection point. In the case of the narrower segment 2505, the side is extended to fill in the gap, while in the case of the wider segment 2445, the side is clipped to prevent an overshoot of the geometry 2505.

Figure 26:
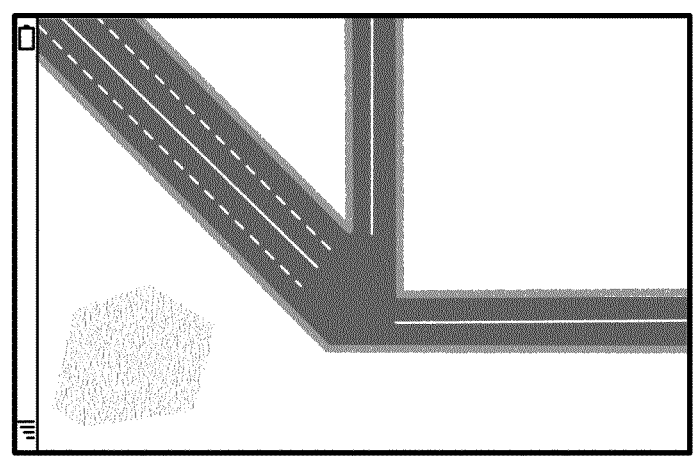
FIG. 26 illustrates the result of the smoothed junction from FIGS. 24 and 25 as rendered by a client mapping application of some embodiments.

FIG. 26 illustrates the result 2600 of the smoothed junction from the previous two figures as rendered by a client mapping application of some embodiments (e.g., on the display of a portable device). The asphalt indicates smooth turns between each of the subsequent roads, with no missing sections or excess bits of asphalt.

Figure 27:
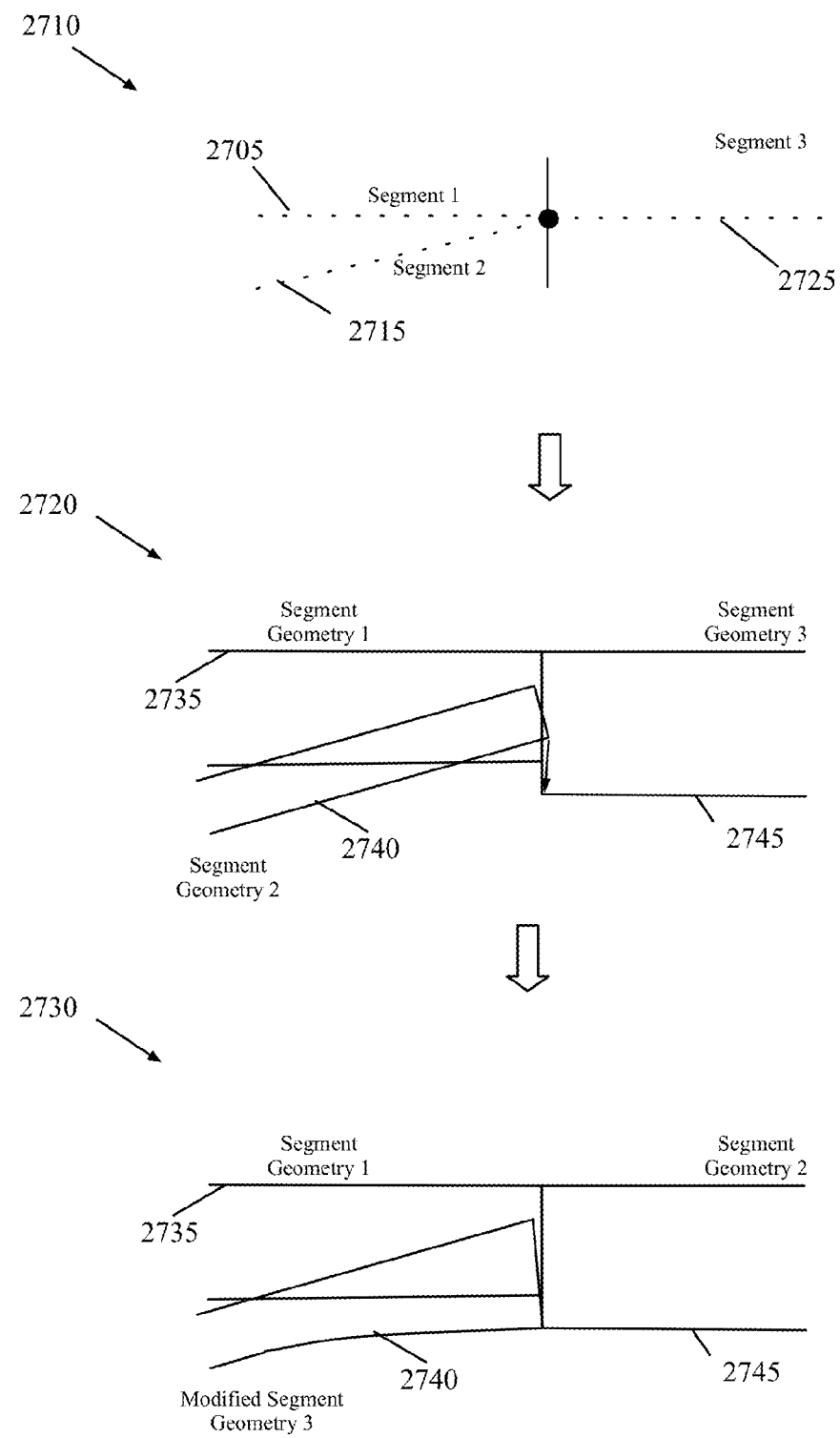
FIG. 27 illustrates a tapering operation performed to smooth a corner between road segment geometries in situations that fit characteristics of freeway on-ramps in some embodiments.

FIG. 27 illustrates a tapering operation performed to smooth a corner between road segment geometries in situations that fit characteristics of freeway on-ramps in some embodiments, over three stages 2710-2730. In this example, a first segment 2705 continues straight into a third segment 2725 at a junction, with a second segment 2715 entering the junction at a shallow angle relative to the first segment 2705. This situation fits the profile of a freeway merge in some embodiments: the first and third segments are a connected road, wider than the second segment, and the angle between the first and second segments is less than a threshold angle (e.g., 30°).

The second stage 2720 illustrates the initially-grown segment geometries 2735-2745 for the three road segments 2705-2725. The two freeway segment geometries 2735 and 2745 are significantly wider than the on-ramp segment geometry 2740. In addition, the third segment geometry 2745 is wider than the first segment geometry 2745, in order to accommodate the merge lane. However, as a result, the initial geometries leave a gap between the on-ramp geometry 2740 and the third segment geometry 2745.

Thus, the mapping service processing of some embodiments taper the outside (left side) of the second geometry 2740 to the right side of the third geometry 2745, as shown in the third stage 2730. In this case, the tapering is shown as a curved roadside, though different embodiments may use other methods (e.g., using a straight line to connect the segments). Some embodiments also use a taper from the left side of the first geometry 2735 to the right side of the third geometry 2745, as in the rendered result shown below.

Figure 28:
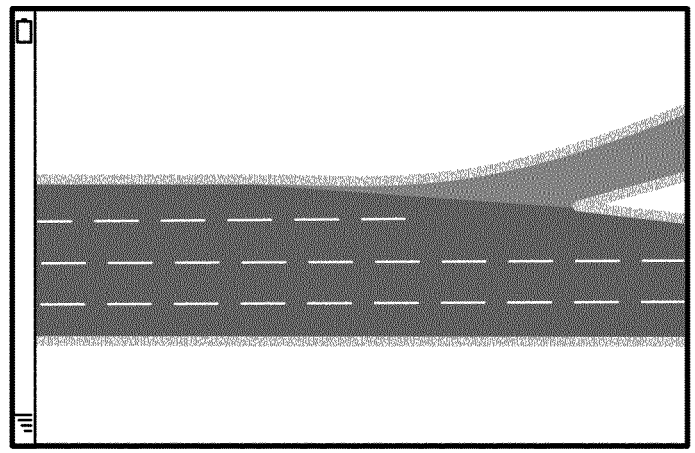
FIG. 28 illustrates the result of the smoothed freeway merge junction from FIG. 27 as rendered by a client mapping application of some embodiments.

FIG. 28 illustrates the result 2800 of the smoothed freeway merge junction as rendered by a client mapping application of some embodiments (e.g., on the display of a portable device). The asphalt indicates a smooth merge, rather than the choppy display that would be rendered as a result of the initial rectangular geometry. Furthermore, this figure illustrates that some embodiments render different roads differently. For example, some embodiments render freeways a different color (or shade) than other roads, including the freeway on-ramps.

In addition to modifying the geometries with tapering, projection, clipping, etc. operations, some embodiments use techniques to create more rounded corners at certain types of junctions. Rather than employing techniques to modify the already-generated road segment geometries in order to create rounded corners, some embodiments generate new geometries that create these round corners. In some embodiments, modifying the already-generated segment geometries would be extremely processing intensive.

Figure 29:
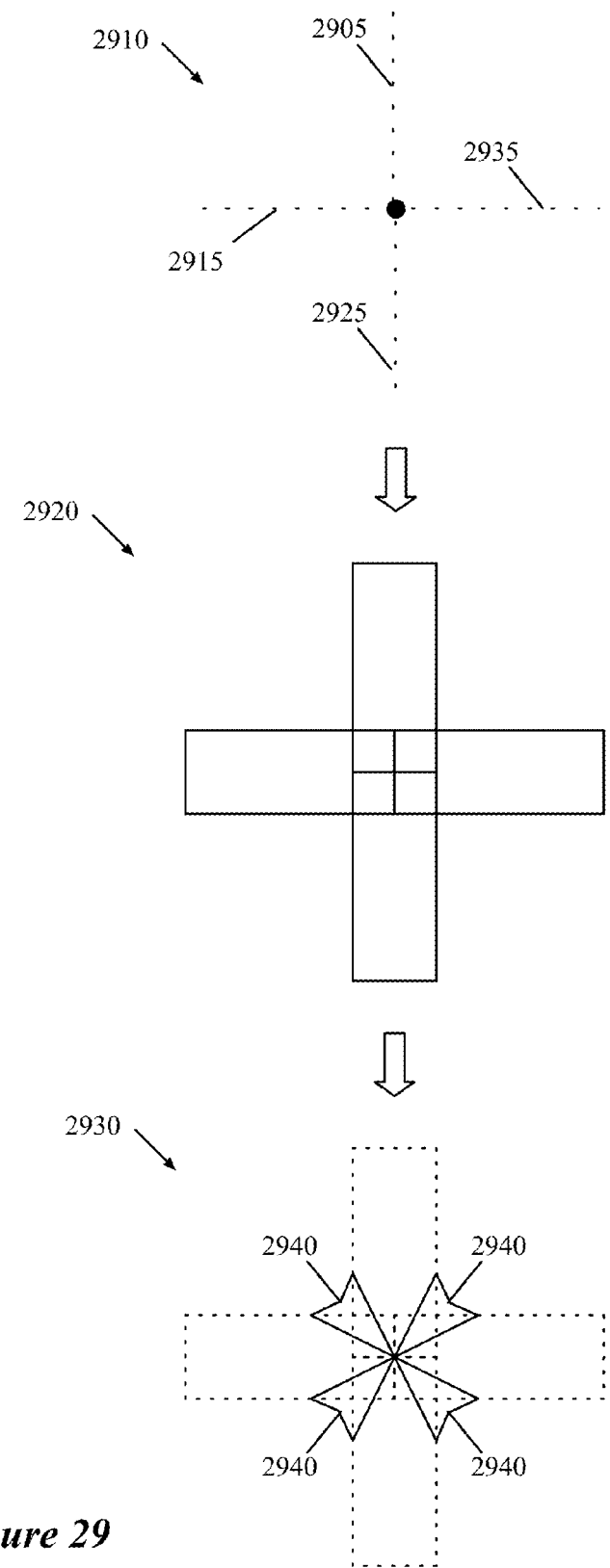
FIG. 29 illustrates the generation of additional geometries at a junction in order to create more realistic, rounded corners at the junction.

FIG. 29 illustrates the generation of such additional geometries at a junction in order to create more realistic, rounded corners at the junction over three stages 2910-2930. The first stage 2910 illustrates a junction with four road segments 2905-2935, that intersect at right angles. The second stage 2920 illustrates the initial geometries for these road segments. In this case, all of the road segments have same width, so the geometries all have the same shape and size. Because the angles between the segments are all right angles, there is no need for any of the projection, clipping, or tapering described above.

The third stage 2930 illustrates the generation of additional geometries that overlap the road segment geometries and generate the rounded corners for the intersection. Specifically, the additional geometries 2940 (shown as solid lines, while the road segment geometries are represented by dashed lines at this stage) have edges that radiate out from the junction location towards points a fixed distance from the 90° corners formed by the segment geometries. The additional geometries 2940 also have curved lines between these points (or straight lines between enough vertices to approximate a curved line so that the intersection will be rendered with a more realistic, curved appearance.

Figure 30:
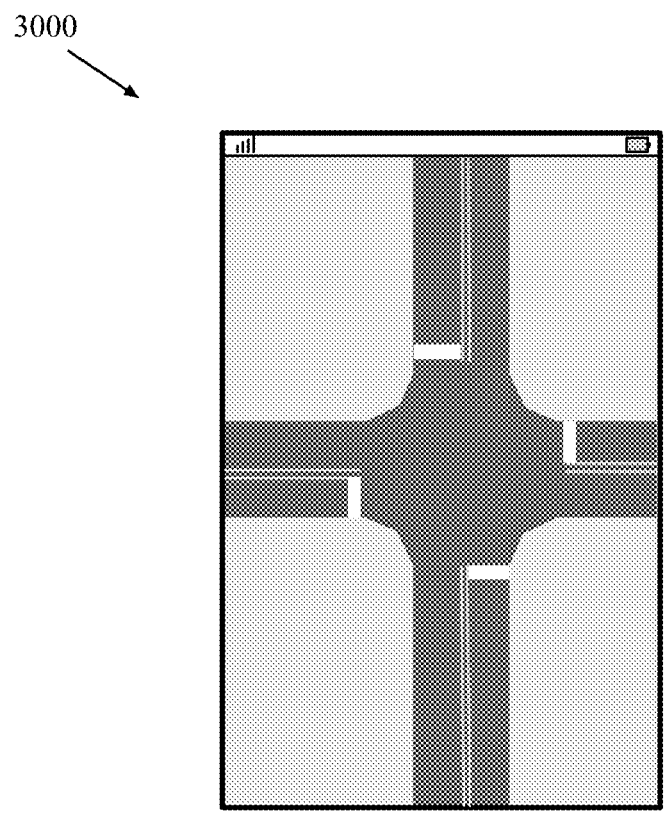
FIG. 30 illustrates the result of the smoothed intersection from FIG. 29 as rendered by a client mapping application of some embodiments.

FIG. 30 illustrates the result 3000 of the smoothed intersection as rendered by a client mapping application of some embodiments (e.g., on the display of a portable device). The asphalt does not make jarring 90° turns between the road segments, but instead has a more curved, pleasing appearance. In addition, the intersection includes stop lines and centerline markings, the generation of which is described below.

Returning to FIG. 15, the process 1500 also eliminates (at 1520) road overlaps. In some cases, two (or more) initially-grown road geometries will overlap incorrectly. Geometries for road segments that intersect at junctions should overlap, and when two road segments that do not form a junction but cross through the same latitude/longitude coordinates (e.g., a stacked-level road, roads going over/under each other, etc.), their geometries will overlap (as projected onto a flat plane representing the surface of the earth). However, when most other geometries overlap, this is most likely due to incorrect data and should be corrected. Without correction, the rendered map would indicate to a user of the mapping application that two roads intersect when in reality the roads do not.

The most common cases for such an overlap is when two corresponding dual carriageways overlap (e.g., Northbound and Southbound or Eastbound and Westbound freeways, opposite sides of arterial roads divided by a median, etc.). In most cases, the geometries for such corresponding dual carriageways should come very close to each other without actually overlapping. However, as the segment geometry is based on the centerline and width data for the segment, if any of this information is slightly inaccurate, then the geometries may not line up correctly. For example, when neither a lane count nor width is provided for a road, some embodiments derive the width based on the road type. However, if the road is actually narrower than usual for its road type, then the road geometry may end up larger than the actual road in the real world. Other situations that may cause such overlap include a freeway and its frontage road, roads that dead-end at a freeway rather than going over or under the freeway, etc.

Different embodiments use different techniques to remove these overlaps of road segment geometry. For instance, some embodiments push two roads apart at the location of the overlap, while other embodiments reduce the width of the road at the overlap. In addition, after moving the roads apart, when the roads are corresponding dual carriageways, some embodiments add geometry for a median between the road geometries.

Figure 31:
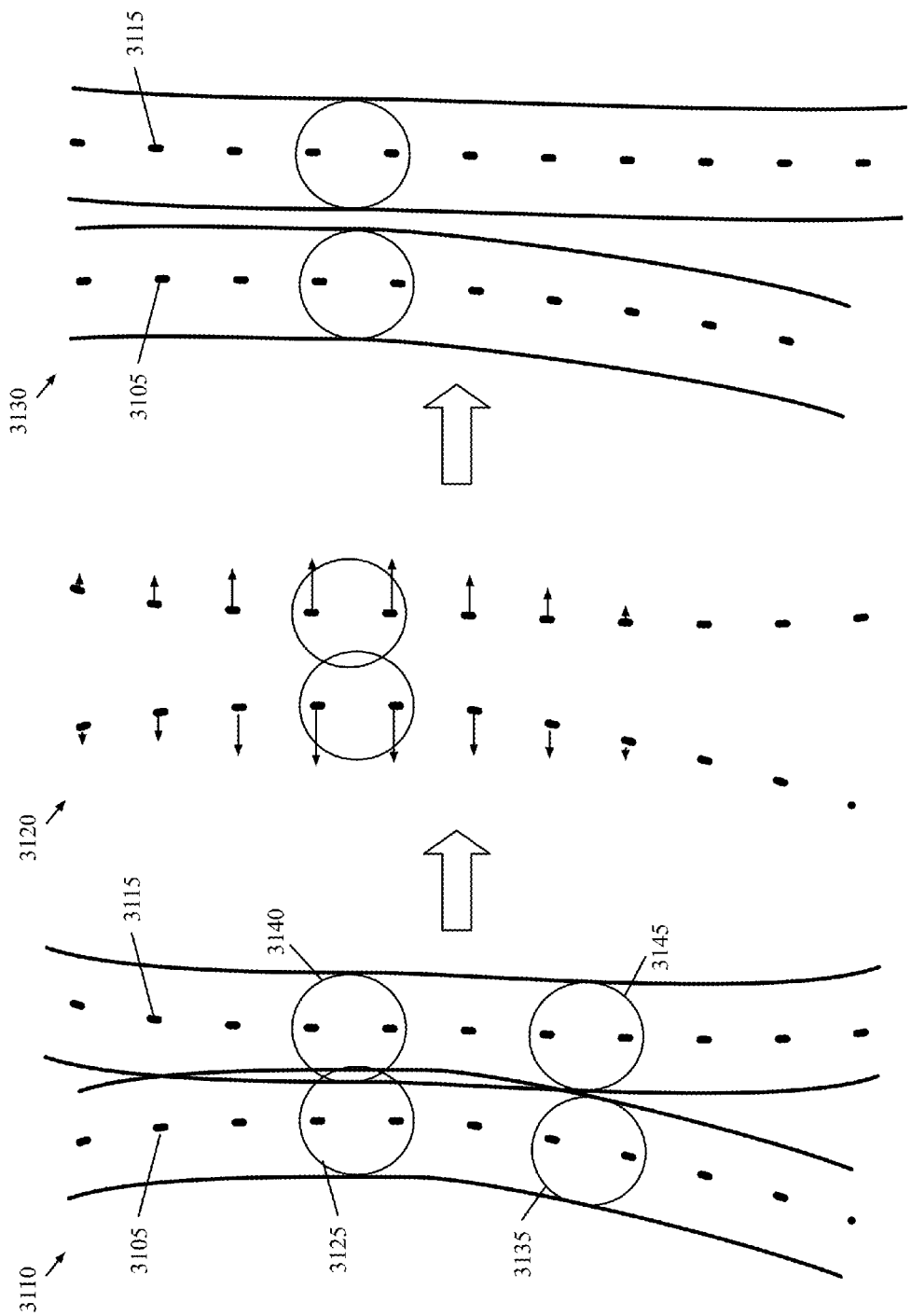
FIG. 31 illustrates pushing two roads apart when they overlap.

FIG. 31 illustrates pushing two roads apart when they overlap, over three stages 3110-3130. The first stage 3110 illustrates a first road segment 3105 and a second road segment 3115, each as a sequence of vertices. As described above, some embodiments use a constant distance between centerline vertices for roads, in order to standardize operations performed using the vertices. When road segment data is received by the mapping service from a data provider, in some cases the vertex data representing the road segment centerlines may be defined at varying distances (e.g., with gaps of 10 meters, 25 meters, 50 meters, etc.). Some embodiments automatically define vertices at a predefined interval (e.g., every 10 meters) upon ingesting road segment data. This ensures that (i) the roads will have a more curved, realistic appearance than if the vertices were spread out, as the mapping service processing of some embodiments defines straight-line edges between the vertices. Furthermore, it makes the smoothing operations described above more successful by providing more points to move in the operation. Furthermore, defining the vertices at regular intervals enables more useful tests for road overlap.

The first stage 3110 additionally illustrates the road sides generated for the road geometries for the segments 3105 and 3115. As can be clearly seen, the two generated road geometries overlap for a section. In order to detect such overlaps, some embodiments generate capsules around each of the edges of a road centerline (the lines between subsequent vertices), and test the capsules for overlaps. The first stage 3110 illustrates four such capsules: capsules 3125 and 3135 for the first road segment 3105 and capsules 3140 and 3145 for the second road segment 3115. The capsules, in some embodiments, are defined to encompass the edge between two subsequent vertices, and extend out to the width of the road (using the centerline and width data for the road segment). While shown as ovals (i.e., ellipses) in this example, different embodiments use different shapes for the capsules, such as rectangles or other parallelograms, other ellipsoids, etc.

As shown at the first stage, the capsule 3125 for a first edge of the first road segment 3105 overlaps with the capsule 3140 for a first edge of the second road segment 3115. Additionally, the capsule 3135 for a second edge of the first road segment 3105 does not overlap with the capsule 3145 for a second edge of the second road segment 3115. In addition, though not shown in this figure, capsules for the two edges of each road segment in between those with capsules illustrated would most likely also overlap. For simplicity in illustrating the modification of the road segments, these additional overlaps are not illustrated or accounted for in FIG. 31.

In some embodiments, when an overlap is detected between capsules of two road segments, the mapping service processing applies a "force" to the vertices encompassed by the capsule, in order to push the road segments apart from each other. Some embodiments use a spring-mass equation to determine this force, with larger overlaps between capsules resulting in a larger force outward. That is, the larger the overlap, the more the mass "compresses" the conceptual spring, resulting in a larger outward force. Some embodiments apply this force to each of the four vertices within the two overlapping capsules, then taper the force off to nearby vertices as well. The second stage 3120 illustrates the application of these forces, with the largest force arrows applied to the two vertices inside each of capsules 3125 and 3140, and smaller force arrows applied to the vertices on either side.

In some embodiments, the mapping service processing identifies each set of overlapping capsules, and identifies a force to apply to each vertex as a result of that individual overlap. After identifying the forces on the different vertices, the mapping service processing integrates the forces on each vertex to arrive at a new centerline path for the road segments. The processing then performs the same capsule test to determine whether any overlap between the road segment remains. If there is still overlap, the mapping service processing applies additional force to the vertices and pushes them apart again. The third stage 3130 illustrates that the two road segments 3105 and 3115 have been pushed apart, so that capsules around the edges of the first segment do not overlap at all with capsules around the edges of the second segment. As shown, the road sides for the two road segment geometries are now independent and do not overlap at all.

Other embodiments use different mechanisms to move the vertices apart. For instance, even with multiple overlapping capsules, some embodiments move the vertices as soon as the first overlap is detected, then move on to the next set of vertices once the first identified sets have been pushed far enough apart to avoid any overlap. In addition, while the example illustrates that forces are applied to vertices around those that overlap, some embodiments only move the vertices of the edge that actually causes the overlap (i.e., only the vertices within capsule 3125 and 3140). Furthermore, different embodiments may use different equations (i.e., varying from the spring-mass equation) to determine how much to push vertices away from each other, as well as different equations for calculating how far to move the surrounding vertices.

Moving the centerline vertices of the road segments is one option employed by some embodiments to handle overlapping road geometries. Some embodiments, on the other hand, reduce the width of the road in the vicinity of the overlap rather than moving the centerline (i.e., reduce the size of the road geometry).

Figure 32:
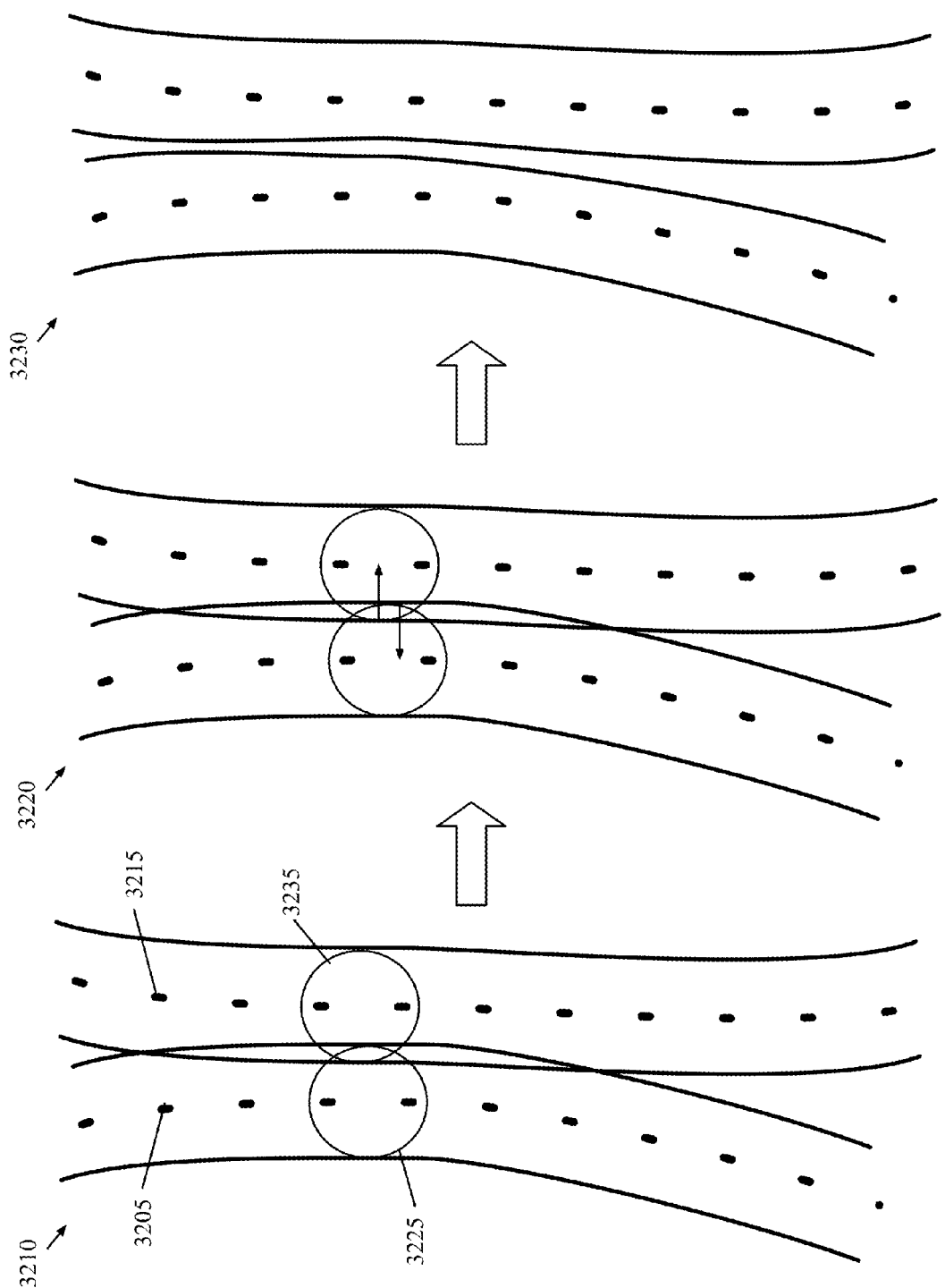
FIG. 32 illustrates reducing the widths of two road segments when the road segments overlap.

FIG. 32 illustrates reducing the widths of two road segments when the road segments overlap, over three stages 3210-3230. The first stage 3210 illustrates a first road segment 3205 and a second road segment 3215, each as a sequence of vertices (similar to the road segments shown in FIG. 31). As described above, some embodiments use a constant distance between centerline vertices for roads, in order to standardize operations performed using the vertices. When road segment data is received by the mapping service from a data provider, in some cases the vertex data representing the road segment centerlines may be defined at varying distances (e.g., with gaps of 10 meters, 25 meters, 50 meters, etc.). Some embodiments automatically define vertices at a predefined interval (e.g., every 10 meters) upon ingesting road segment data.

The first stage 3210 additionally illustrates the road sides generated for the road geometries for the segments 3205 and 3215. As can be clearly seen, the two generated road geometries overlap for a section. In order to detect such overlaps, some embodiments generate capsules around each of the edges of a road centerline (the lines between subsequent vertices), and test the capsules for overlaps. The first stage 3210 illustrates two such capsules: capsules 3225 for the first road segment 3205 and capsule 3235 for the second road segment 3215. The capsules, in some embodiments, are defined to encompass the edge between two subsequent vertices, and extend out to the width of the road (using the centerline and width data for the road segment). While shown as ovals (i.e., ellipses) in this example, different embodiments use different shapes for the capsules, such as rectangles or other parallelograms, other ellipsoids, etc. Some embodiments may employ both the solution shown in FIG. 31 and that shown in FIG. 32, and use the same capsules for each solution.

As shown at the first stage, the capsule 3225 for an edge of the first road segment 3205 overlaps with the capsule 3235 for an edge of the second road segment 3215. In addition, though not shown in this figure, capsules for the two edges of each road segment below those with the overlapping capsules illustrated would most likely also overlap. For simplicity in illustrating the modification of the road segments, these additional overlaps are not illustrated or accounted for in FIG. 32.

In some embodiments, when an overlap is detected between capsules of two road segments, the mapping service processing reduces the width of the road segments at the location of the overlapping capsules. As shown in the second stage 3220, some embodiments move the road sides at the location of the overlap inward towards the centerline by a particular distance. Some embodiments move this portion of the road side for a particular segment a distance proportional to the amount of overlap. The distance may be just enough to reduce the overlap at the location, or this amount plus additional leeway so that there is a gap between the two road segment geometries. In addition, some embodiments only move the road side that causes the overlap inward, while other embodiments symmetrically modify the other side of each road as well (so that the centerline remains in the center of the road).

To prevent the rendered roads on a client mapping application from appearing to have a sudden chunk removed from the road, some embodiments select a point along the roadside in either direction (e.g., 100 meters, 500 meters, etc. from the affected vertices) and hold these points fixed. The mapping service processing then tapers the width reduction out from the overlapping section to the fixed points.

The third stage 3230 illustrates the road geometries for the segments 3205 and 3215 after the widths of the roads have been reduced. As shown, the road geometries no longer overlap at all (at least in the sections shown in the figure). Some embodiments, after detecting an overlap between any two capsules, perform the process to reduce the width at that location and taper out the width reduction. The processing then retests that pair of edges and continues on to identify whether any overlapping road sections remain. On the other hand, other embodiments first identify all of the overlapping sections, reduce the widths at each such section, and calculate the different tapers required for each of the width reductions.

In addition to the geometry corrections performed at 1515 and 1520 to smooth junctions and eliminate road overlaps, the process 1500 also generates (at 1525) road markings to display on the roads. These road markings, in some embodiments, may include lane markings, medians, stop lines and/or crosswalks at intersections, etc.

For example, some embodiments automatically add medians between dual carriageways. As described in the previous subsection, some embodiments identify road segments (or aggregate roads) as being corresponding sides of a road (e.g., opposing directions of a freeway or sides of an arterial road separated by a median, etc.) using the road segment data. In some embodiments, this road segment data indicates that a road is a dual carriageway (sometimes referred to as a divided highway, as opposed to a single carriageway that carries traffic in both directions), and other properties (both geometric and attribute data for the road segments) indicate a likelihood that two roads are corresponding dual carriageways.

Such dual carriageways often have the two sides separated by various different kinds of medians. For instance, different areas may use concrete raised medians, grass medians, drawn medians (e.g., different combinations of yellow lines), dividers, etc. Some embodiments generate geometries that fill in the gaps between corresponding dual carriageway roads, and then assign these geometries properties so that they are rendered as medians. Some embodiments use the locations of the vertices of the road sides to determine locations for the median vertices, so that the median lines up exactly with the side of the road.

Different embodiments render the medians differently. For example, some embodiments use a single median type for all dual carriageways, while other embodiments have different types. Much like roads, land cover, etc., stylesheets stored at the client can define different median styles that are drawn differently. The median geometries from the mapping service are tagged with different styles (e.g., arterial road median, freeway median, etc.) that correspond to differently rendered graphics by the client mapping application.

Figure 34:
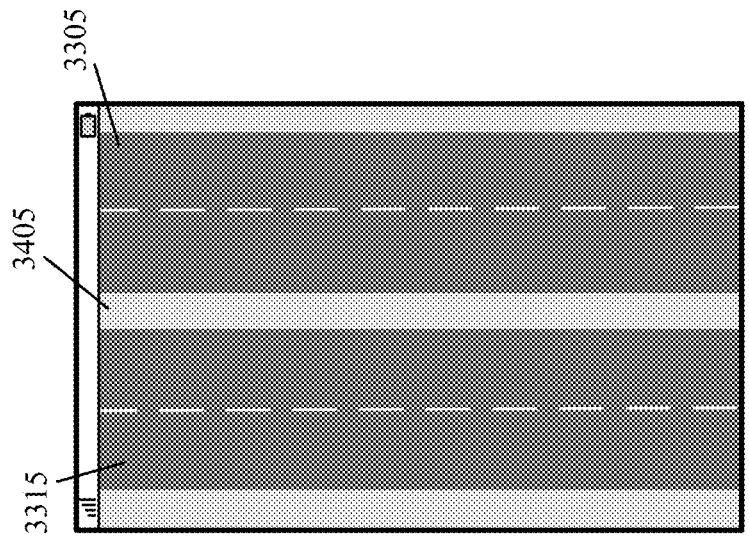
FIGS. 33 and 34 illustrate dual carriageways with two different types of medians.
Figure 33:
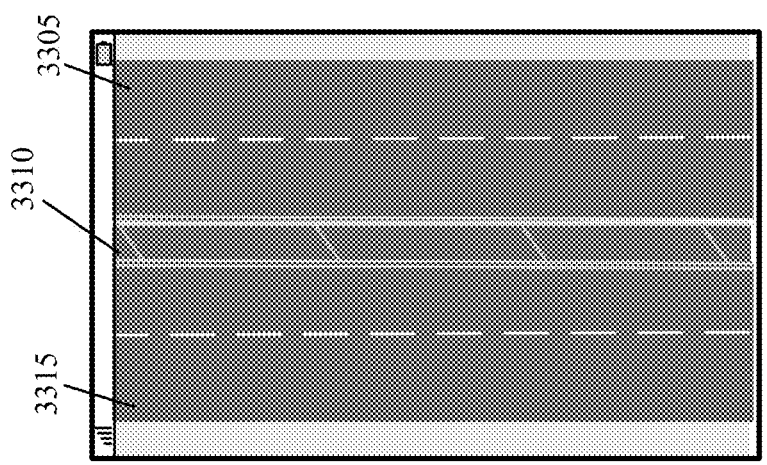

FIGS. 33 and 34 illustrate dual carriageways with two different types of medians. FIG. 33 illustrates two rendered roads 3305 and 3315, that are corresponding dual carriageways. In addition, the application displays a design of yellow lines representing a median 3310 in between the two roads (specifically, a pair of double yellow lines, with diagonal lines connecting them. FIG. 34 illustrates a concrete median 3405 drawn between the two dual carriageways 3305 and 3315.

In addition to medians, some embodiments generate geometries for various types of road paint (e.g., lane dividers, stop lines, etc.). In some embodiments, this includes the lane markings shown in the rendered results described above. To generate the lane markings for a road segment, some embodiments use the lane count information stored in the road segment data structure (which may be derived from either the width data or the road type data). In addition, special lanes such as carpool lanes may be indicated in the road segment data and can have geometry generated.

In addition, some embodiments recognize junctions at which a driver would likely have to stop at a stop sign or light. The mapping service of some embodiments receives this data from map providers (e.g., as information stored in the junction data). Thus, a particular junction might indicate a 4-way stop, a 2-way stop (picking out particular road segments as having the stop signs), a traffic light, etc. In some embodiments, the mapping service processing derives this information based on the road types at the junction. For instance, when a connector road intersects a major arterial road, some embodiments assume that the connector road has a stop sign with the major arterial road having the clear right of way. When two major arterial roads intersect, the mapping service processing assumes that the intersection will be controlled by a stoplight, and adds stop line markings to all of the road segments at the junction.

Figure 35:
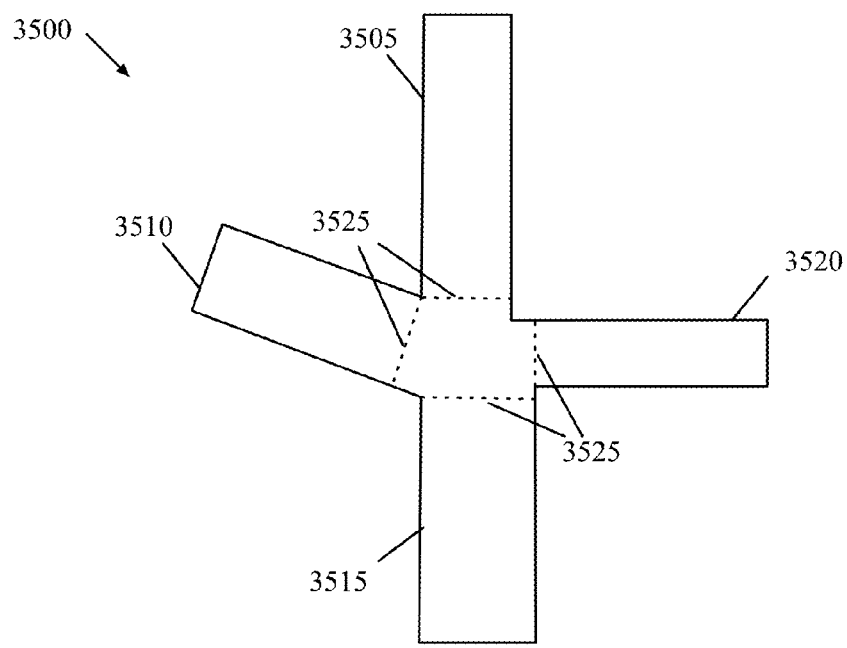
FIG. 35 illustrates an example of geometries for a junction of two major arterial roads.

FIG. 35 illustrates an example of geometries for such a junction 3500. When all of the road segment geometries at the intersection have the same width, and line up at 90° angles, then generating the stop lines is easy (as shown below). However, the four road segments 3505-3520 are not so well aligned. Instead, the segments have different widths, and the segment 3510 intersects the junction at a different (non-right) angle. In such a situation, for each particular road segment, the mapping service processing identifies the line perpendicular to the particular road segment's centerline that is closest to the intersection and touches both sides of the particular road segment's geometry without also intersecting the other road segment geometries. While shown for a more complex junction, some embodiments also use this process to identify the stop line locations in the simpler cases as well.

The dashed lines 3525 in FIG. 35 illustrate these lines for the junction 3500. The mapping service processing then generates geometries for the stop lines that end at these identified lines (the dashed lines 3525). For single carriageway road segments (that have two-way travel), the processing only generates the stop line to extend halfway across the road segment. In addition, some embodiments push the stop lines back from the edge of the intersection (the edge being represented by the dashed line in this figure) by a particular distance (e.g., two feet, five feet, etc.).

Figure 36:
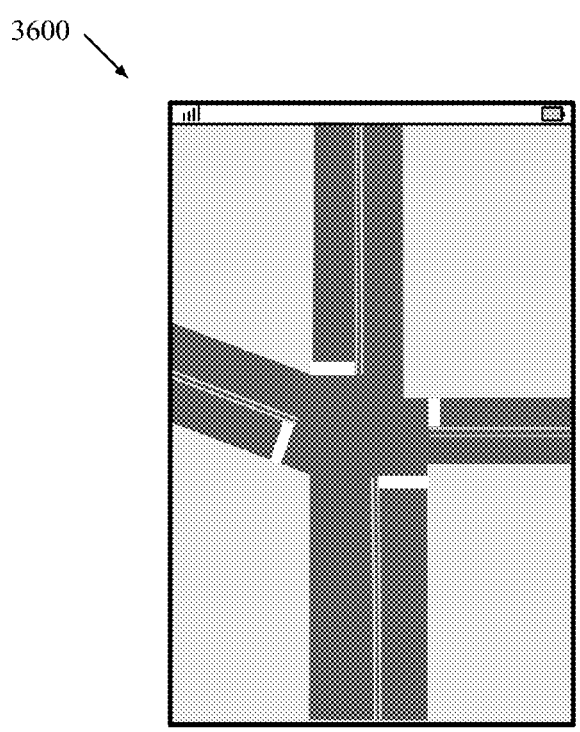
FIG. 36 illustrates the result of the junction from FIG. 35 as rendered by a client mapping application of some embodiments.

FIG. 36 illustrates the result 3600 of junction 3500 as rendered by a client mapping application of some embodiments (e.g., on the display of a portable device). As shown, a thick white line is drawn halfway across each of the road segments at the location identified by the dashed lines of FIG. 35. The interior (to the intersection) edge of the stop line geometry is drawn at the indicated line, with the stop line extending a ways into the road segment (away from the intersection). Some embodiments push the stop line a fixed distance away from the intersection as well. In addition, lane markings are generated such that they stop at the stop line, or shortly before.

Again returning to FIG. 15, the road geometry creation process 1500 next specifies (at 1530) annotation information on the road geometry, then ends. In some embodiments, this annotation information is stored on the polygon vertices (or edges, as the two are essentially interchangeable) that directs the mesh building modules and/or rendering engine of the client mapping application to apply particular characteristics to the rendered output. For example, some embodiments specify different types of road casing (i.e., the objects located at the sides of the road) through the road geometry vertices, instructing the client application to draw curbs, sidewalks, bridge casings (and corresponding shadows), tunnels, stacked roads, etc. In some embodiments, the instructions for drawing these casings are stored on the client device as part of the mapping application. The client mapping application then reads the information stored on a particular vertex and generates the appropriate road casing for the edge that corresponds to the vertex.

Figure 37:
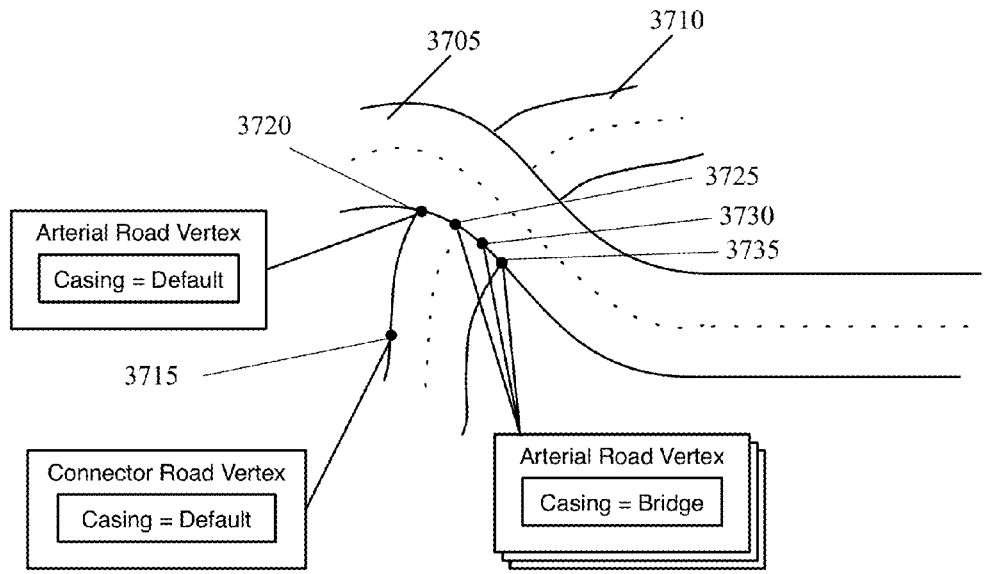
FIG. 37 illustrates an example of the use of vertex annotation to specify bridge casing for an overpass, where one road travels over another road and the roads do not form a junction.

The following illustrates several examples of different annotations of some embodiments for road vertices to indicate types of casings to be drawn. FIG. 37 illustrates an example of the use of vertex annotation to specify bridge casing for an overpass, where one road travels over another road and the roads do not form a junction. As shown in FIG. 37, the two road geometries 3705 and 3710 intersect in flat space. However, the road segment data specifies that the road segment for which the geometry 3705 is generated has a higher elevation than the road segment for which the geometry 3710 is created (either using absolute elevation data or relative elevation data). In addition, while shown as one segment for each of the two roads, in some embodiments the roads would be defined using several segments (e.g., for the road 3705, a first segment from an elevation of 0 to an elevation of 1, a second segment with an elevation of 1, and a third segment from an elevation of 1 to an elevation of 0.

FIG. 37 also illustrates several vertices 3715-3735 used to define the sides of the road geometries 3705 and 3710. Each particular vertex defines a directed edge from the particular vertex to a next vertex in a sequence. Thus, for example, annotation for the vertex 3735 defines how the client mapping application will draw the edge from the vertex 3735 to the vertex 3730, annotation for the vertex 3730 defines how the client mapping application will draw the edge from the vertex 3730 to the vertex 3725, etc. Different vertices along a single road segment may have different annotations, so that portions of a single road segment will be drawn with different features (e.g., different road casings).

In this case, the vertex 3715 (as well as the other vertices for road segment geometry 3710) specifies that it is a vertex of a connector road, and to use the default casing. In some embodiments, different types of roads (e.g., connector, arterial, freeway, etc.) may not only be drawn differently (e.g., different color/texture for the asphalt, different widths, etc.) but also may have different casings (e.g., a curb for a connector road). While this shows an actual specification of a default casing, some embodiments have no specific annotation on vertices for the default casing (or any other property for which the vertex provides annotation).

Three of the illustrated vertices 3725-3735 specifically indicate bridge casing for their edges of the geometry 3705, while the vertex 3720 indicates a default arterial road casing. Just as different types of roads may have different default casings, different types of roads may also have different bridge casings. That is, the client mapping applications may contain instructions to draw different overpasses for arterial roads, freeways, etc. The vertex 3720, while located at the edge of the overpass area, does not specify bridge casing, but rather, specifies a default arterial road casing for its edge. This is because its edge is directed away from the overpass, towards the next vertex to the left (not shown) for that side of the road geometry 3705.

Figure 38:
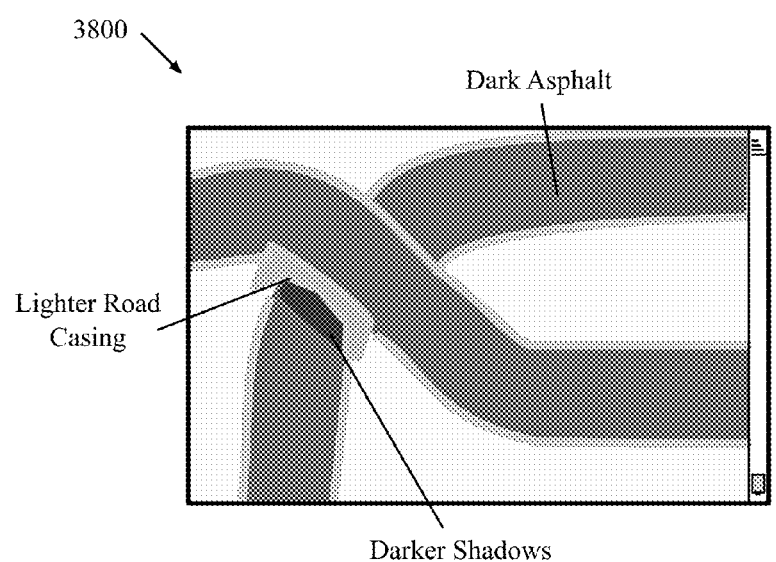
FIG. 38 illustrates the result of the road segments of FIG. 37 as rendered by a client mapping application of some embodiments.

FIG. 38 illustrates the result 3800 of the road segments 3705 and 3710 as rendered by a client mapping application of some embodiments (e.g., on the display of a portable device). In this case, the asphalt for the connector road is rendered using the same color/texture as the asphalt for the arterial road, although some embodiments may render the roads differently. In addition, lighter-colored curbs are drawn along the edges of the two roads for locations for which the vertices specify a default road casing. For the overpass section, however, the client application draws an overpass bridge according to some embodiments. Furthermore, the application renders a shadow onto the asphalt of the connector road to more realistically illustrate the overpass. If a user were to rotate the view of the map for these roads, then a similar bridge casing would be rendered for the other side of the overpass. In addition, while the shadows appear only for the overpass of the connector road, some embodiments also render shadows underneath the arterial road as it moves upwards from the ground to the overpass.

Figure 39:
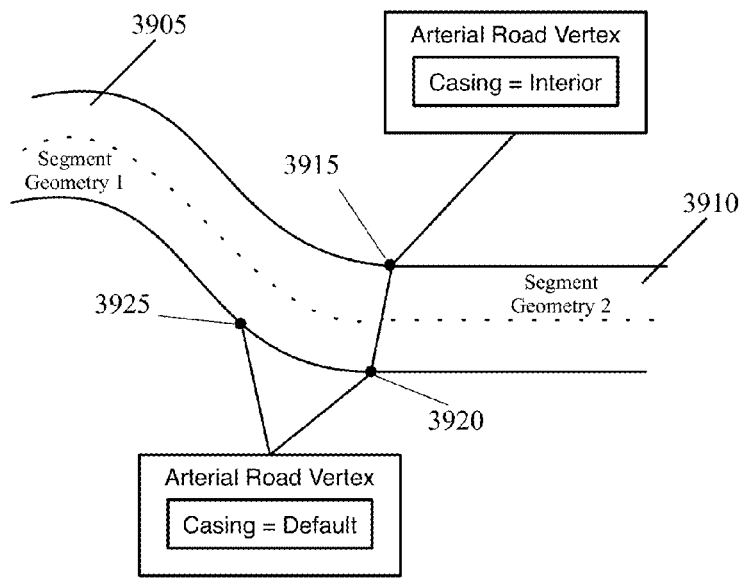
FIG. 39 illustrates an example of the use of vertex annotation to specify an edge of a road segment geometry as an interior edge, indicating that no casing should be drawn for the directed edge from the annotated vertex.

FIG. 39 illustrates an example of the use of vertex annotation to specify an edge of a road segment geometry as an interior edge, indicating that no casing should be drawn for the directed edge from the annotated vertex. Some embodiments use such an annotation where roads meet at junctions, in order to prevent the client mapping application from drawing a curb in the middle of the road. As shown in FIG. 39, two road segment geometries 3905 and 3910 meet at a junction. In this case, the road segments are connected as subsequent portions of an aggregate road; however, the same road casing annotation may also be used at junctions representing intersections of more than one road in some embodiments.

FIG. 39 also illustrates several vertices 3915-3925 used to define the sides of the road geometry 3905. The other road geometry 3910 is also defined by vertices, including vertices located at the same point as the vertices 3915 and 3920. As in the previous figure, each particular vertex defines a directed edge from the particular vertex to a next vertex in a sequence. Thus, for example, annotation for the vertex 3915 defines how the client mapping application will draw the edge from the vertex 3915 to the vertex 3920, annotation for the vertex 3920 defines how the client mapping application will draw the edge from the vertex 3920 to the vertex 3925, etc.

In this case, all of the vertices 3915-3925 (as well as the other vertices for road segment geometry 3910) specify that they are vertices of a connector road. In addition, the vertices 3925 and 3920 specify to use default casing. While this shows an actual specification of a default casing, some embodiments have no specific annotation on vertices for the default casing (or any other property for which the vertex provides annotation). In addition, the vertex 3915 specifically indicates to use interior casing (i.e., that the directed edge associated with the vertex 3915 is an interior edge of the road. In some embodiments, the interior casing annotation directs the client mapping application to not draw any road casing at all for those edges.

The vertex 3920, while located at the corner of the road geometry next to the interior edge, specifies the default casing rather than interior casing. This is because its edge is directed towards the vertex 3925. Furthermore, in some embodiments vertices for the road geometry 3910 would be located at the same points as the vertices 3915 and 3920, with the vertex co-located with vertex 3920 specifying the interior casing (assuming the direction of the edges was the same for the geometry 3910 as for 3905.

Figure 40:
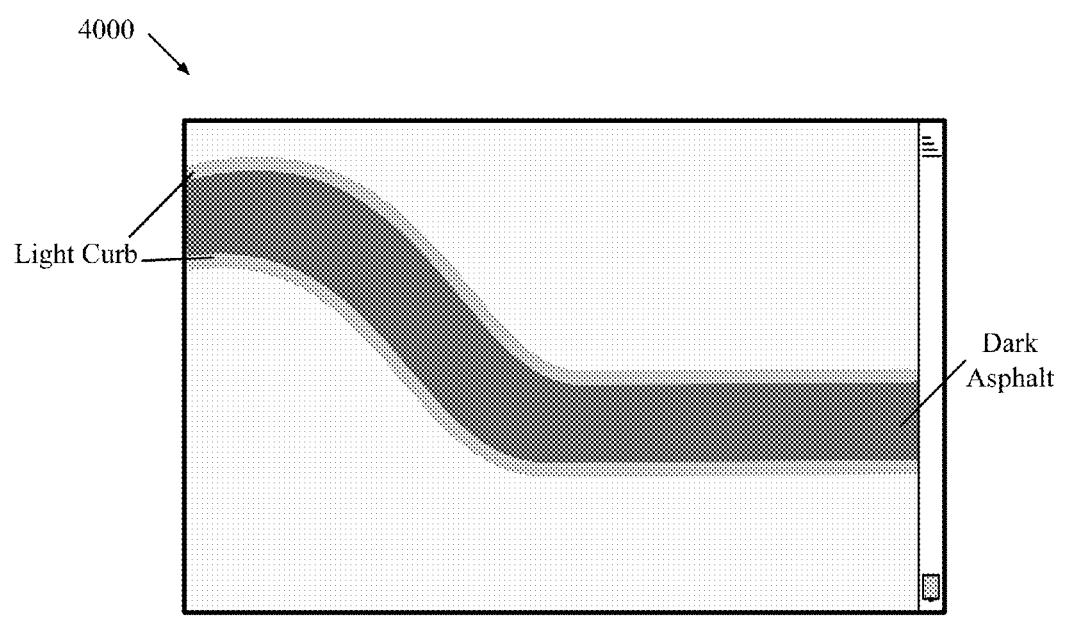
FIG. 40 illustrates the result of the road segments of FIG. 39 as rendered by a client mapping application of some embodiments.

FIG. 40 illustrates the result 4000 of the road segments 3905 and 3910 as rendered by a client mapping application of some embodiments (e.g., on the display of a portable device). In this case, the asphalt for the first road segment blends smoothly into the asphalt for the next road segment, with no visual indication of a transition from one road segment to the next. The application also draws curbs along either side of the road as the default casing. In addition to polygons for the lighter colored curbs, some embodiments also draw details such as the small shadows generated by the curbs, in order to provide a more 3-dimensional feel to the display, at least in some modes of the client mapping application. While the interior (i.e., facing other road segments) edges of roads are specified as such so that curbs and other road casing are not drawn in the middle of a road, some embodiments also use the interior annotation for roads that do not have casing on their exterior edges, such as country roads that lie at the same level as the grass next to the road, with no curb or other casing.

Figure 41:
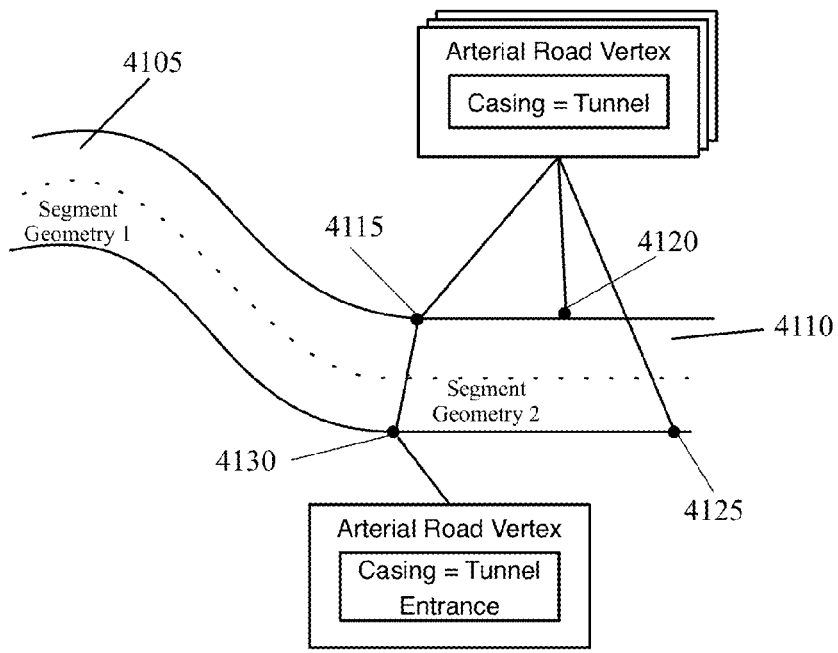
FIG. 41 illustrates an example of the use of vertex annotation to specify a tunnel for a road segment, indicating that the tunnel should be drawn over the road segment.

FIG. 41 illustrates an example of the use of vertex annotation to specify a tunnel for a road segment, indicating that the tunnel should be drawn over the road segment. Some embodiments use such an annotation to indicate the entrance/exit for a tunnel, as well as middle of the tunnel, so that the client mapping application will draw the tunnel when rendering the road segment. As shown in FIG. 41, two road segment geometries 4105 and 4110 meet at a junction. In this case, the road segments are connected as subsequent portions of an aggregate road; however, the same road casing annotation may also be used at junctions representing intersections of more than one road in some embodiments.

FIG. 41 also illustrates several vertices 4115-4130 used to define the sides of the road geometry 4110. The other road geometry 4105 is also defined by vertices, including vertices located at the same point as the vertices 4115 and 4130. These vertices, in some embodiments would be annotated to specify default casing or interior casing, for the different vertices. As in the previous figures, each particular vertex defines a directed edge from the particular vertex to a next vertex in a sequence. Thus, for example, the annotation for the vertex 4115 defines how the client mapping application will draw the edge from the vertex 4115 to the vertex 4120, annotation for the vertex 4125 defines how the client mapping application will draw the edge from the vertex 4125 to the vertex 4130, etc.

In this case, all of the vertices 4115-4130 (as well as the vertices for the road segment geometry 4105) specify that they are part of an arterial road. In addition, the vertex 4130 specifies to use tunnel entrance casing, while the vertices 4115-4125 specify to use tunnel casing. The tunnel entrance casing annotation, in some embodiments, specifies that the particular edge (the edge of segment geometry 4110 that crosses the roadway is the entrance to a tunnel and should be drawn as such. The tunnel casing annotation of some embodiments specifies that the edges are the sides of a tunnel, and thus a tunnel should be drawn across the road. at the location of those edges.

Figure 42:
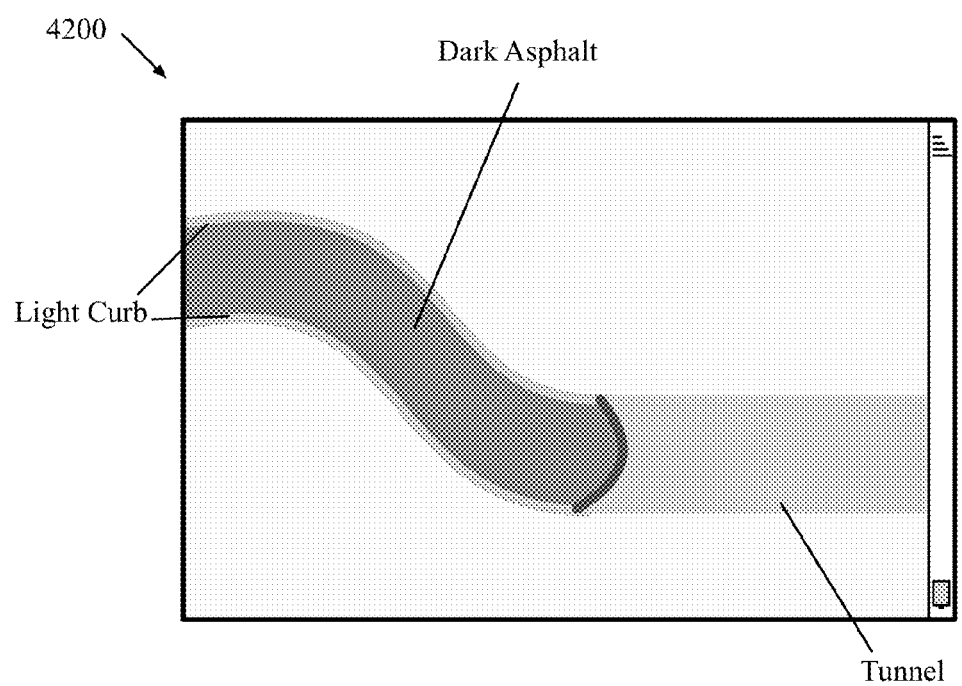
FIG. 42 illustrates the result of the road segments of FIG. 41 as rendered by a client mapping application of some embodiments.

FIG. 42 illustrates the result 4200 of the road segments 4105 and 4110 as rendered by a client mapping application of some embodiments (e.g., on the display of a portable device). In this case, the first road segment is displayed with asphalt and curb, the default rendering of some embodiments. For the second road segment, however, the application draws the curved tunnel entrance, and then a rounded covering of the road segment. At the other end of the road segment, the application would render a tunnel exit. In addition, the application renders a shadow below the entrance, resulting in the asphalt being darkened at this location.

Figure 43:
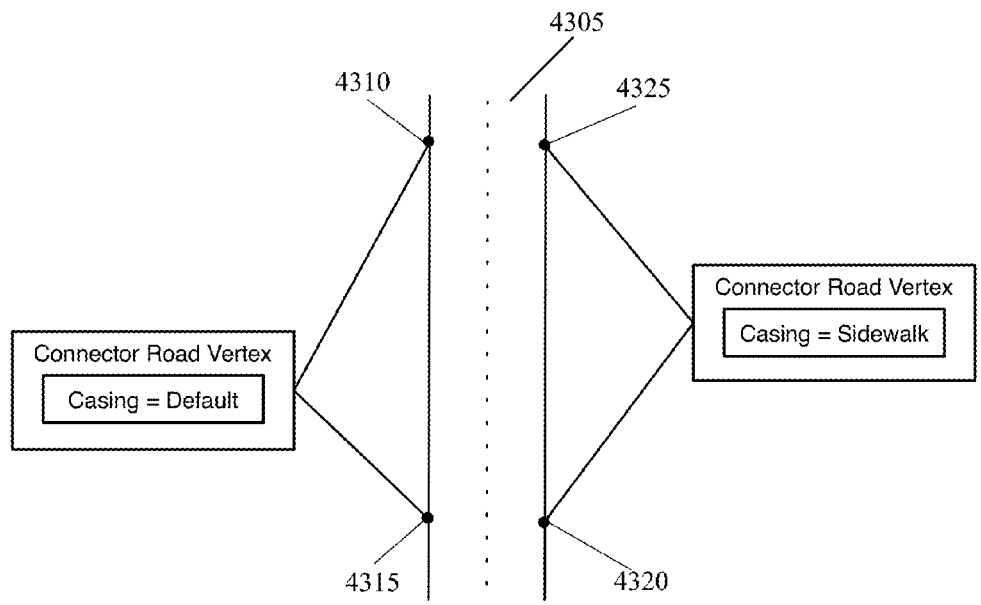
FIG. 43 illustrates an example of the use of vertex annotation to specify a sidewalk for a side of a road segment.

FIG. 43 illustrates an example of the use of vertex annotation to specify a sidewalk for a side of a road segment. This figure illustrates a single road geometry 4305 for a road segment that travels in a straight line. As shown, several vertices 4310-4325 are used to define the sides of the road geometry 4305. Each particular vertex defines a directed edge from the particular vertex to a next vertex in a sequence. Thus, for example, annotation for the vertex 4310 defines how the client mapping application will draw the edge from the vertex 4310 to the vertex 4315, annotation for the vertex 4320 defines how the client mapping application will draw the edge from the vertex 4320 to the vertex 4325, etc. Different vertices along a single road segment may have different annotations, so that portions of a single road segment will be drawn with different features (e.g., different road casings).

In this case, the vertices 4310 and 4315 specify that they are vertices of a connector road, and to use the default casing. As explained above, different types of roads may have different default casings (e.g., curb for a connector road or arterial road, guardrail for certain other types of roads, etc.). While this shows an actual specification of a default casing, some embodiments have no specific annotation on vertices for the default casing (or any other property for which the vertex provides annotation).

The vertices 4320 and 4325 specifically indicate sidewalk road casing for their edges of the geometry 4305. Just as different types of roads may have different default casings, different types of roads may also have different sidewalks. That is, the client mapping applications may contain instructions to draw different sidewalks for connector roads, arterial roads, etc. (e.g., wider sidewalks for arterial roads).

Figure 44:
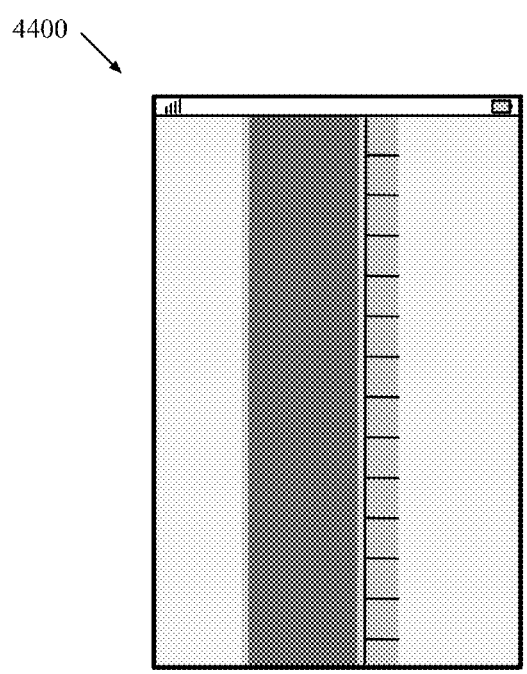
FIG. 44 illustrates the result of the road segment of FIG. 43 as rendered by a client mapping application of some embodiments.

FIG. 44 illustrates the result 4400 of the road segment 4305 as rendered by a client mapping application of some embodiments (e.g., on the display of a portable device). In this case, the asphalt for the arterial road is rendered in the same manner as shown above, and the left side (with the default road casing) simply has a curb drawn. For the right side of the road, however, the application renders a sidewalk in addition to the curb. In addition to polygons for the lighter colored curbs, some embodiments also draw details such as the small shadows generated by the curbs, in order to provide a more 3-dimensional feel to the display, at least in some modes of the client mapping application.

The above examples illustrated different types of annotations that can be applied to the road segment geometries. In some embodiments, multiple types of road casings may be applied to a single edge by annotating the edge's vertex with several types of annotation. In the above example of FIG. 43, the sidewalk annotation implied that the client application should render both a curb and a sidewalk.

Figure 45:
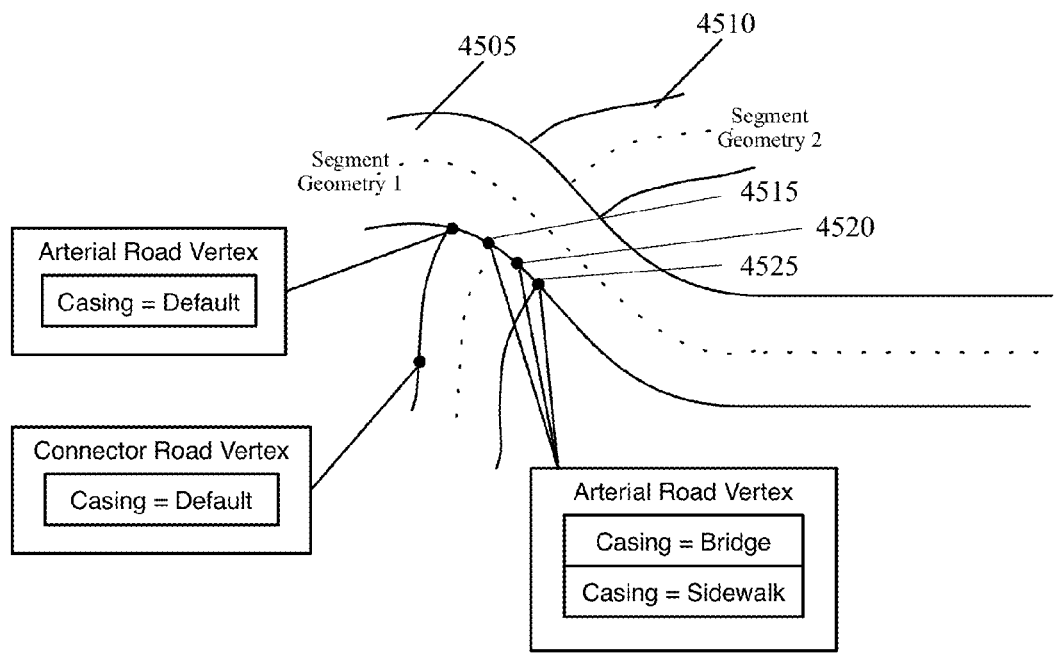
FIG. 45 illustrates an example of the use of several annotations for a single vertex of some embodiments.

FIG. 45 illustrates an example of the use of several annotations for a single vertex of some embodiments. Specifically, FIG. 45 illustrates an example of using vertex annotation to specify an overpass that includes a sidewalk on one side of the bridge. The geometries 4505 and 4510 are similar to the geometries 3705 and 3710 of FIG. 37, with the latter, a connector road, passing underneath the former, an arterial road. In fact, the difference from FIG. 37 is that the vertices 4515-4525 include annotations that specify both a bridge casing and a sidewalk casing.

Figure 46:
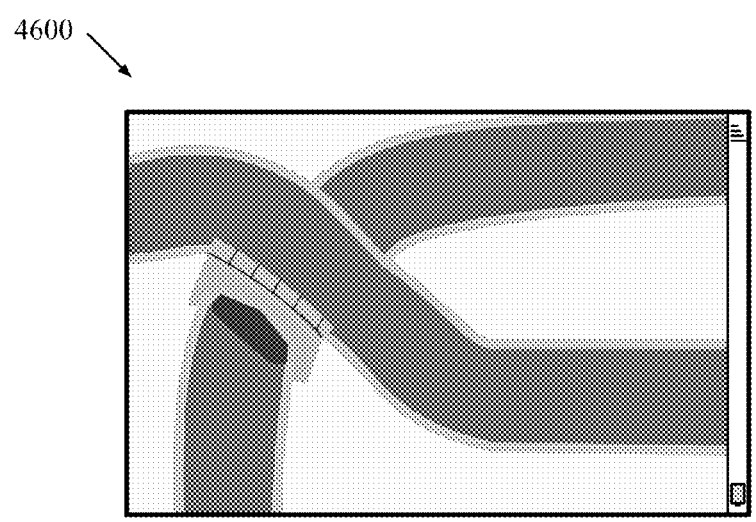
FIG. 46 illustrates the result of the road segments of FIG. 45 as rendered by a client mapping application of some embodiments.

FIG. 46 illustrates the result 4600 of the road segments 4505 and 4510 as rendered by a client mapping application of some embodiments (e.g., on the display of a portable device). Like FIG. 45, the asphalt for the connector road is rendered using the same color/texture as the asphalt for the arterial road and the application draws the lighter-colored curbs along the edges of the two roads. For the overpass section, the client application renders not only the overpass and its shadow, but a sidewalk atop the overpass on the side of the road annotated with the sidewalk. In this case, the other side of the road segment 3705 is not annotated to specify a sidewalk, so the application does not render one.

In the previous examples, the mapping service processing simply specified a casing type for the vertices. In some embodiments, the mapping service can also specify various different variables for different types of casings, that modifies how the casings are rendered. For instance, the height for bridge casings may be specified in the annotation data (i.e., based on the road segment elevation information). In addition, the sidewalk width, curb height, guardrail height, tunnel thickness, curb color, etc. may be varied in different embodiments.

Figure 47:
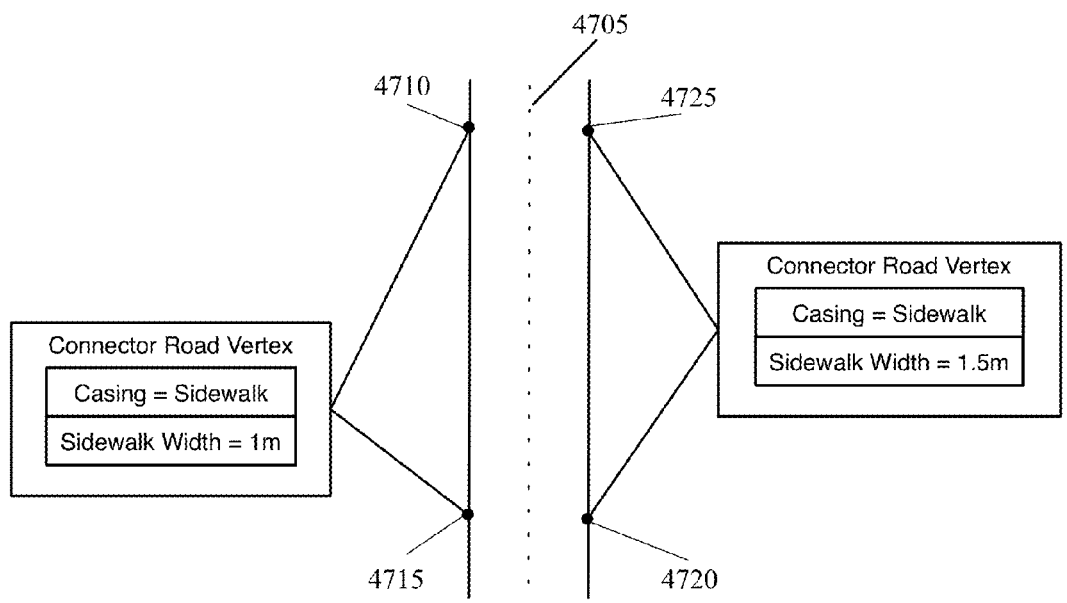
FIG. 47 illustrates an example of using vertex annotation data to vary a property of the road casing for a road geometry.

FIG. 47 illustrates an example of using the vertex annotation data to vary a property of the road casing for a road geometry 4705. Specifically, the road geometry 4705 includes two vertices 4710 and 4715 on one side and two vertices 4720 and 4725 on the other side. The two vertices 4710 and 4715 specify for the client application to render a sidewalk casing, and include a width of 1 meter for that sidewalk. On the other side of the road, the two vertices 4720 and 4725 also specify for the client application to render a sidewalk casing, this time with a width of 1.5 meters.

Figure 48:
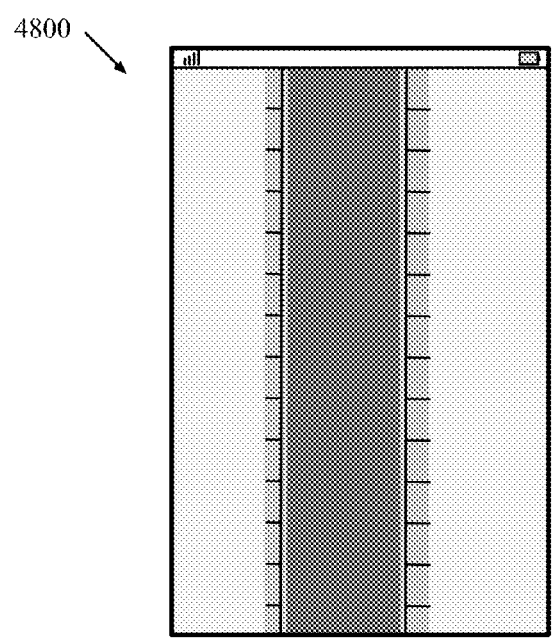
FIG. 48 illustrates the result of the road segment of FIG. 47 as rendered by a client mapping application of some embodiments.

FIG. 48 illustrates the result 4800 of the road segment 4705 as rendered by a client mapping application of some embodiments (e.g., on the display of a portable device). The rendering is similar to that shown in FIG. 44. However, the rendered road now has sidewalks on both sides, and the sidewalks are of a different width (as specified in the annotation data).

The above examples illustrate the use of vertex annotation data to specify road casing data for some embodiments. However, as other map objects (e.g., buildings, land cover polygons, etc.) are described in map tiles using vertices in some embodiments, these other objects may also contain vertex annotations in their descriptions. For instance, building details can be specified using such annotation (e.g., different color faces, different types of moulding, etc.), as can aspects of the land cover (e.g., how to draw different borders of the land cover polygons).

After specifying the annotation information, the road geometry creation process ends. As mentioned above, in some embodiments the specific order of the operations to create the road geometry may be different. Furthermore, some embodiments may use parallel processing to perform some or all of the road geometry operations to several road segments (or sets of road segments) at once.

C. Server Side Generation of Intersection Data

Having described the server operations that lead directly to the road geometries (e.g., defining aggregate roads and the creation of road geometry), the generation of intersection data using the junction data referred to above will now be discussed. When requesting a route, the client mapping application in some embodiments receives data about each of the intersections that the route traverses, that indicates the different branches of the intersection and notes through which branches the route enters and exits the intersection. In some embodiments, this intersection information is stored by a mapping service that the mapping application accesses in order to retrieve map data as well as route and navigation information.

As mentioned above, the mapping service of some embodiments receives data specifying each junction of road segments. In some embodiments, the mapping service automatically generates additional data for each of these junctions stored in the map data, and in some embodiments converts the junction data into intersection data. This junction information simplifies each received junction (or a set of related junctions that are viewed in the real world as a single intersection) into a set of branches leaving the junction at different angles. When a user requests a route through a mapping application operating on a device, the device sends the request to the mapping service, which generates a route from a starting location to an ending location. The mapping service also generates turn-by-turn navigation instructions for the route in some embodiments, using the intersection data. The mapping service identifies the intersections at which maneuvers are made, and modifies the intersection data to be specific to the maneuver made during the route. This data is then sent to the user device on which the client mapping application runs. The following subsections first introduce the creation of navigation data for a route, then discuss the precalculation of intersection data by the mapping service (so that the data is available for use in generating navigation data), and then finally describe specific types of modifications made to the intersection data for a requested route.

1. Navigation Data Creation

Figure 49:
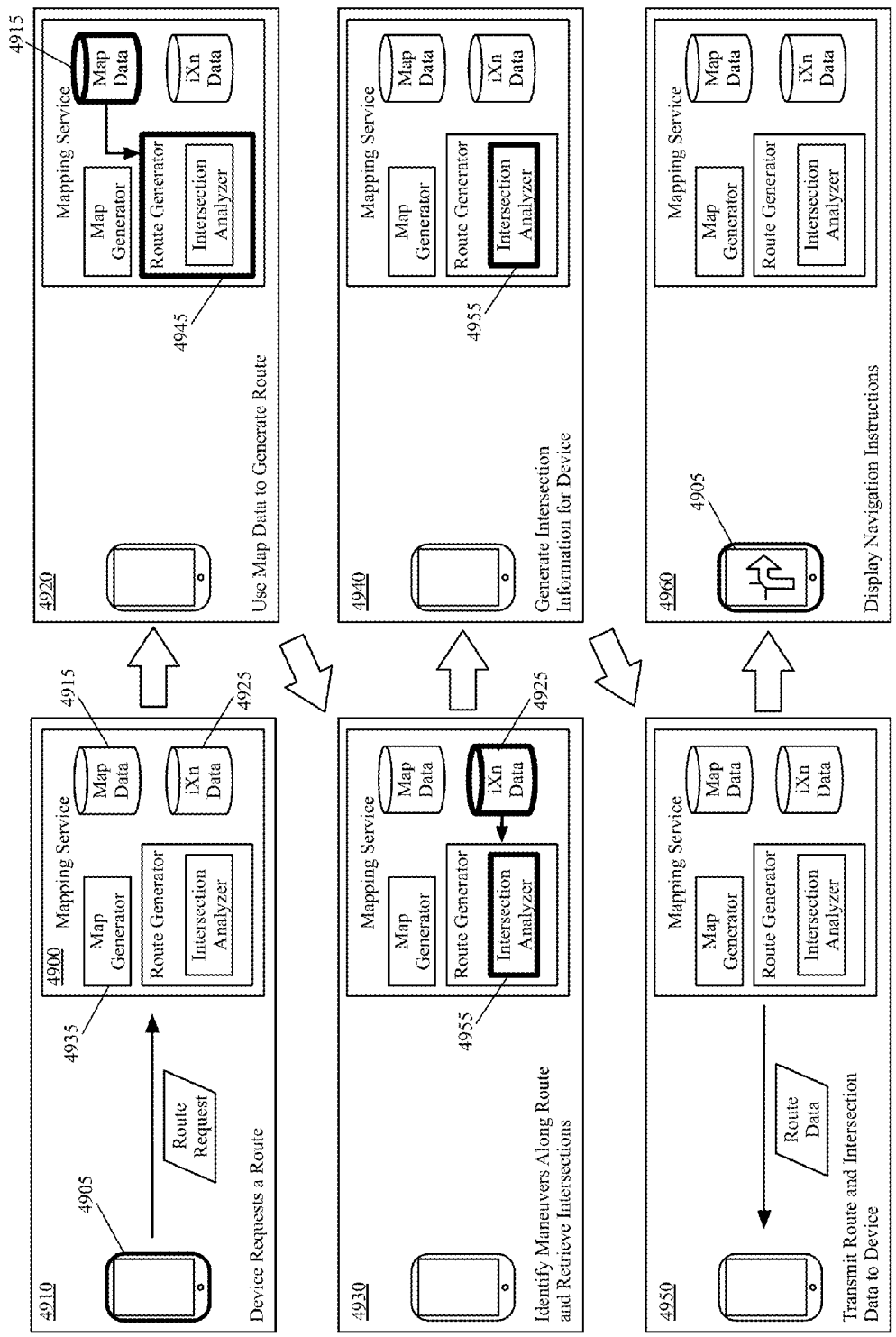
FIG. 49 conceptually illustrates an operation performed by a mapping service of some embodiments to generate a route for a requesting device and provide the route, with navigation instructions, to the requesting device.

FIG. 49 conceptually illustrates an operation performed by a mapping service of some embodiments to generate a route for a requesting device and provide the route, with navigation instructions, to the requesting device. FIG. 49 illustrates this operation over six stages 4910-4960, in which the mapping service receives a request for the route, generates the route, generates intersection data for the route, and provides the route to the device, which uses the information to display navigation instructions.

As shown, each stage of FIG. 49 illustrates a device 4905 and a mapping service 4900. The device 4905 may be a handheld device in some embodiments (e.g., a smart phone, tablet device, etc.), or may be a dedicated navigation device (e.g., a navigation system built into an automobile, a portable navigation device, etc.). In addition, in some embodiments, the device 4905 may be a non-portable device such as a desktop computer or other non-portable computing device.

The mapping service 4900 is a service to which the device 4905 connects (e.g., via a wired connection, wireless connection such as a cell network, Wi-Fi, etc.) in order to request and receive map data, route data, turn-by-turn navigation data, as well as additional information (e.g., information about places located on the map, etc.). As shown, the mapping service 4900 stores map data 4915 and intersection data 4925, and includes a map generator 4935 and route generator 4945, among other modules (not shown).

The map data 4915 provides data from which viewable map regions and routes can be generated. This map data, in some embodiments, includes latitude and longitude data, name data, as well as descriptive data about roads and other pathways (e.g., walkways, ferry routes, bike paths, etc.), natural features (e.g., rivers, lakes, mountain ranges, etc.), places of interest (e.g., buildings, businesses, parks, etc.), and other map items. In some embodiments, for example, a pathway is defined as a series of latitude/longitude vertices, a name, and descriptive data. This descriptive data may include a form of way (i.e., whether the pathway is a single carriageway or a part of a dual carriageway, whether the pathway is a one-way path), the class of road to which the path belongs (e.g., motorway, local road, private road, bicycle path, etc.), as well as other information). In some embodiments, this map data is compiled by an outside source (i.e., a map provider) and provided to the mapping service, while in other embodiments the mapping service provides its own map data. The map data may also be a hybrid of outsider-provided and internally-generated data. In addition, the map data may include geometry data for various map constructs, such as roads, land cover, etc.

The intersection data 4925 provides pretabulated data for the intersections of road paths in the map data. In some embodiments, as described below, the mapping service automatedly calculates intersection data for road pathway intersections using the map data. This intersection data 4925 may be stored by denoting an intersection type (e.g., point, roundabout) and a series of branches coming in and out of the intersection at different angles. While the map data 4915 and the intersection data 4925 are shown as separate storages, these may both be stored on the same physical storage or on separate physical storages, and the intersection data 4925 may in fact be part of the map data 4915. In addition, one or both of the map and intersection data might be distributed across several physical storages (e.g., a series of disks for storing the map data).

The map generator 4935 of some embodiments generates map information (e.g., map tiles) to transmit to the requestor device. The requestor device requests a map for a particular region (e.g., using latitude/longitude information), and the map generator 4935 creates (or uses pre-generated) map tiles for the region, then sends data for these tiles (e.g., as encoded vector and/or image data) to the device.

The route generator 4945 calculates optimal routes between two or more points in response to user requests. In some embodiments, the route generator 4945 calculates the routes based on the map data, using optimization algorithms. The routes may be defined as a series of intersections, a series of road pathways, or in other manners. In addition, when a user requests a route, the route generator 4945 provides intersection data for use by the device in turn-by-turn navigation. In some embodiments, the intersection analyzer 4955 retrieves intersection data 4925, and modifies this data for navigation of the route, as described below.

As shown, at stage 4910, the device 4905 sends a request for a route to the mapping service 4900. In some embodiments, the user enters a starting address (or place) and an ending address (or place), potentially including additional midpoint locations (e.g., starting at A, going to B, then going to C from B). The device then transmits location information to the mapping service. In some embodiments, the device translates the locations into latitude and longitude data, while in other embodiments this conversion is performed by the mapping service.

At stage 4920, the route generator 4945 accesses the map data 4915 in order to generate one or more routes for the series of locations. In some embodiments, the route generator 4945 uses an optimization algorithm to find the best (and second best, third best, etc.) route that connects the series of locations.

At stage 4930, the intersection analyzer 4955 identifies maneuvers along the route for which navigation directions need to be generated and retrieves intersection information for these maneuvers. Some embodiments generate turn-by-turn navigation directions to provide to the device along with the route. To generate these directions, the mapping service 4900 identifies each time the route changes pathways, at which point the user following the directions will have to perform a maneuver (e.g., right turn, slight left turn, U-turn, merge, etc.). In some embodiments, each of these pathway changes corresponds to a pretabulated intersection stored in the intersection data 4925. The intersection analyzer 4955 retrieves this intersection data. In some embodiments, each intersection is stored as a series of branches coming out of the intersection at various angles (e.g., based off of North=0°). In some embodiments, in addition to the intersection data, the route generator creates routing directions, that generally describe the maneuver to be performed. Examples of such descriptions include "turn left", "highway off ramp", "U-turn", etc. In other embodiments, this description is derived by the client mapping application based on the received intersection data.

Next, at stage 4940, the intersection analyzer 4955 generates intersection information designed for the route. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, the intersection analyzer 4955 tags one of the branches as the exit branch. Some embodiments tag an entrance branch as well, while other embodiments rely on the device to identify the 180° branch as the entrance branch.

Stage 4950 illustrates that the mapping service 4900 then transmits (e.g., via the same network that the device used to transmit the route request) the route data (i.e., route data and intersection data for navigation) to the device 4905. As shown at stage 4960, the device 4905 then uses the intersection and route data generated by the mapping service to display navigation instructions for the user of the device. In some embodiments, the navigation instructions include a display of the intersection along with a stylized arrow showing the maneuver (in this case, a right turn) through the intersection.

While the mapping service 4900 is displayed as including a map generator module and a route generator module, one of ordinary skill in the art will recognize that the mapping service may include additional modules, or different breakdowns of modules. The mapping service may consist of a single computing device (e.g., a server) storing all of the functionality and data, or the functionality may be distributed between multiple servers (e.g., one process on a first server and a second process on a second server, numerous servers that perform the same operation in parallel for different users, or other configurations of computing devices that perform the functionality described herein).

Figure 50:
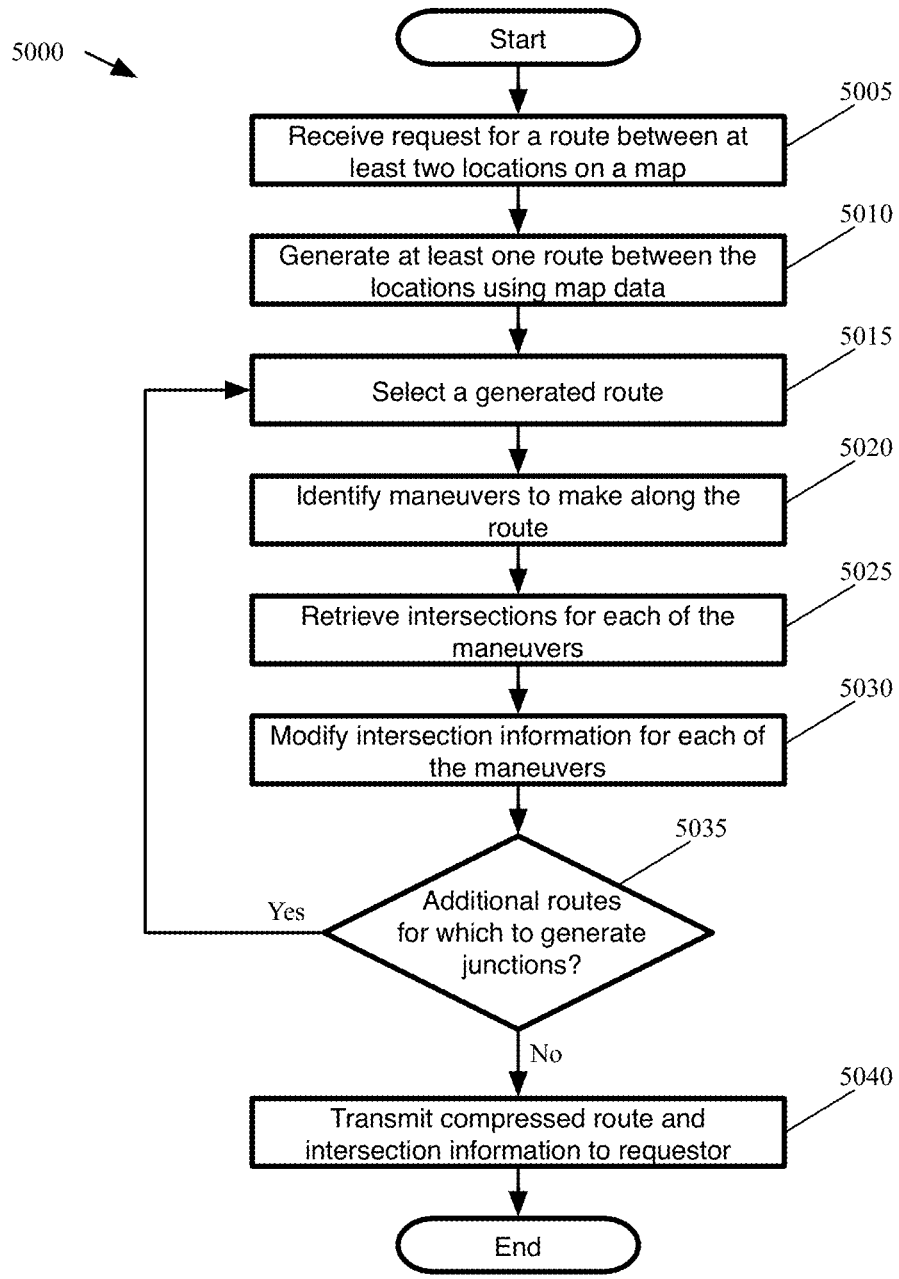
FIG. 50 conceptually illustrates a process performed by the mapping service of some embodiments in order to generate and transmit route and intersection data to a user.

FIG. 50 conceptually illustrates a process 5000 performed by the mapping service of some embodiments in order to generate and transmit route and intersection data to a user. As shown, the process 5000 begins by receiving (at 5005) a request for a route between two locations on a map. In some embodiments, when the user requests a series of more than two locations, each segment is treated as a separate route (i.e., from point A to point B is a first route, then point B to point C is a second route).

The process then generates (at 5010) at least one route between the locations using map data. In some embodiments, the process uses an optimization algorithm to identify the best (or two best, three best, etc.) routes between the two locations. These routes may be described as a series of vertices along pathways, a series of intersections between pathways, or with another description.

With the routes generated for the start and end locations, process 5000 selects (at 5015) one of the generated routes in order to create turn-by-turn instructions for the route. The process then identifies (at 5020) maneuvers to make along the route. In some embodiments, the mapping service identifies each time the route changes pathways, at which point the user following the directions will have to perform a maneuver (e.g., right turn, slight left turn, U-turn, merge, etc.).

Next, the process retrieves (at 5025) intersections for each of the maneuvers. In some embodiments, each of these pathway changes corresponds to a pretabulated intersection stored by the mapping service. The generation of these intersections is described in detail below. In some embodiments, each intersection is stored as a series of branches coming out of the intersection at various angles (e.g., based off of North=0°). In addition, the intersection data stores the type of intersection in some embodiments (e.g., point, roundabout, traffic square, etc.).

The process then modifies (at 5030) the intersection information for each of the maneuvers. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, some embodiments tag one of the branches as the exit branch. Some embodiments tag an entrance branch as well, while other embodiments rely on the device to identify the 180° branch as the entrance branch.

The process 5000 next determines (at 5035) whether additional routes remain for which to generate maneuver/intersection information. When additional routes remain, the process returns to 5015 to select the next route. Different variations of routes from a start location to an end location may overlap in part, in which case some embodiments reuse the already-generated set of intersections for the overlapping portions.

Once intersections are generated for all of the routes, the process transmits (at 5040) the route and intersection information to the requestor (e.g., a requesting device). As mentioned, the requesting device uses this information in some embodiments in order to generate turn-by-turn navigation, including stylized junction/maneuver arrows.

2. Precalculation of Intersection Data

As mentioned above, some embodiments precalculate intersection data from the stored map data (e.g., road segment and junction data). The mapping service then stores this intersection data for use in generating turn-by-turn navigation instructions. The following subsection describes several processes used to generate this intersection data, in which the mapping service receives vendor-provided junctions, identifies whether any sets of the received junctions should be consolidated into a single intersection, identifies pairs of road segments that should be joined together within an intersection, and generates angles for the intersection. Within this section, the term junction will be generally used to refer to vendor-provided information at which two path segments intersect, while the term intersection will refer to data generated from the junctions that represents where two or more roads meet in the real world. Thus, multiple junctions might be consolidated into one intersection, and junctions between two road segments that are actually just a continuation of a single road might not be considered intersections at all, in some embodiments.

The following represents pseudocode of some embodiments for generating intersection data for point intersections:
Identify all internal segments;
Identify all internal turn channels and mark them as internal segments;
For each internal segment:
 Gather all contiguous internal segments;
 Mark the gathered internal segments as processed;
 Build an intersection from this collection of internal segments;

In addition to other data (e.g., locations of parks, waterways, businesses, etc.), the map data stores information about pathways (i.e., roads, walkways, bike paths, etc.). Each pathway, in some embodiments, is received from a map provider as a series of segments (e.g., road segments). For a given segment, in some embodiments the stored data includes start and end junctions for the segment, geometry data that defines the course taken by the path between the start and end junctions, a path characterization (or "form of way"), a direction of travel (which may, in some embodiments, involve a one-way flag), one or more names for the path (e.g., "I-405 S", "San Diego Freeway", etc.), a class that indicates the level of importance of the path, and a netclass (a connected graph of paths to which the path belongs). In some embodiments, the geometry information comprises a series of latitude/longitude vertices through which the path travels. The form of way attribute, in some embodiments, includes the following characterizations: single carriageway, dual carriageway, motorway, slip road, connector, walkway, stairs. Some embodiments may include additional characterizations.

Figure 51:
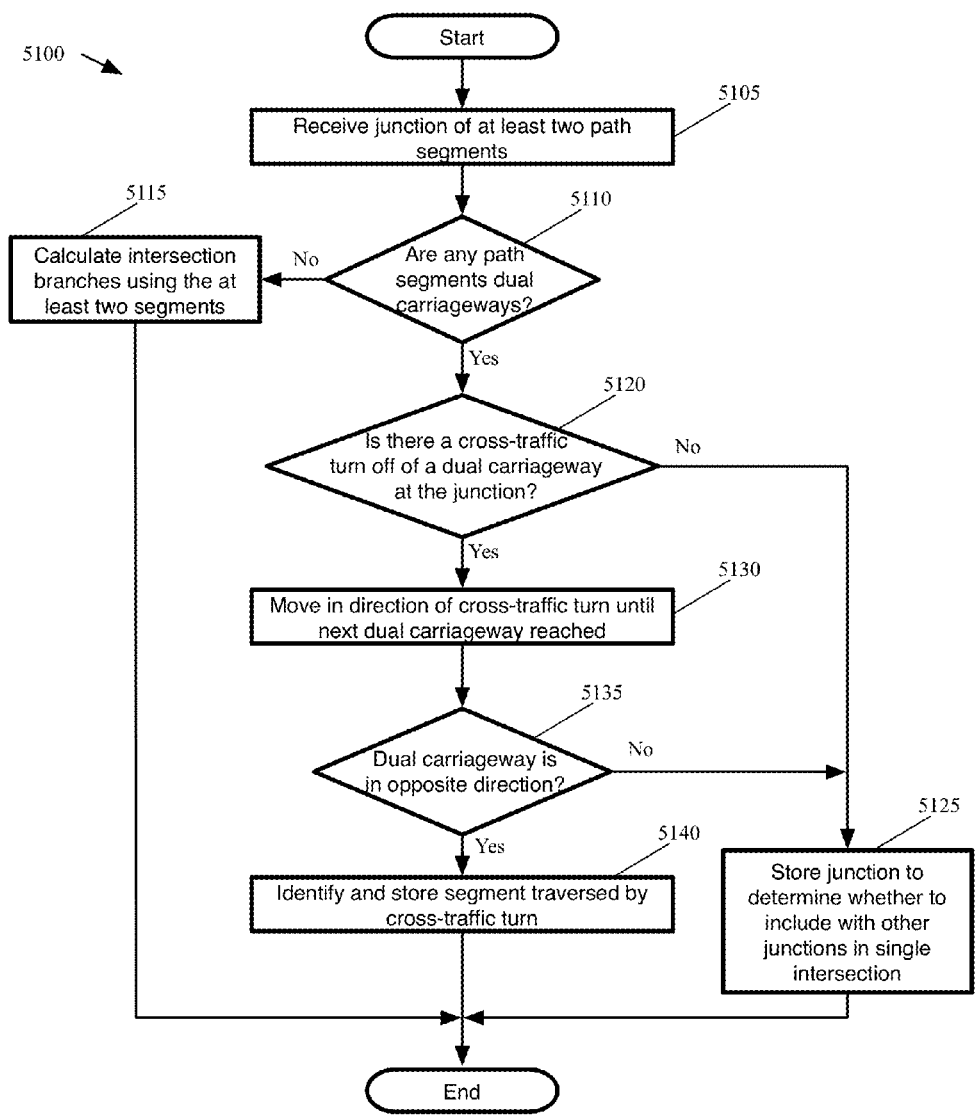
FIG. 51 conceptually illustrates a process of some embodiments for determining path segments between sets of junctions that should be treated together as single intersections.

FIG. 51 conceptually illustrates a process 5100 of some embodiments for determining path segments between sets of junctions that should be treated together as a single intersection. As shown, the process 5100 begins by receiving (at 5105) a junction between at least two path segments (e.g., road segments). In some embodiments, the mapping service receives (e.g., as precalculated data from a map vendor) a set of road segments and a set of junctions. Each road segment follows a path between two such junctions, and each junction references at least two road segments that enter and/or exit the junction. On the other hand, in some embodiments, the junctions are not received from the map data vendors and the mapping service traverses the path data to identify intersections between paths and analyzes these intersections in order to pretabulate the junctions.

The process then determines (at 5110) whether any of the path segments at the received junction are dual carriageways. As mentioned, a dual carriageway is a path characterization used in some forms of map data. Many roads that are divided (e.g., by a median, a double-yellow line, etc.) are received (and drawn) as two separate path segments, one for each direction. Each of the path segments is then marked with a direction of travel and as one-half of a dual carriageway. Because a user will typically think of an intersection of two roads that are both divided by medians as a single intersection (rather than four separate intersections), the junction generation process attempts to unify these four received junctions into a single intersection to present to a user for navigation purposes.

Figure 52:
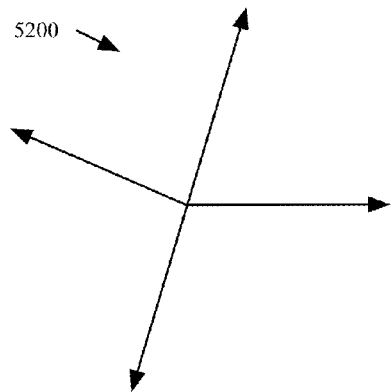
FIG. 52 illustrates an example of a junction of some embodiments and shows that there is no requirement that the path segments meet at right angles or that the paths continue in a straight line through the junction.

When none of the path segments are marked as dual carriageways, the process calculates (at 5115) the intersection branches using only the path segments specified in the received junction (i.e., the intersection will include only the one received junction). In some embodiments, the calculation of junction branches entails calculating the angle at which each of the segments specified for the junction leaves the junction location. The process then ends. FIG. 52 illustrates an example of such a junction 5200, also illustrating that there is no requirement that the path segments meet at right angles or that the paths continue in a straight line through the junction.

Figure 53:
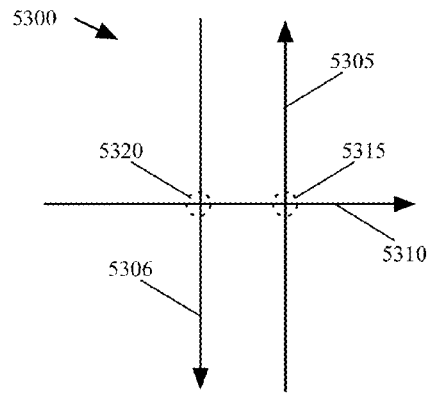
FIG. 53 illustrates an intersection of some embodiments that includes two dual carriageway paths and a one-way road.

When at least one path segment specified for the received junction is a dual carriageway, the process determines (at 5120) whether there exists a cross-traffic turn off of a dual carriageway at the junction. A cross-traffic turn is a turn off of the dual carriageway in a direction that will cross through the matching half of the dual carriageway (i.e., the other direction of the road), assuming it exists. In the United States, a left turn is a cross-traffic turn. While the examples shown in this document involve right-handed driving (i.e., driving on the right side of the road), one of ordinary skill will recognize that the examples are equally applicable to left-handed driving areas (e.g., England) as well. FIG. 53 illustrates an intersection 5300 that includes two dual carriageway paths 5305 and 5306 and a one-way road 5310. At the junction 5315, there is no cross-traffic turn off of a dual carriageway, because the only options are a right turn off of the dual carriageway path 5305 or a left turn off of the one-way street 5310. When no such turn exists, the process 5100 stores (at 5125) the received junction while recognizing that it may still be part of a larger intersection, in order to determine whether to include the received junction with other received junctions (e.g., the junction 5320 between the one-way road 5310 and the dual carriageway path 5306) in a larger intersection. For instance, in the intersection 5300, the process will want to join the received junction 5320 with the received junction 5315 into a single larger intersection. The process then ends.

When a cross-traffic turn off of a dual carriageway exists at the junction (for instance, at junction 5320), the process moves (at 5130) in the direction of the cross-traffic turn until the next dual carriageway path is reached. In some embodiments, because the path segments start and stop at junctions, the next dual carriageway path will be reached at a different received junction (though not necessarily the next junction, if a road such as a left turn lane is received as a separate path segment). For instance, from intersection 5320, the process would traverse the path 5310 away from the junction 5320 until reaching the next dual carriageway, at junction 5315.

The process 5100 then determines (at 5135) whether the dual carriageway path reached at 5130 has a direction of travel in the opposite direction of the originating dual carriageway path. This, essentially, is a quick determinant of whether the second dual carriageway could be the matching path for the first dual carriageway (i.e., whether they are likely to be two sides of the same road). In most cases, this next dual carriageway will be the matching path, due to the nature of how roads are typically built.

In the case when the second dual carriageway is not in the opposite direction of the originating path, the process proceeds to 5125 to store the newly reached junction for later use in determining whether to include it with any other received junctions. For example, if the left turn off of path 5306 reached another dual carriageway with a downward direction of travel, then path 5306 could be assumed to not have a match in the data (as far as the junctions are concerned, at least), but the newly identified path might itself have a match.

On the other hand, if the two dual carriageways have opposite directions of travel, the process identifies and stores (at 5140) the segment traversed by the cross-traffic turn. In the example of FIG. 53, the segment from junction 5320 to junction 5315 would be stored. This segment will be used as part of additional junction consolidation processes in some embodiments. The process then ends.

Figure 55:
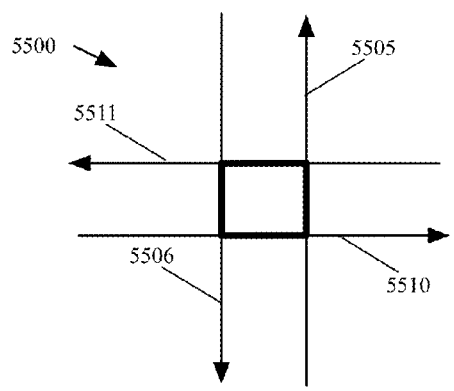
FIG. 55 illustrates a commonly existing intersection of some embodiments, between a dual carriageway with two paths and a dual carriageway with two paths.
Figure 54:
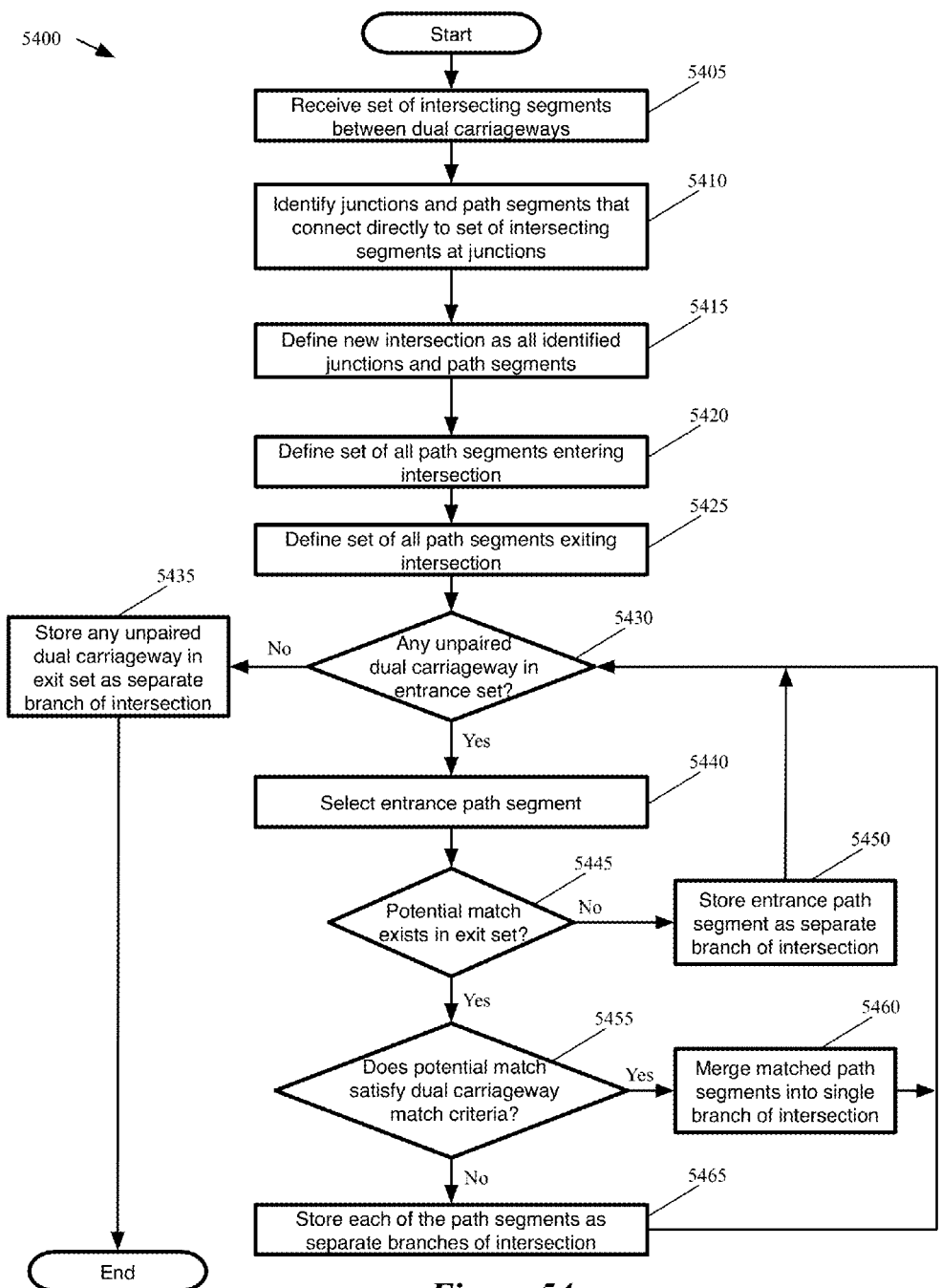
FIG. 54 conceptually illustrates a process of some embodiments for linking together several junctions into a single intersection and identifying the branches of the intersection.

The above process 5100, when applied to all the junctions within a map region, will generate a set of segments between dual carriageways. Some embodiments use these segments to link together received junctions and identify additional received junctions to include in a single intersection definition. The following represents pseudocode of some embodiments for identifying all such "internal" segments for a complex intersection:

For each segment that is a dual carriageway;
        For each connection with cross-traffic turn where a path can be assembled to other side of intersection;
            Mark all segments on the path to other side as internal segments;

This pseudocode includes a determination as to whether a path can be assembled to the other side of an intersection from a segment. The following includes pseudocode of some embodiments for such a determination:

Add first segment to path;
    Get connections from last segment on path;
    Iterate through each connection to either find a connection to other side or find connection that is best continuation;
        If connection is other side, note success and end;
        If no connection is other side and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

FIG. 54 conceptually illustrates a process 5400 for linking together several junctions into a single intersection and identifying the branches of the intersection. The process 5400 begins by receiving (at 5405) a set of intersecting segments between dual carriageways. These segments may be identified using a process such as that shown in FIG. 51, in some embodiments. The mapping service then groups together sets of such segments that intersect each other (i.e., at received junctions). FIG. 55 illustrates a commonly existing intersection 5500, between a dual carriageway with paths 5505 and 5506 and a dual carriageway with paths 5510 and 5511. The set of intersecting segments are shown in this figure as thicker lines.

The process then identifies (at 5410) all junctions and path segments that connect directly to the set of intersecting segments at junctions. That is, the set of intersecting paths intersect at junctions, but these junctions may contain additional path segments. For instance, in the example intersection 5500, the eight dual carriageway path segments that leave the intersection all intersect with the internal (thicker) path segments at the four junctions. Thus, the four junctions and eight external path segments are all included in the intersection.

Figure 56:
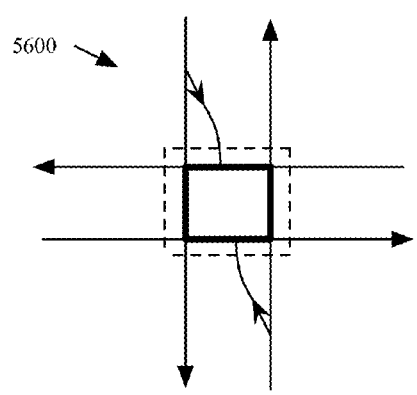
FIG. 56 illustrates an intersection of some embodiments in which left-turn channels are defined as separate path segments.

FIG. 56, on the other hand, illustrates an intersection 5600 in which left-turn channels are defined as separate path segments. In this case, because the left-turn channels intersect the internal segments at junctions received in the initial map data, these channels are identified by the process 5400. The left-turn channels may be characterized in the map data as slip roads or single carriageways, in most cases.

The following represents pseudocode of some embodiments for identifying all turn channels to treat as "internal" to an intersection:

For each segment that is a dual carriageway;
        For each connection with cross-traffic turn where a path can be assembled to internal segments;
            Mark all segments on the path to the internal segments as internal segments themselves;

This pseudocode includes a determination as to whether a path can be assembled to the internal segments from a segment (e.g., a turn channel). The following includes pseudocode of some embodiments for such a determination:

Add first segment to path;
    Get connections from last segment on path (i.e., segments connected to last segment at junction);
    Iterate through each connection to either find either an internal segment or find connection that is best continuation;
        If connection is an internal segment, note success and end;
        If no connection is internal segment and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

Next, the process 5400 defines (at 5415) a new intersection as including all of the identified junctions and path segments, including those that directly intersect the initial set of path segments. In some embodiments, in the case illustrated in FIG. 56, the junctions where the left-turn channels leave their originating dual carriageway segments would be included as well as the left-turn channels that intersect the initial segments. In this situation, some embodiments identify the other junction (i.e., the start junction) for the slip road or single carriageway path segment, which will be where the path segment intersects with one of the dual carriageway path segments before entering the intersection. When the single carriageway path segment stays internal to a (presumed) pair of dual carriageway paths for a threshold distance (e.g., 1 km), some embodiments assume the path segment is a part of the road defined by the dual carriageway paths, and eliminate the junction from consideration.

Figure 57:
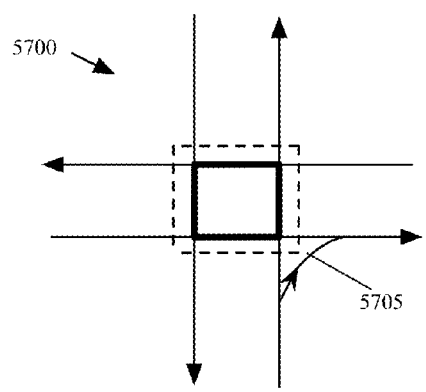
FIG. 57 illustrates a slip road in an intersection of some embodiments.
Figure 58:
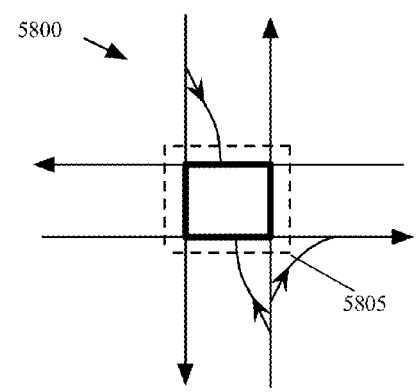
FIG. 58 illustrates an intersection of some embodiments with both a slip road and left-turn channels.

When processing a slip road or other connector outside of the dual carriageways (e.g., the slip road 5705 shown in the intersection 5700 of FIG. 57), some embodiments do not treat the slip road as a path into the dual carriageway intersection. Instead, some embodiments identify the path characterization as a slip road and attempt to form a closed loop including the start and end junctions of the slip road. When this closed loop shares a common junction with the newly defined intersection (as will typically be the case), the slip road may be associated with the intersection but not treated as an internal path of this intersection. On the other hand, when the newly defined dual carriageway intersection has grown due to the presence of, e.g., left-turn channels, such that the slip road junctions are encompassed by the intersection now including the intersecting single carriageways (as for the slip road 5805 in the intersection 5800 of FIG. 58), some embodiments treat the slip road as internal to the newly defined intersection. In the description of the intersection, these left turn channels, slip roads, etc., will typically be eliminated, as a user generally will not want complex instructions, but will instead want an instruction of "make a right turn onto San Vicente Blvd" or something similar.

Figure 59:
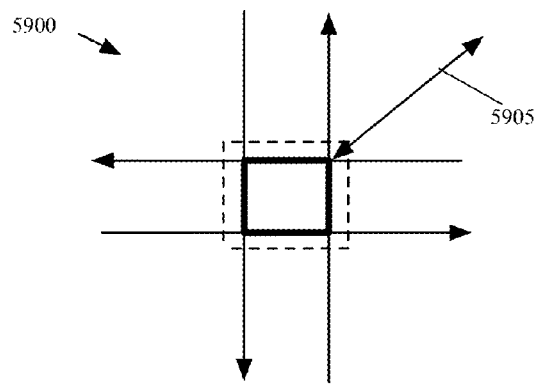
FIG. 59 illustrates an additional two-way path in an intersection in some embodiments.

With the set of segments and junctions that form the intersection defined, the process needs to merge dual carriageways into single junction branches. The process 5400 next defines (at 5420) the set of all paths entering the intersection, and defines (at 5425) the set of all paths exiting the intersection. For a dual carriageway, which is a one-way path (half of a two-way road), the path will typically have an exit side and an entrance side. For purposes of merging, some embodiments treat each segment (the segment exiting the intersection and the segment entering the intersection) as separate paths. Single carriageways that are not internal to dual carriageways (e.g., the additional two-way path 5905 in the intersection 5900 of FIG. 59) will typically be treated as separate branches and are not part of the merging analysis in some embodiments.

Next, the process determines (at 5430) whether the set of entrance paths includes any unpaired dual carriageway paths. When no such paths remain in the set (or none existed in the first place), the process stores (at 5435) any unpaired dual carriageway left in the set of exit paths as separate branches of the junction. In general, this will happen in the case of mislabeled map data (the road is actually a one-way street) or merging criteria that are too strict (leaving a pair of entrance and exit paths unmerged).

When an unpaired entrance path exists, the process selects (at 5440) one of the entrance paths. The process then determines (at 5445) whether a potential match exists in the exit set. A potential match, in some embodiments, is a dual carriageway found by traversing the previously identified segment to the left (to the right, in the case of left-handed driving regions), or traversing the intersection in a clockwise fashion.

When no potential match exists (e.g., the next identified dual carriageway in the traversal is also an entrance path, or the exit set is empty), the process stores (at 5450) the entrance path as a separate branch of the intersection and then returns to 5430 to find the next unpaired entrance path. On the other hand, when a potential match exists, some embodiments determine (at 5455) whether the potential pair satisfies a set of dual carriageway match criteria. These are criteria, in some embodiments, to determine whether a pair of dual carriageways are actually the two sides of the same road. Some embodiments determine whether the two paths (1) are within a threshold distance (e.g., 25 m, 50 m, etc.) where the paths enter/exit the intersection, and (2) whether the angles at which the paths hit their junctions within the intersection is within a threshold range of each other (e.g., 5°, 10°, etc.). To calculate the angle, some embodiments use the vertex closest to the edge of the intersection (or the location of the junction at which the path segment intersects the other segments within the intersection) and a vertex located a particular predefined distance (e.g., 50 m) away. The process then calculates the angle off of North for the line between the two vertices.

In some embodiments, the mapping service additionally looks at the names of the paths to determine whether these match. When the names match, such embodiments may relax the geometry criteria for a matching pair (i.e., allow a greater distance between the paths or a greater difference in angles between the paths). Matching names might be, e.g., "CA-1 South" and "CA-1 North", or if both paths include "Wilshire Blvd." as one of their names. Some embodiments may also look at the road class data for confidence in matching dual carriageways.

Figure 60:
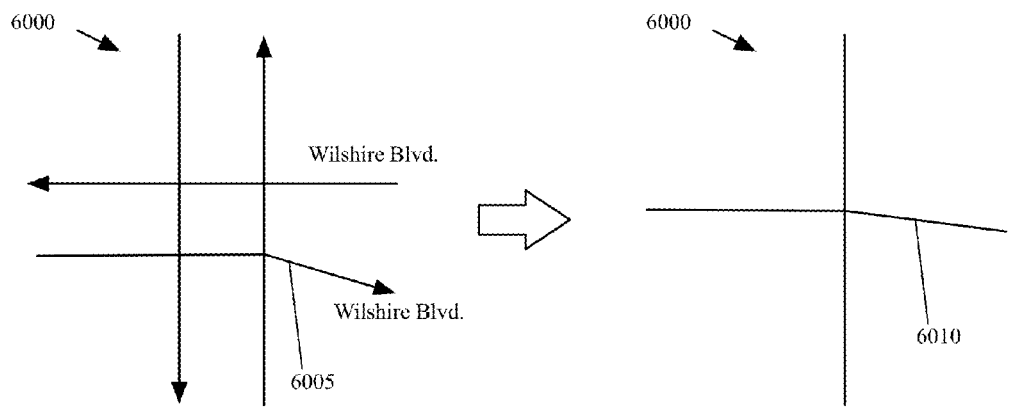
FIG. 60 illustrates the reduction of an eight-path intersection into four branches in some embodiments.

If the two paths match, the process merges (at 5460) the paths into a single branch of the newly defined intersection. As indicated above, intersections are stored as a set of branches at different angles. For a merged path, some embodiments store the angle as the average of the angles of the two paths that make up the branch. FIG. 60 illustrates the reduction of an eight-path intersection 6000 into four branches, in which the angle of the right branch 6010 is at half the offset from horizontal as the right exit path 6005, because the right entrance path is on the horizontal. As shown conceptually, directions (entrance/exit) are not stored for intersection branches in some embodiments. The mapping service generates the routes using map data, which includes the intersections as well as directions of travel for the roads, so a route will not travel the wrong way on a branch of the intersection.

Figure 61:
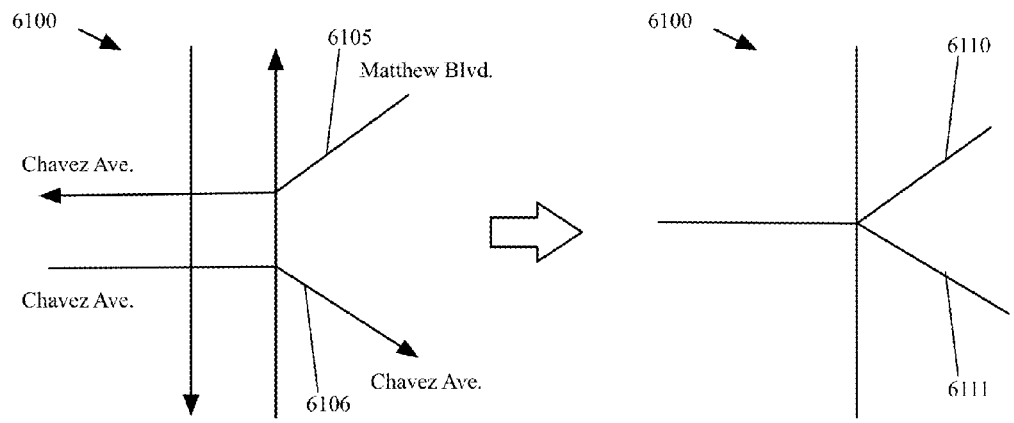
FIG. 61 illustrates the reduction of a different eight-path intersection into five branches in some embodiments.

On the other hand, when the paths do not match, the process stores (at 5465) each of the paths as separate branches of the intersection. FIG. 61 illustrates the reduction of a different eight-path intersection 6100 into five branches. In this case, the dual carriageway paths 6105 and 6106 on the right side do not merge and are therefore treated as separate branches 6110 and 6111 of the reduced intersection. In this example, the angle at which each of these branches leaves the intersection is the angle that is stored for the branch (with no averaging). The process 5400 then returns to 5430 to determine whether any entrance paths remain. As stated, once the entrance path set is empty, the process proceeds to 5435, and subsequently ends.

Figure 62:
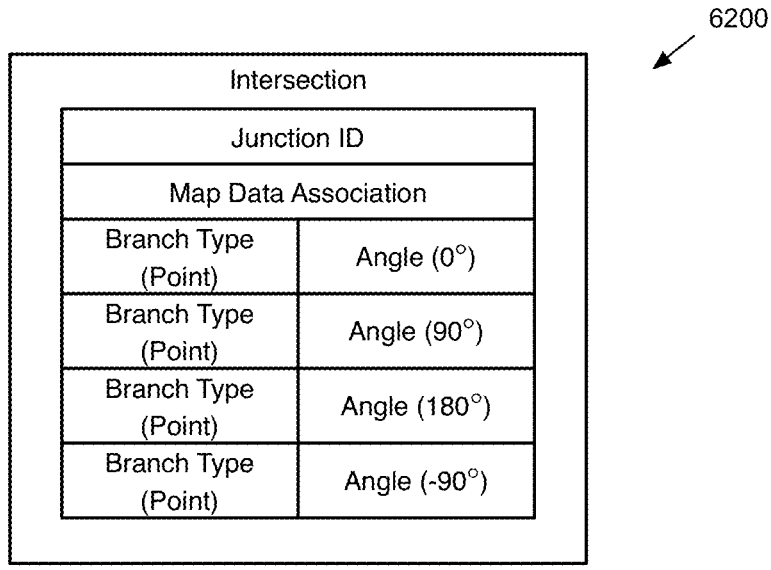
FIG. 62 conceptually illustrates an example of a data structure of some embodiments for a point type intersection.

The following represents pseudocode of some embodiments for generating the data for an intersection once the internal segments have been identified for the intersection (e.g., operations performed by some or all of process 5400):

Gather all external segments that touch internal segments for an intersection;
    Identify external segments that are surrounded by internal segments in the intersection and mark them as internal;
    Group together pairs of incoming and outgoing segments that represent same road;
    Compute an outgoing angle for each pair and for each unpaired road;
    Construct a template Intersection Pattern with one branch for each angle;
    If pattern exists for previously generated intersection, use existing pattern to save space (refer intersection to existing pattern);
    Else if pattern does not exist, create and store new entry for pattern;

As indicated, some embodiments store each intersection as a data structure. This data structure indicates the branches of the intersection and the angles at which the branches enter and/or exit the junction. FIG. 62 conceptually illustrates an example of such a data structure 6200 of some embodiments for a point type intersection. As shown, the intersection includes an intersection ID (which, in some embodiments is a unique identifier), a map data association, and a set of branches with angles and types. The map data association, in some embodiments, associates the intersection data structure with an actual location within the map. In some embodiments, this is simply a latitude/longitude point, but may also consist of other data in other embodiments (e.g., a list of the path segments or aggregate paths that meet at the intersection). Each branch includes a type and an angle. The type, in some embodiments, is an intersection type. Some embodiments define two intersection types: point and roundabout.

However, other embodiments may include additional intersection types, such as traffic squares. Some embodiments store the intersection type as a property of the intersection rather than separately for each branch, but other embodiments recognize the possibility of an intersection partially being a roundabout but partially being a point intersection. The data structure 6200 includes four branches, at the cardinal directions of 0° (North), 90° (East), 180° (South), and −90° (West). In some embodiments, the intersection data structure also includes references to any junctions (i.e., data received from the map data provider) and path segments that are contained within the defined intersection. For a typical intersection of two dual carriageways, four junctions are referred to by such a data structure.

Figure 63:
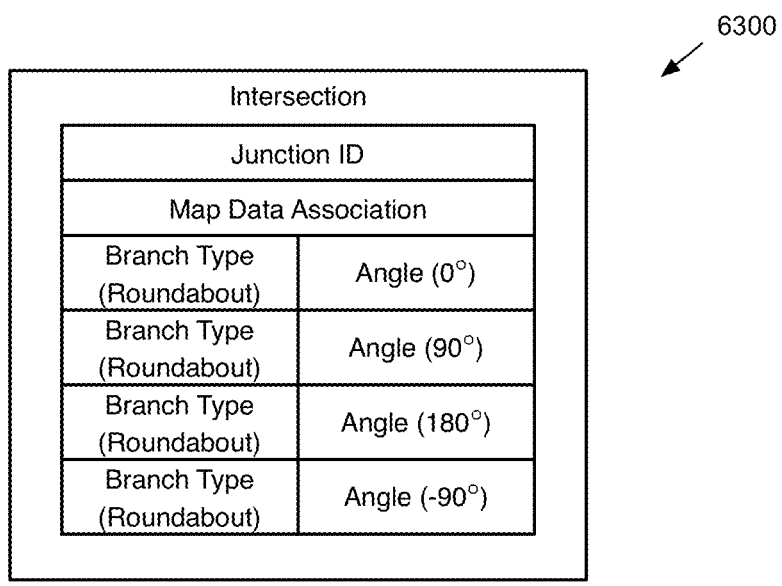
FIG. 63 conceptually illustrates a data structure of some embodiments for a roundabout intersection.

FIG. 63 illustrates a data structure 6300 of some embodiments for a roundabout intersection. Some embodiments provide specialized processing for roundabout intersection. The following represents pseudocode of some embodiments for generating intersection data for roundabout intersections:

Identify all roundabout segments;
    For each roundabout segment:
        Gather all contiguous roundabout segments;
        Mark the gathered roundabout segments as processed;
        Build a roundabout intersection from this collection of roundabout segments;

In some cases, the map data identifies a roundabout (e.g., as a form of way or through another indicator). This allows the mapping service intersection calculator to begin its specialized automated roundabout processing. Specifically, when performing roundabout processing, the mapping service attempts to identify pairs of flare connectors (i.e., the portions of a road that flare into and out of a roundabout). In some embodiments, the intersection calculator traverses the roundabout (e.g., in a counterclockwise fashion for right-handed driving) looking for an exit path that is followed, within a particular distance (e.g., angular distance), by an entrance path. The process then determines whether to combine these paths, looking at factors similar to those for merging dual carriageways at point intersections. For instance, the factors used might include whether the names are similar, whether the distance between the exit/entrance paths is small enough, and potentially other factors. As a result of this processing, when a random road intersects the roundabout in between what otherwise appears to be an entrance/exit combination, some embodiments treat this as three separate branches.

Figure 64:
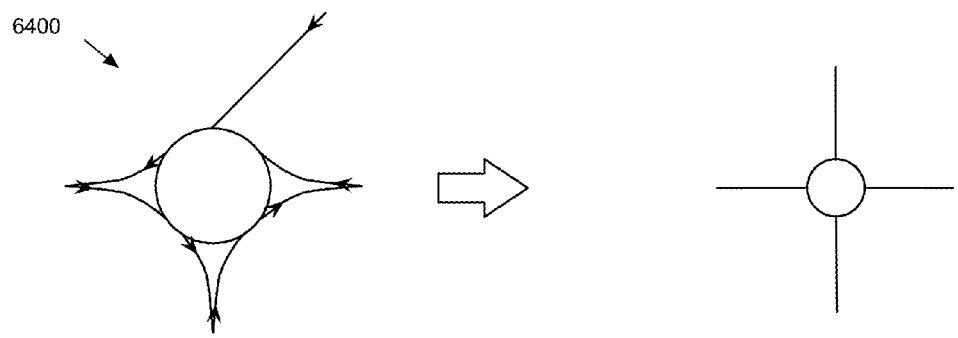
FIG. 64 conceptually illustrates the reduction of a roundabout intersection to intersection data in some embodiments.

In order to calculate the angles of the branches, some embodiments determine where the branch intersects the roundabout, rather than the angle of approach of the road. For entrance/exit combinations, the process takes the average of the two paths. FIG. 64 conceptually illustrates the reduction of a roundabout intersection 6400 to intersection data. The top path, despite approaching at approximately a 30° angle off of North, is designated as a 0° branch—the user is primarily interested in the distance around the traffic circle for the intersections, rather than the angle at which they enter and exit. The other three branches are also designated cardinal directions, because their flares average out to these directions. The data structure 6300 shows the data structure for the roundabout junction 6400. Other embodiments, however, use the angle at which the paths enter or exit the roundabout, rather than the distance around the roundabout at which the paths intersect it.

The following represents pseudocode of some embodiments for generating the data for a roundabout intersection once the roundabout segments have been identified for the intersection:

For set of roundabout segments that form a simple loop:
    Gather all non-roundabout segments that touch the loop, ordered by the direction of travel around the loop;
    Group together pairs of consecutive roundabout exit/entry segments that represent same road;
    Assign an angle to each pair and each unpaired segment;
    Subtract the smallest angle from all angles (so smallest angle=0);
    Construct a template intersection pattern with one branch for each angle;
    If pattern exists for previously generated intersection, use existing pattern to save space (refer intersection to existing pattern);
    Else if pattern does not exist, create and store new entry for pattern;

As indicated in the above examples of pseudocode, some embodiments perform additional compression when storing the intersections. The real world contains millions (or hundreds of millions) of individual intersections, but many of these intersections have the same configuration (especially when very small angular variations are tolerated). Thus, rather than storing separate data for each of the hundreds of millions of intersections, some embodiments utilize compression in storing the intersections. As each intersection is processed, some embodiments store a template pattern for that intersection. When additional intersections with the template pattern are identified, such embodiments store a reference to that pattern (while still creating a separate data structure, as the location information is different for two intersections that follow the same pattern).

3. Modification of Junction Data for Navigation

The above subsection described the generation of complex intersection data, typically done as an offline process prior to route generation. However, at the time of route generation, some embodiments modify the intersection data for transmission to the user. The mapping service providing the route data modifies the angles to make them relative to the direction of entry and marks one of the branches as an exit branch.

Figure 65:
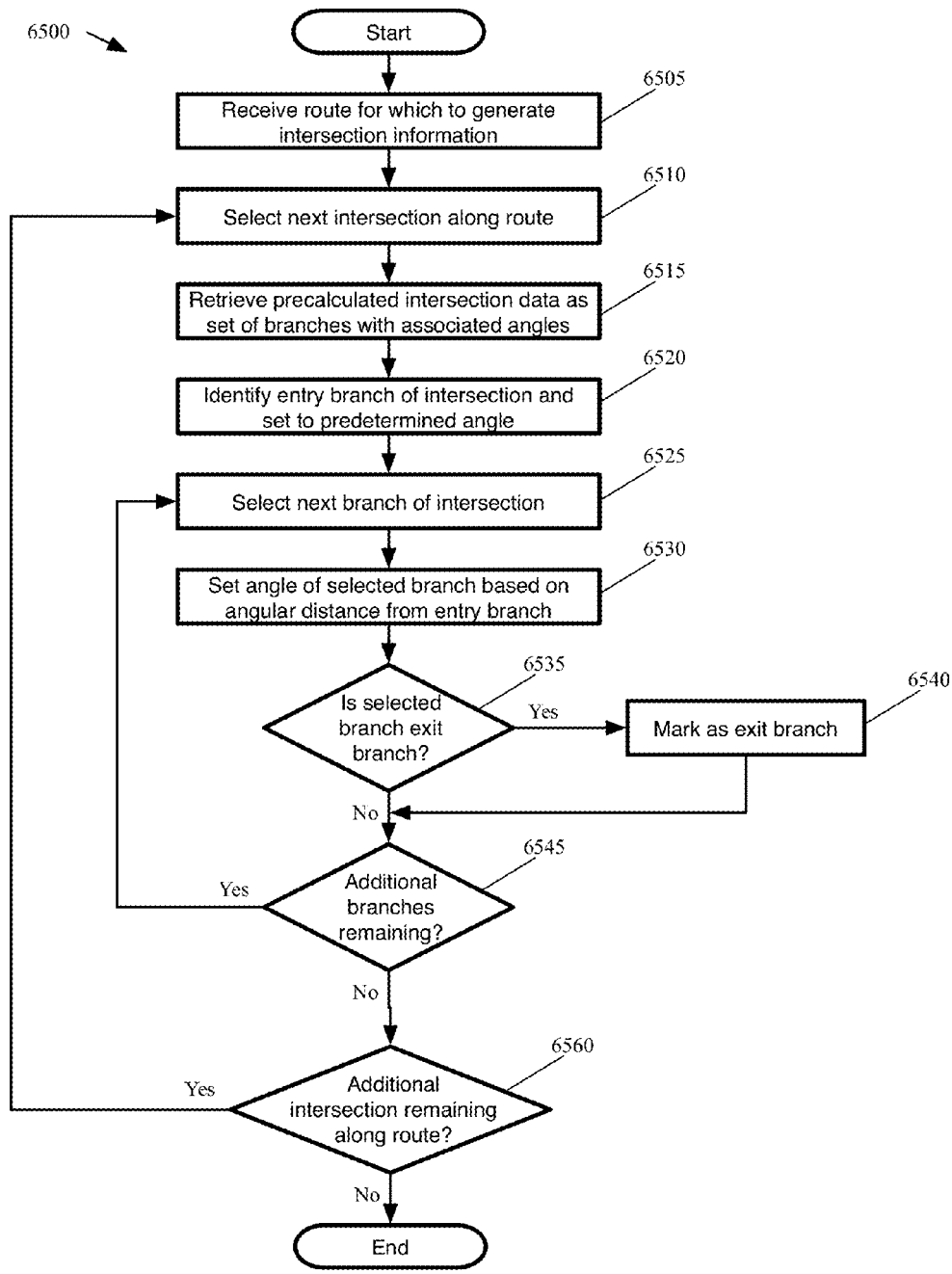
FIG. 65 conceptually illustrates a process of some embodiments for modifying intersection data in order to provide navigation information for a route.

FIG. 65 conceptually illustrates a process 6500 of some embodiments for modifying intersection data in order to provide navigation information for a route. As shown, the process begins by receiving (at 6505) a route for which to generate intersection information. As mentioned above, some embodiments generate one or more routes for each set of starting and ending locations requested by a user device. Each of these routes consists of a series of maneuvers at various path intersections (i.e., at road intersections).

As shown, with the route identified, the process 6500 selects (at 6510) the next intersection along the route. Some embodiments begin with the first intersection (i.e., the first maneuver a user following the route will make), starting from the start point of the route. Many routes involve long stretches along a particular road, going straight through numerous intersections (possibly including junctions of two road segments that are part of the same road and at which no other roads intersect). In some embodiments, the navigation instructions do not include information about the intersections at which no turning maneuver is made. Accordingly, the next intersection is actually the next intersection along the route at which a maneuver will be made.

The process then retrieves (at 6515) precalculated intersection data as a set of branches with associated angles. As described above, some embodiments store a data structure for each intersection, which lists the branches of the intersection along with angles for each branch. FIGS. 62 and 63 illustrate examples of such data structures, for both a point intersection and a roundabout intersection.

After retrieving the data structure for the selected intersection, the mapping service rotates the intersection definition to normalize the definition to the direction at which the route enters the intersection. Accordingly, the process 6500 identifies (at 6520) the entry branch of the intersection and sets the entry branch to a predetermined angle. Some embodiments set the direction of movement into the intersection as 0°, and therefore set the entry branch of the intersection to 180°.

The process then rotates the other branches of the intersection. As shown, the process selects (at 6525) a next branch of the intersection. In some embodiments, the branches and angles are stored in an array, list, or similar data structure, and the process traverses this data structure. The process sets (at 6530) the angle of the selected branch based on an angular distance from the entry branch. For example, if the entry branch was stored as 0° (i.e., pointing North), then a branch stored as 95° will be shifted 180° to −85°. In addition, the process determines (at 6535) whether the selected branch is the exit branch of the junction (i.e., the branch at which the route exits the intersection). In order for the turn-by-turn navigation instructions at the client mapping/navigation application to properly display the maneuvers, the device needs to know along which branch of the intersection the route exits. Thus, when the selected branch is the exit branch, the process 6500 marks (at 6540) the selected branch as such. The process then determines (at 6545) whether any additional branches of the intersection remain to be converted for the route. When additional branches remain, the process returns to 6525 to select the next branch of the junction. When all branches have been processed for the current intersection, the process 6500 determines (at 6560) whether additional intersections remain along the route that need to be modified. When additional intersections remain, the process returns to 6510 to select the next intersection. When the last intersection is modified, the process ends.

Figure 66:
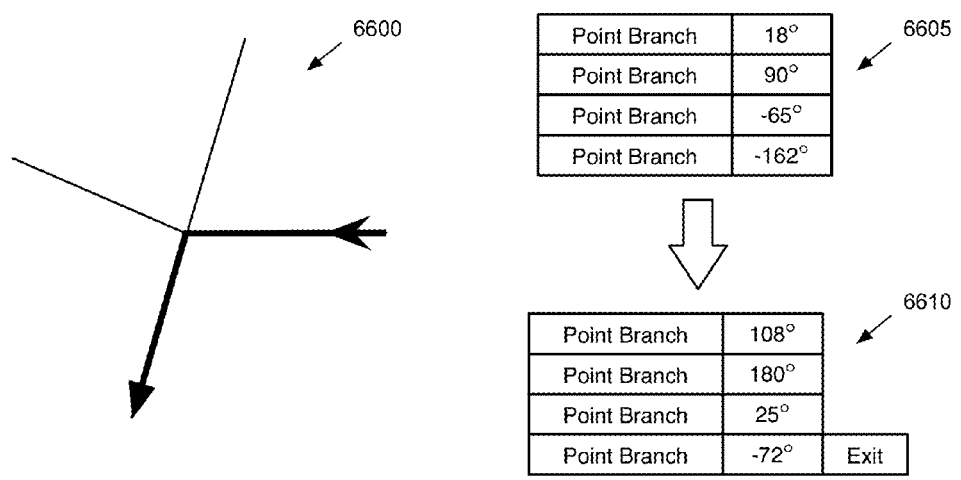
FIG. 66 illustrates a conceptual drawing of a route taken through an intersection, a data structure for the intersection, and the modification of the data structure to create a new data structure for turn-by-turn navigation instructions.

FIG. 66 illustrates a conceptual drawing of a route taken through an intersection 6600, a data structure 6605 for the intersection, and the modification of the data structure to create a new data structure 6610 for turn-by-turn navigation instructions. As shown, the route enters from the right side (the 90° branch) and exits the intersection at the bottom (the −162° branch). In the modified data structure, the entry branch has been rotated to 180°, causing a 90° rotation of the other branches. The branch at 18° rotates to 108°, the branch at −65° rotates to 25°, and the branch at −162° rotates to −72°. In addition to the rotation angles, the data structure 6610 has the last branch marked as the exit for the navigation. Some embodiments include a binary exit field, with the exit branch marked with a '1' and all other branches marked with a '0'.

D. Generation of Land Cover Geometry

In addition to generating road geometry for map tiles, some embodiments also generate land cover geometry. Much like road segment data is received from various sources, so may data describing land cover (e.g., as a series of vertices that indicate the boundary of a particular land cover body). The land cover may include bodies of water (e.g., rivers, oceans, lakes, swimming pools, etc.), administrative bodies (e.g., boundaries of states, countries, cities, parks, etc.), area designations (e.g., rural/urban/suburban, desert/mountains/forest, etc.), or other data describing the land between roads. Initially, some embodiments use these coordinates to grow geometries for the land cover items.

After growing geometries for the land cover, some embodiments use various operations to resolve boundaries between the geometries. For example, when combining data from different sources, the location data indicating object boundaries may not align perfectly and therefore there may be either gaps between the object geometries or overlap of the geometries. Some embodiments use different operations for resolving boundaries between different geometries, depending on the types of objects. In addition, the land cover geometry processing uses the road segment data to fill in the land cover geometry and ensure that gaps are not left between the land cover and the roads. Some embodiments grow the land cover geometries outside of their marked boundaries towards the roads, stopping the geometries at road centerline locations. While this creates an overlap between the land cover geometry and road geometry, in some embodiments the client mapping applications include instructions to render road geometry on top of land cover geometry. The following subsections describe some of these different methods for resolving discrepancies or mismatches between various land cover boundaries.

1. Conflating Land Cover to Roads

Figure 67:
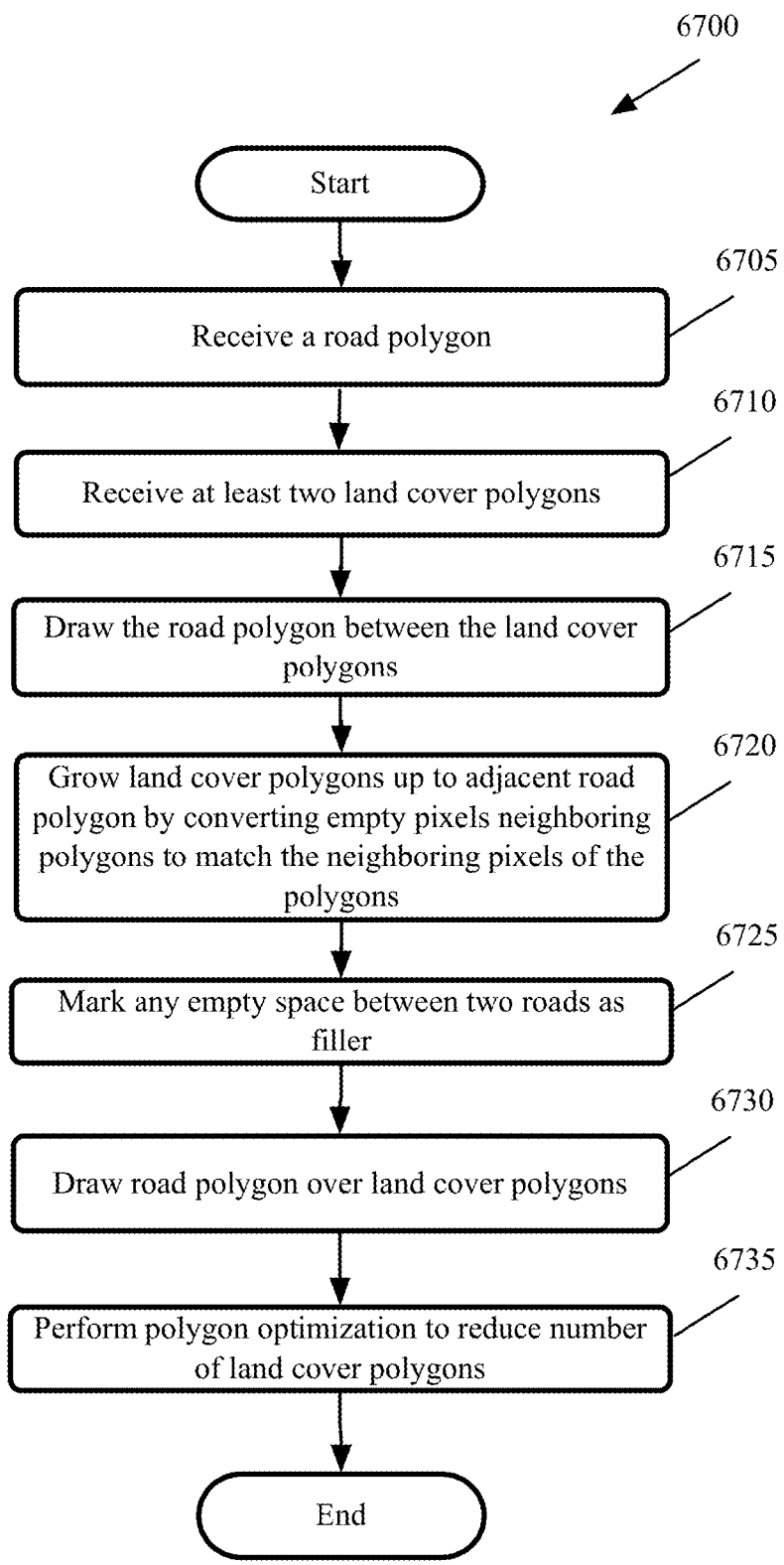
FIG. 67 conceptually illustrates a process performed by some embodiments of the invention perform for conflating land cover polygons to road polygons.

FIG. 67 conceptually illustrates a process 6700 that some embodiments of the invention perform for conflating land cover polygons to road polygons. In some embodiments the process of conflating land cover polygons is performed in order to resolve data mismatches that occur from receiving land cover polygon data and road polygon data from different data sources. The process of conflating land covers will be described with reference to FIG. 68, which illustrates one example for conflating land covers to road polygons in three stages 6801-6803.

Figure 68:
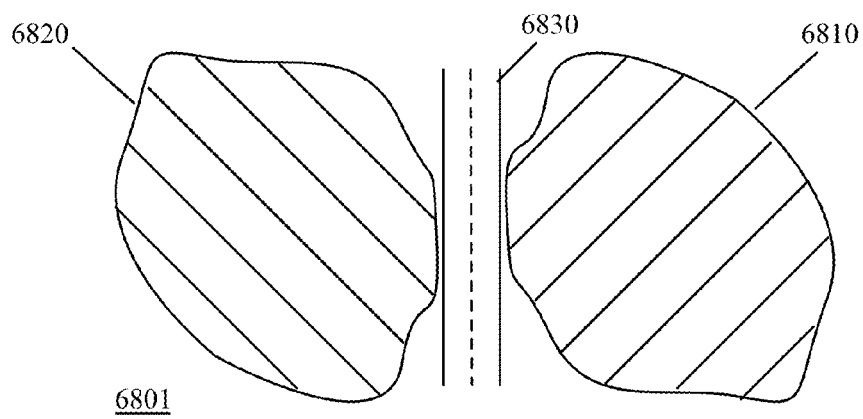
FIG. 68 illustrates one example of conflating land covers to road polygons.
Figure 68:
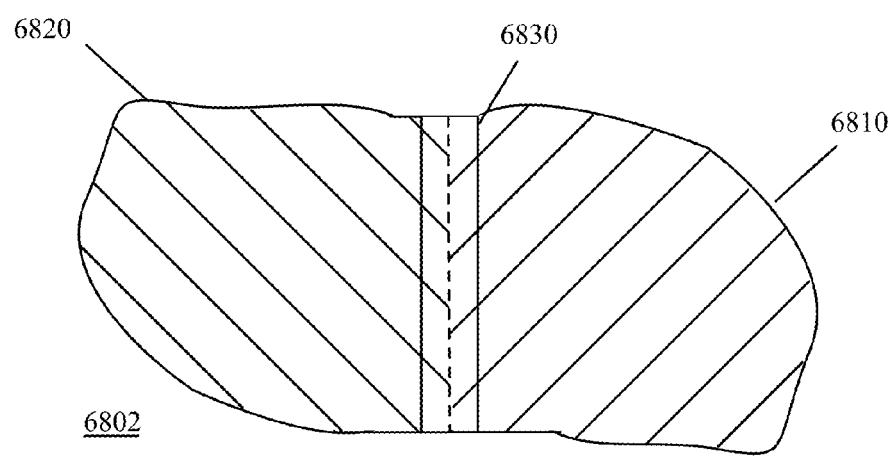
Figure 68:
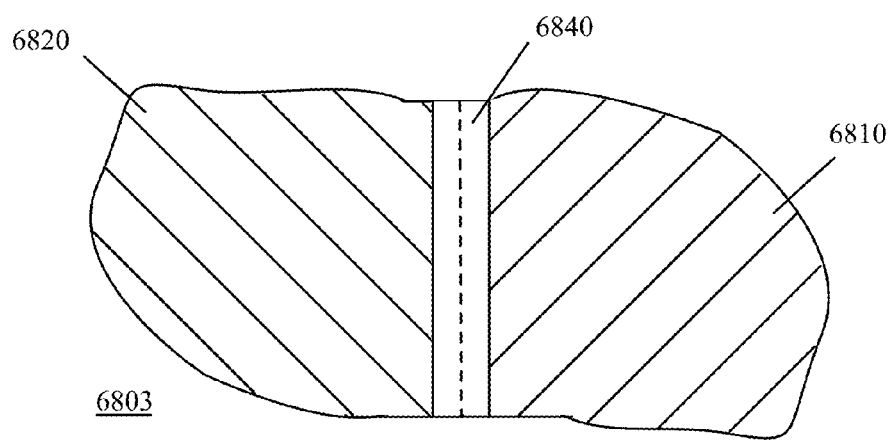

As shown in FIG. 67, process 6700 receives (at 6705) a road polygon. The process 6700 then receives (at 6710) at least two land cover polygons. In some embodiments the road polygon and the land cover polygons are received from two different data sources, while in other embodiments they are received from the same data source. Stage 6801 in FIG. 68 illustrates an example of two such land cover polygons 6810 and 6820. In this example, different land cover types are illustrated by each land cover polygon. For instance, land cover 6820 can be a lake and land cover 6810 can be a park. However, in other embodiments land cover polygons 6810 and 6820 could be of the same type. Furthermore, the process may receive more than two land cover polygons, which are not illustrated for simplicity. First stage 6801 also illustrates an empty space in between the two land cover polygons. Since land covers represent all areas except roads, the empty space is assumed to represent the location of where a road normally runs. However, due to irregularity of the space between the two land covers 6810 and 6820, if a road is drawn between the two land cover polygon, there would be irregular empty space between the road and the land covers that are not visually appealing when the map is rendered on a user device. Process 6700, therefore, conflates the land covers to the road as described below.

Process 6700 draws (at 6715) the road polygon in the empty space between the two land cover polygons as illustrated by road polygon 6830 in stage 6801 of FIG. 68. In some embodiments this road polygon represents the road that is located between the two land cover polygons. In some embodiments a road may not fit cleanly in the center of the empty space. Portions of the road, or the entire road may overlap one or both polygons. For simplicity, process 6700 is described under the assumption that the road is located in the space between the land cover polygons.

Next, process 6700 grows (at 6720) the land cover polygons up to the road polygon. For instance, as shown in stage 6802 in FIG. 68, the process expands the left side of land cover polygon 6810 until the polygon reaches the right side of road polygon 6830. The process also expands the right side of polygon 6820 until it reaches the left side of road polygon 6830. In some embodiments when the road polygon does not lie entirely in the center space between the land cover polygons, the, process alternatively grows the land cover polygons to the center of the gap. In other embodiments, the land cover polygons grow past the road geometry, covering portions or all of the road geometry.

In order to perform this expansion of step 6720, the process, in some embodiments, rasterizes the polygons prior to expansion. By rasterizing the polygons, the process generates pixel data for the pixels within each land cover polygon. The conflation process uses this pixel data to fill in neighboring pixels with similar data. For instance, if an empty pixel is neighboring a pixel of a land cover polygon that is of a type representing a paved area, the empty pixel also becomes of a type representing the same paved area. The process grows the empty pixels in this manner until they reach road polygon 6830, which acts as a barrier to end the polygon expansion process.

Although FIG. 68 illustrates an example where only one road polygon is drawn, other embodiments include multiple road polygons representing more than one road between the two land cover polygons. In such instances, empty space may remain between two roads because the land cover polygons are not expanded into the space between the two roads (i.e., the roads act as barriers for polygon expansions).

When empty space remains between the two roads, process 6700 marks (at 6725) the empty space between the roads as filler. In some embodiments the marked fillers are interpreted and rendered according to different instructions on a client application. For instance, in some embodiments, the user device renders these empty spaces as road dividers. In other embodiments, the user device renders these empty spaces as green space, asphalt, etc.

After marking any empty space that may exist between two roads, some embodiments convert the newly grown pixels into vectors to reduce the number vertices from the land cover polygons and union of the grown pixels with the original received polygons from step 6710 of process 6700. The process then draws (at 6730) the road over the road polygon. The drawn road may also overlap the polygons next to the road polygon, in some embodiments. Third stage 6803 of FIG. 68 illustrates operation 6730 of process 6700 where the process draws a road 6840 over the road polygon between the two polygons 6820 and 6810. In this example road 6840 covers the road polygon and overlaps portions of polygons 6810 and 6820.

Next, the process optionally performs (at 6735) polygon optimization on certain land cover polygon types to reduce the number of vertices in the land cover polygon. In some embodiments this process involves removing certain land cover polygons of a particular type and drawing land cover polygons on a separate layer. For instance, this optimization technique could be performed on small bodies of water such as swimming pools (or ponds) that generate a large number of vertices within the polygons corresponding to the pool and the area around it. For instance, four swimming pool surrounded by a paved area are represented as four polygons to represent the pools themselves. In addition, the paved area is represented as a polygon with four holes in it. In some embodiments, the polygons corresponding to the swimming pools and their corresponding holes are removed and placed in a separate layer. The paved area is drawn and the pools are drawn over it. In this way, the number of points related to the pools is reduced.

2. Conflating Boundaries based on Reliability or Quality of Source Data

Figure 69:
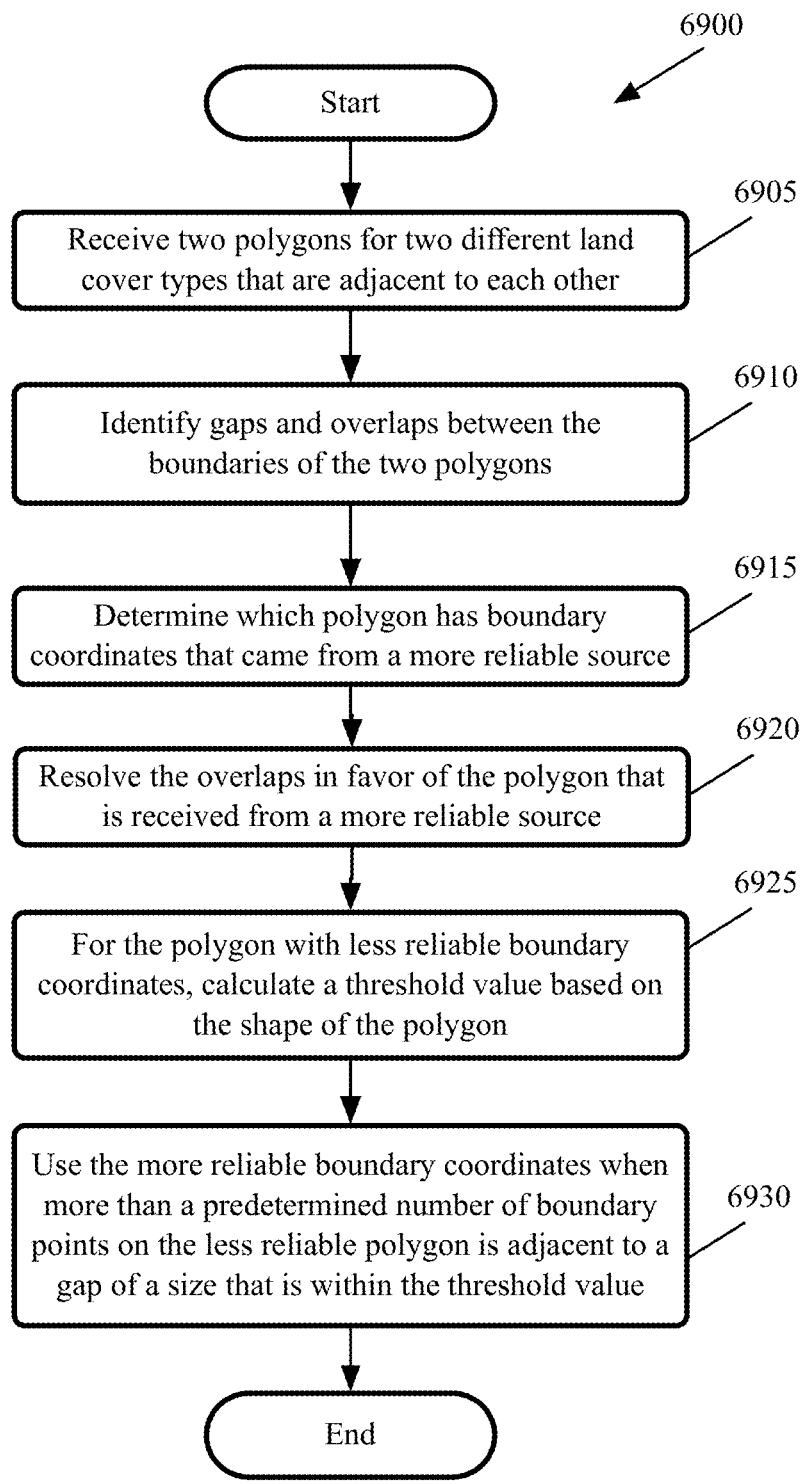
FIG. 69 conceptually illustrates a process that conflates boundaries between adjacent polygons received from two different sources in some embodiments.
Figure 70:
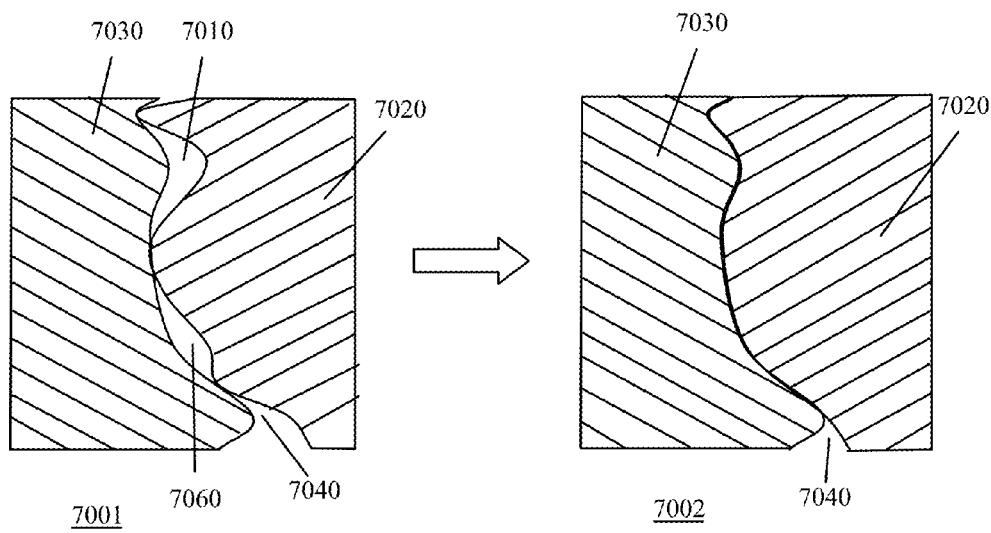
FIG. 70 illustrates two stages of some embodiments of the invention that resolve identified gaps by conflating boundary coordinates between adjacent polygons.
Figure 71:
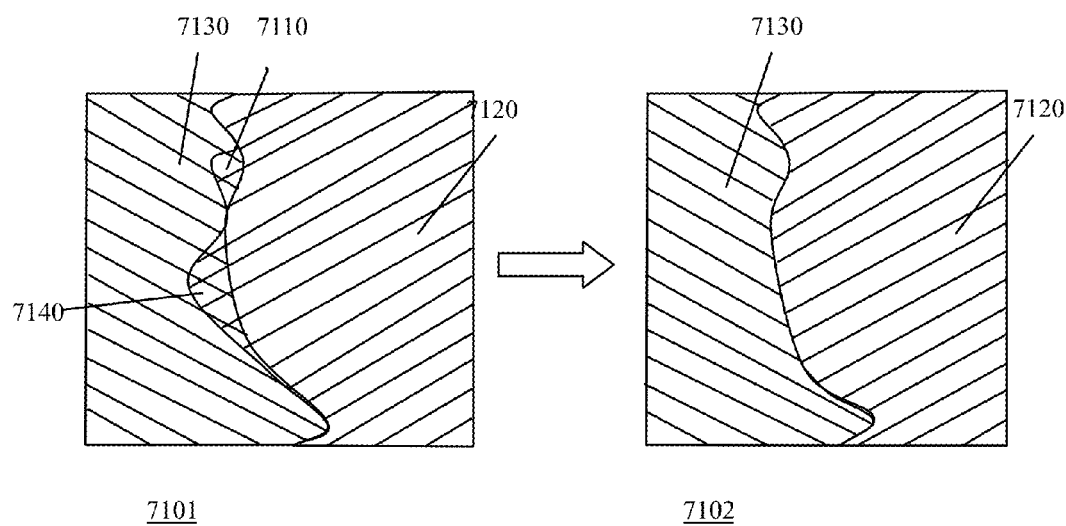
FIG. 71 illustrates two stages of some embodiments of the invention that conflate the boundary coordinates of polygons around identified overlaps.

FIG. 69 conceptually illustrates a process 6900 that conflates boundaries between adjacent polygons received from two different sources in some embodiments. Process 6900 is performed in some embodiments to resolve mismatched boundary coordinates received from different sources where one data source is considered more reliable than the other. The process of conflating boundary coordinates will be described with reference to FIG. 70 and FIG. 71. FIG. 70 illustrates two stages 7001 and 7002 of some embodiments of the invention that resolve identified gaps 7010, 7040, and 7060 by conflating boundary coordinates between adjacent polygons 7020 and 7030. FIG. 71 illustrates two stages 7101 and 7102 in some embodiments of the invention that conflate the boundary coordinates of polygons 7120 and 7130 around identified overlaps 7110 and 7140.

As shown in FIG. 69, the process 6900 receives (at 6905) two polygons for two different land cover types that are adjacent to each other. For instance, the two land cover types may be representative of oceans and parks. The process may also receive several other land cover types representative of other map features. Next, the process identifies (at 6910) any gaps and overlaps between the boundaries of the two polygons.

As shown in stage 7001 in FIG. 70, there are gaps 7010, 7040, and 7060 between polygons 7020 and 7030. As shown in FIG. 71, there are overlap areas 7110 and 7140 between polygons 7120 and 7130. Although illustrated as separate figures for simplicity, some embodiments of the invention may conflate the polygon boundary coordinates around both gaps and overlaps occurring between the same two polygon during the conflation process.

Referring back to FIG. 69, after identifying the gaps and overlaps between the polygon boundaries, process 6900 determines (at 6915) which polygon has boundary coordinates that came from a more reliable source, thus having more reliable boundary coordinates. For instance if polygon 7120 represents ocean and polygon 7130 represents a park and the vendor or the source that provides ocean polygons is considered a more reliable or a better quality source, the process resolves the overlaps (at 6920) in favor of the more reliable data. In some embodiments, the process resolves the overlaps in favor of data that represents a particular type of polygon. For instance in the above ocean/park example, the process may determine that ocean polygons are more reliable than park polygons and resolve the overlaps in favor of the more reliable ocean polygon data. Other embodiments resolve the overlaps in favor of polygons of a greater or lesser size. For instance, some embodiments resolve the overlaps in favor of the polygon with the greatest perimeter length or the largest surface area, while other embodiments resolve the overlaps in favor of the polygon with the shortest perimeter length or smallest surface area. As shown in stage 7102 of FIG. 71, the overlap areas 7110 and 7140 are removed by matching the boundaries of the less reliable polygon 7120 to align with the boundaries of the more reliable polygon 7130. In other words, the coordinates of the more reliable polygon 7130 are used to determine the boundary between the two regions.

In order to resolve gaps, for the polygon with less reliable boundary coordinates (or lower quality data), the process calculates (at 6925) a threshold value based on the shape of the polygon. In some embodiments the shape of the polygon is based on the area of the polygon divided by the perimeter of the polygon, multiplied by a scaled factor. When more than a predetermined number of boundary points on the polygon with less reliable coordinates are closer to the more reliable polygon than the threshold value, the process (at 6930) uses the boundary coordinates of the more reliable polygon and extends the less reliable region to join the more reliable region. Once the distance between the two polygon is more than the threshold, the two polygons are left separated. For instance, if polygon 7030 in FIG. 70 is from a more reliable source (or has better data quality), the gaps 7010 and 7060 (which in this example are less than the calculated threshold) are closed by extending the less reliable region 7020 boundaries to the boundaries of region 7030. In other words, the boundary coordinates of region 7030 is used for both regions in the areas of gaps 7010 and 7060. On the other hand, the distance between the two region in a portion of gap 7040 in this example is more than the calculated threshold. Gap 7040 is, therefore, only partially closed.

In these examples, gaps and overlaps are conflated in favor of the more reliable boundary data. However, other embodiments may conflate boundary coordinates around gaps and overlaps in other ways including conflation in favor of the polygons or boundary data with the most detail.

3. Conflating Region Boundaries Based on Analysis of Border Data

Figure 72:
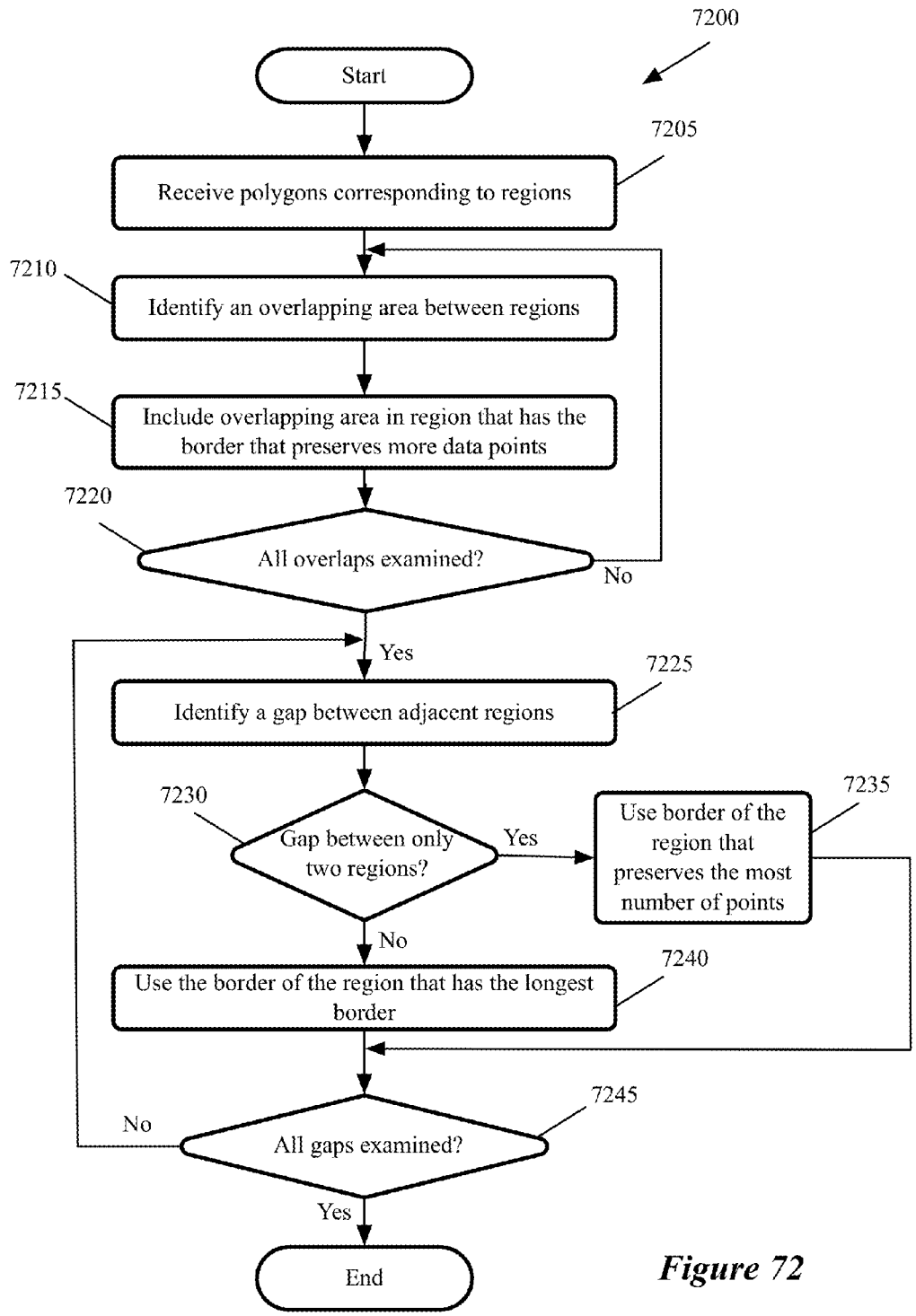
FIG. 72 conceptually illustrates a process performed by some embodiments of the invention for resolving border conflicts between regions.

FIG. 72 conceptually illustrates a process 7200 that is performed by some embodiments of the invention for resolving border conflicts between regions. The regions can be any land cover regions such as bodies of water, parks, building, etc. The regions can also be administrative regions such as states, cities, counties, international countries, etc. The process extracts the borders in order to resolve mismatches when two sets of data are given for a common border. Such mismatches may occur, for example, when regional border data for a common boundary is obtained from different sources. Process 7200 attempts to resolve the mismatch in favor of a single border.

As shown in FIG. 72, process 7200 receives (at 7205) polygons corresponding to different regions. The process then identifies (at 7210) an overlap between the regions. The process resolves the overlap by including (at 7215) the overlapping area in the region with the border that preserves the most border data points. In some embodiments step 7215 involves subtracting a first polygon from a second polygon or vice versa. Some embodiments resolve the overlap based on which of the aforementioned operations has more border data points, to preserve more border details.

Next, process 7200 determines (at 7220) if all overlapping areas have been examined. If not, the process returns to step 7210 to identify another overlapping area between different regions.

After all overlapping areas have been examined, process 7200 continues to step 7225 to identify a gap between adjacent regions. Some embodiments of the invention obtain a list of gaps between adjacent borders by taking the union of all regions and subtracting all regions where overlaps have already been examined.

Once the process identifies a gap between adjacent regions, process 7200 determines (at 7230) if the gap is between only two regions. If yes, the process uses (at 7235) the border of the region that preserves the most number of points along the boundary. Otherwise, the gap is between three or more regions. In that case the process uses (at 7240) the border of the region that has the longest border. However, in some embodiments, if the gap is between 4 or more states, the process may flag the gap for analysis by a human. The process then determines (at 7245) if all gaps have been examined. If no, the process returns to step 7225 to identify another gap. If yes, then the process ends.

Figure 73:
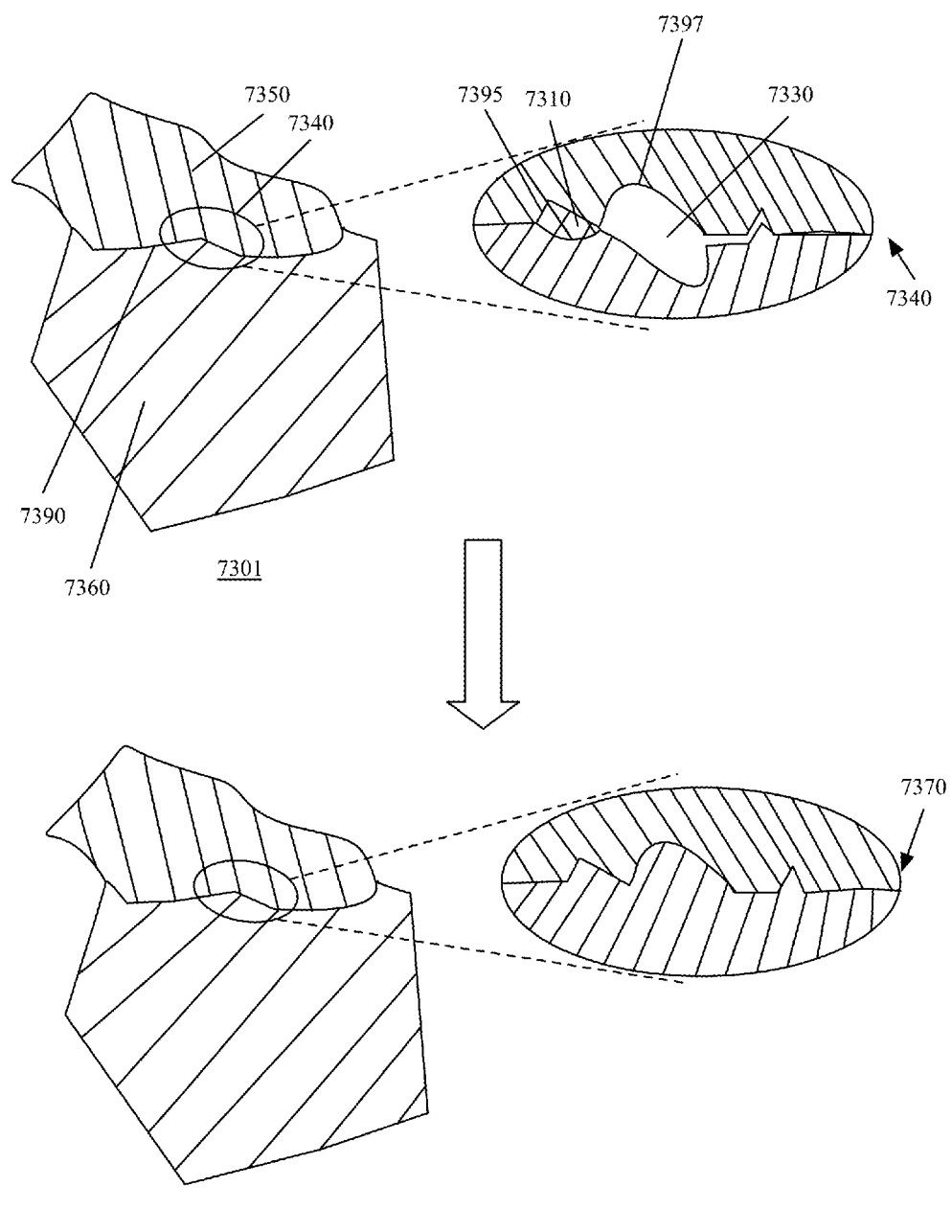
FIG. 73 illustrates an example of resolving a border conflict between two adjacent regions.

FIG. 73 illustrates an example of resolving a border conflict between two adjacent regions 7350 and 7360 by performing process 7200. Although only two regions are illustrated by FIG. 73 for simplicity, process 7200 could be performed on a mismatched border between several regions. As illustrated, regions 7350 and 7360 share a common border 7390. However border conflicts exist between the two regions. First stage 7301 of FIG. 73 illustrates a blown out portion 7340 of the border 7390 between regions 7350 and 7360. The blown out portion 7340 illustrates examples of border conflicts such as an overlap 7310 and a gap 7330 that could be resolved by performing process 7200.

Second stage 7302 of FIG. 73 illustrates a blown out portion of how a border 7370 might look after process 7200 is performed on border 7390. Referring back to FIG. 72, process 7200 would first identify (at 7210) overlap 7310 and resolve the conflict by including (at 7215) the portion of the region that preserves the most border data points. In the example illustrated by FIG. 73, process 7200 determined that the border 7395 around region 7360 preserves more border data points and included that border as shown in stage 7302. Process 7200 then identifies (at 7225) that gap 7330 has to be resolved. The process attempts to remove the gap 7330 between regions 7350 and 7360 also by using (at 7235) the border that preserves more border data points. In the example illustrated by FIG. 73, process 7200 determined that for this portion of the border, the border 7397 around region 7350 preserved more border data points and included that border as shown in stage 7302. In some embodiments, some or all of the operations defined in processes 67, 69, and 72 are performed by one or more software modules.

E. Tile Generation

One of the last operations performed by the set of servers that generate the map tiles is the tile cut operation, which generates the map tiles and encodes the geometric and vector data in these tiles. In some embodiments, the set of servers defines a map in terms of a tile tree with multiple levels that correspond to multiple zoom levels for viewing the map. For instance, the tile tree data structure in some embodiments is a quadtree with twenty one levels that correspond to twenty one zoom levels for viewing the map. In the quadtree, each node is a map tile, and each non-leaf node has four child tile nodes.

The tile cut operation has several novelties. One novelty is the fast mechanism that it uses to associate each geometry that was generated for a map to one or more tiles in the tile quadtree. This fast mechanism in some embodiments uses distributed computing to quickly associate the large number of geometries in the map with the large number of map tiles. The task of determining whether each geometry should be associated with a tile is treated as a task independent of other similar tasks, each of which can be assigned to different computing resource in a distributed computing environment.

For instance, one computing resource can determine whether one geometry intersects one tile. If it does, then for each tile's children, a separate intersection operation is performed in order to determine whether the geometry intersects the child tile. A separate computing resource can perform each distinct intersection operation independently of the other computing resources. This process can be viewed as "throwing" a geometry down a tile quad tree, identifying each tile node that the geometry intersects, and then sending an intersected portion of the geometry to each child node of each intersected node to determine whether the child node intersects the geometry. The geometries that are identified for each tile node are then used in the tile cut process to generate the tile.

Another novelty relates to the fast mechanism that it uses to re-encode road vector data in the map tiles to remove unnecessary data. Again, the tile cut operation uses distributed computing to distribute this task of re-encoding the vector data. Each distributed task involves initially recording the road data (which may be overlapping) of each tile on the same canvas in order to merge overlapping road geometries. The task then involves re-vector encoding this data to generate vector data that is not duplicative.

This tile cut operation of some embodiments is further described in the U.S. Provisional Patent Application 61/657,872, entitled "Scalable and Efficient Cutting of Map Tiles," filed Jun. 10, 2012; the concurrently filed U.S. patent application Ser. No. 13/632,003, entitled "Scalable Processing for Associating Geometries with Map Tiles", issued as U.S. Pat. No. 9,325,906; and the concurrently filed U.S. patent application Ser. No. 13/632,004, entitled "Scalable and Efficient Cutting of Map Tiles", published as U.S. Patent Publication 2013-0328879. The provisional application 61/657,872 and the above-mentioned concurrently filed non-provisional applications are incorporated herein by reference.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 74:
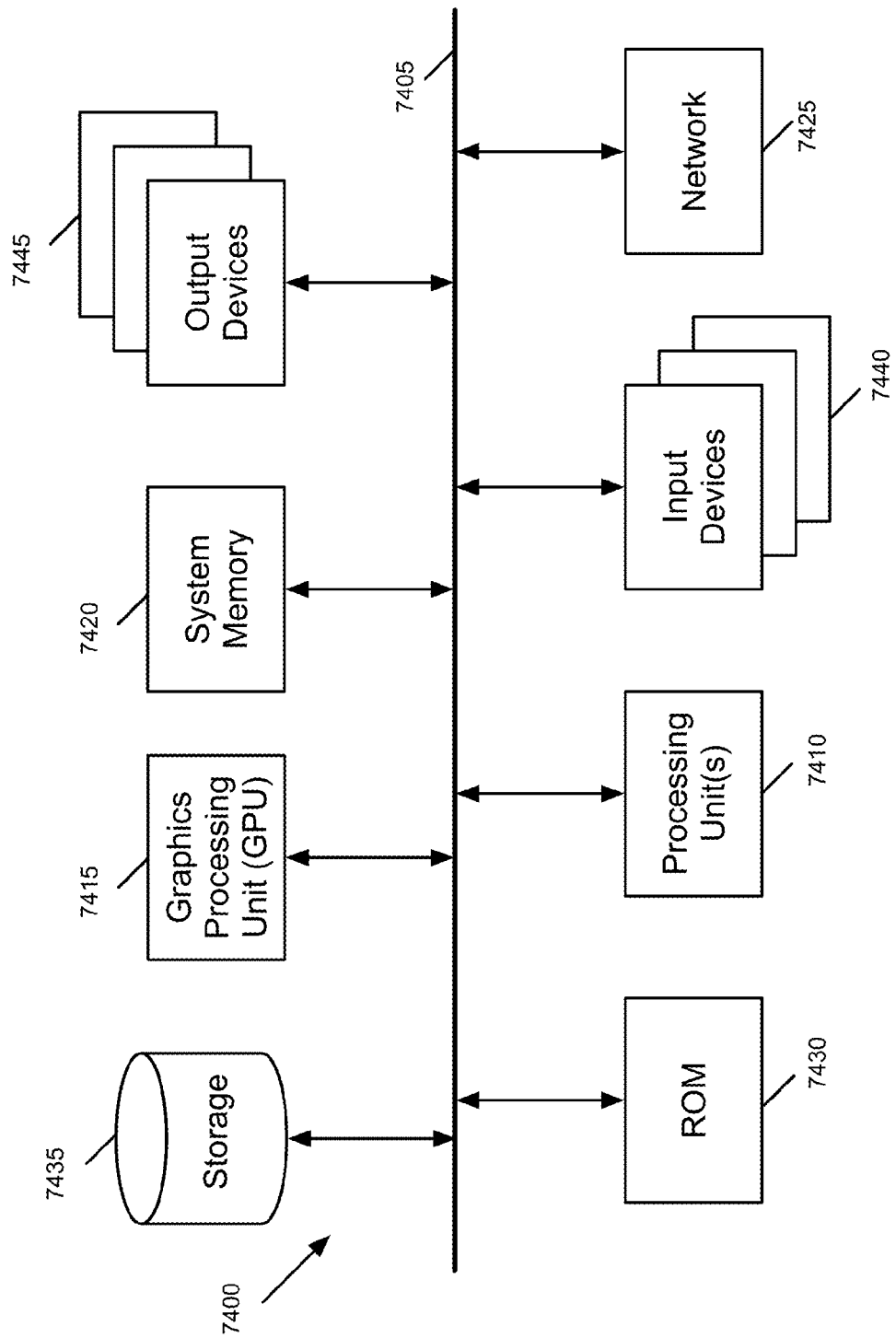
FIG. 74 conceptually illustrates an example of an electronic system with which some embodiments of the invention are implemented.

FIG. 74 conceptually illustrates an example of an electronic system 7400 with which some embodiments of the invention are implemented. The electronic system 7400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 7400 includes a bus 7405, processing unit(s) 7410, a graphics processing unit (GPU) 7415, a system memory 7420, a network 7425, a read-only memory 7430, a permanent storage device 7435, input devices 7440, and output devices 7445.

The bus 7405 collectively represents all system, peripheral, and chip set buses that communicatively connect the numerous internal devices of the electronic system 7400. For instance, the bus 7405 communicatively connects the processing unit(s) 7410 with the read-only memory 7430, the GPU 7415, the system memory 7420, and the permanent storage device 7435.

From these various memory units, the processing unit(s) 7410 retrieves instructions to execute and data to process in order to execute the processes of the invention. The processing unit(s) may be a single processor or a multi-core processor in different embodiments. Some instructions are passed to and executed by the GPU 7415. The GPU 7415 can offload various computations or complement the image processing provided by the processing unit(s) 7410. In some embodiments, such functionality can be provided using CoreImage's kernel shading language.

The read-only-memory (ROM) 7430 stores static data and instructions that are needed by the processing unit(s) 7410 and other modules of the electronic system. The permanent storage device 7435, on the other hand, is a read-and-write memory device. This device is a non-volatile memory unit that stores instructions and data even when the electronic system 7400 is off. Some embodiments of the invention use a mass-storage device (such as a magnetic or optical disk and its corresponding disk drive, integrated flash memory) as the permanent storage device 7435.

Other embodiments use a removable storage device (such as a floppy disk, flash memory device, etc., and its corresponding drive) as the permanent storage device Like the permanent storage device 7435, the system memory 7420 is a read-and-write memory device. However, unlike storage device 7435, the system memory 7420 is a volatile read-and-write memory, such a random access memory. The system memory 7420 stores some of the instructions and data that the processor needs at runtime. In some embodiments, the invention's processes are stored in the system memory 7420, the permanent storage device 7435, and/or the read-only memory 7430. From these various memory units, the processing unit(s) 7410 retrieves instructions to execute and data to process in order to execute the processes of some embodiments.

The bus 7405 also connects to the input and output devices 7440 and 7445. The input devices 7440 enable the user to communicate information and select commands to the electronic system. The input devices 7440 include alphanumeric keyboards and pointing devices (also called "cursor control devices"), cameras (e.g., webcams), microphones or similar devices for receiving voice commands, etc. The output devices 7445 display images generated by the electronic system or otherwise output data. The output devices 7445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 74, bus 7405 also couples electronic system 7400 to a network 7425 through a network adapter (not shown). In this manner, the computer can be a part of a network of computers (such as a local area network ("LAN"), a wide area network ("WAN"), or an Intranet, or a network of networks, such as the Internet. Any or all components of electronic system 7400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 75:
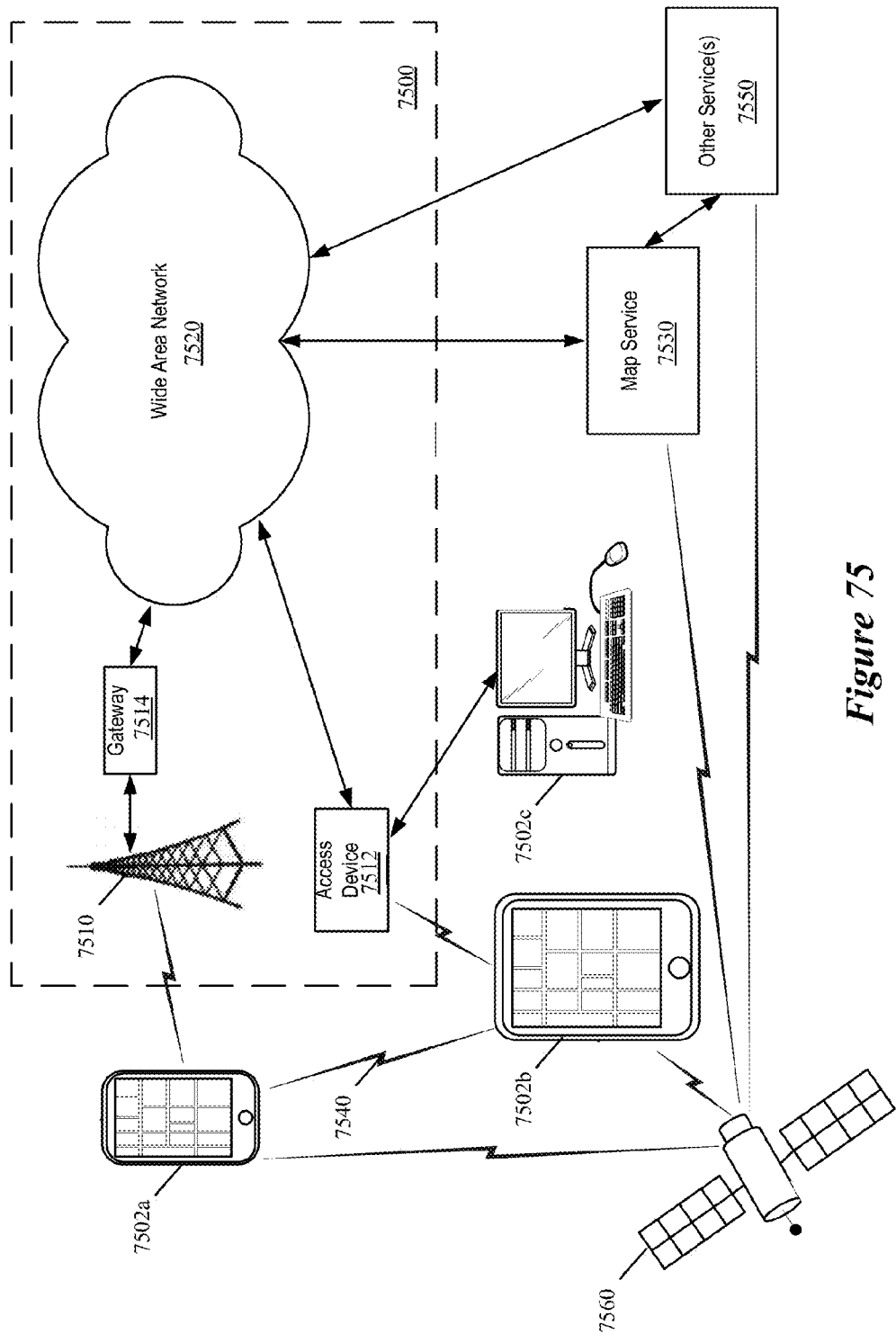
FIG. 75 illustrates a map service operating environment, according to some embodiments.

Various embodiments may operate within a map service operating environment. FIG. 75 illustrates a map service operating environment, according to some embodiments. A map service 7530 (also referred to as mapping service) may provide map services for one or more client devices 7502*a*-7502*c* in communication with the map service 7530 through various communication methods and protocols. A map service 7530 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 7502*a*-7502*c* may utilize these map services by obtaining map service data. Client devices 7502*a*-7502*c* may implement various techniques to process map service data. Client devices 7502a-7502c may then provide map services to various entities, including, but not limited to, users, internal software or hardware modules, and/or other systems or devices external to the client devices 7502a-7502c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format(.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 7502a-7502c) are implemented on different portable-multi-function device types. Client devices 7502a-7502c utilize map service 7530 through various communication methods and protocols. In some embodiments, client devices 7502a-7502c obtain map service data from map service 7530. Client devices 7502a-7502c request or receive map service data. Client devices 7502a-7502c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 75 illustrates one possible embodiment of an operating environment 7500 for a map service 7530 and client devices 7502*a*-7502*c*. In some embodiments, devices 7502*a*, 7502*b*, and 7502*c* communicate over one or more wire or wireless networks 7510. For example, wireless network 7510, such as a cellular network, can communicate with a wide area network (WAN) 7520, such as the Internet, by use of gateway 7514. A gateway 7514 in some embodiments provides a packet oriented mobile data service, such as General Packet Radio Service (GPRS), or other mobile data service allowing wireless networks to transmit data to other networks, such as wide area network 7520. Likewise, access device 7512 (e.g., IEEE 802.11g wireless access device) provides communication access to WAN 7520. Devices 7502*a* and 7502*b* can be any portable electronic or computing device capable of communicating with a map service. Device 7502*c* can be any non-portable electronic or computing device capable of communicating with a map service.

In some embodiments, both voice and data communications are established over wireless network 7510 and access device 7512. For instance, device 7502*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 7510, gateway 7514, and WAN 7520 (e.g., using Transmission Control Protocol/Internet Protocol (TCP/IP) or User Datagram Protocol (UDP)). Likewise, in some implementations, devices 7502*b* and 7502*c* can place and receive phone calls, send and receive e-mail messages, and retrieve electronic documents over access device 7512 and WAN 7520. In various embodiments, any of the illustrated client device may communicate with map service 7530 and/or other service(s) 7550 using a persistent connection established in accordance with one or more security protocols, such as the Secure Sockets Layer (SSL) protocol or the Transport Layer Security (TLS) protocol.

Devices 7502a and 7502b can also establish communications by other means. For example, wireless device 7502a can communicate with other wireless devices (e.g., other devices 7502b, cell phones, etc.) over the wireless network 7510. Likewise devices 7502a and 7502b can establish peer-to-peer communications 7540 (e.g., a personal area network) by use of one or more communication subsystems, such as Bluetooth® communication from Bluetooth Special Interest Group, Inc. of Kirkland, Wash. Device 7502c can also establish peer to peer communications with devices 7502a or 7502b (not shown). Other communication protocols and topologies can also be implemented. Devices 7502a and 7502b may also receive Global Positioning Satellite (GPS) signals from GPS satellites 7560.

Devices 7502a, 7502b, and 7502c can communicate with map service 7530 over the one or more wire and/or wireless networks, 7510 or 7512. For instance, map service 7530 can provide a map service data to rendering devices 7502a, 7502b, and 7502c. Map service 7530 may also communicate with other services 7550 to obtain data to implement map services. Map service 7530 and other services 7550 may also receive GPS signals from GPS satellites 7560.

In various embodiments, map service 7530 and/or other service(s) 7550 are configured to process search requests from any of client devices. Search requests may include but are not limited to queries for business, address, residential locations, points of interest, or some combination thereof. Map service 7530 and/or other service(s) 7550 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 7530 and/or other service(s) 7550 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 7530 and/or other service(s) 7550, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 7530 and/or other service(s) 7550 provide one or more feedback mechanisms to receive feedback from client devices 7502a-7502c. For instance, client devices may provide feedback on search results to map service 7530 and/or other service(s) 7550 (e.g., feedback specifying ratings, reviews, temporary or permanent business closures, errors etc.); this feedback may be used to update information about points of interest in order to provide more accurate or more up-to-date search results in the future. In some embodiments, map service 7530 and/or other service(s) 7550 may provide testing information to the client device (e.g., an A/B test) to determine which search results are best. For instance, at random intervals, the client device may receive and present two search results to a user and allow the user to indicate the best result. The client device may report the test results to map service 7530 and/or other service(s) 7550 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 7, 15, 50, 51, 54, 65, 67, 69, and 72) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a mapping service, a method comprising:
    receiving a road graph comprising a plurality of roads for a map region, each road comprising one or more road segments combined together, each road segment comprising a plurality of vertices, wherein the vertices for the road segments of each road define a centerline of the road;
    automatically identifying a bend in the centerline of a particular road that is at least a threshold angle, wherein a segment of the particular road that includes at least a portion of the identified bend has a defined speed limit;

defining a threshold distance by which a vertex can move based on the speed limit of said segment of the particular road; and based on the defined threshold distance, automatically modifying the vertices of said segment of the particular road around the identified bend in order to smooth the road.

2. The method of claim 1, wherein the defined threshold distance is larger for roads with higher speed limits than for roads with lower speed limits.

3. The method of claim 1, wherein said segment of the particular road is a first road segment, wherein the bend is identified at a meeting of the first road segment and a second road segment.

4. The method of claim 1, wherein the bend is identified at a location within said segment of the particular road.

5. The method of claim 1, wherein automatically modifying the vertices of said segment of the particular road comprises using Laplacian smoothing within a particular distance of the bend to move the vertices near the bend.

6. The method of claim 1, wherein the automatic modification is performed prior to generating geometries for the road graph.

7. The method of claim 1, wherein the road segments comprise metadata defining road properties, wherein the defined threshold distance is further based at least partly on metadata of said segment of the particular road.

8. A non-transitory machine readable medium storing a program for execution by at least one processing unit, the program comprising sets of instructions for:
receiving a road graph comprising a plurality of roads for a map region, each road comprising one or more road segments combined together, each road segment comprising a plurality of vertices, wherein the vertices for the road segments of each road define a centerline for the road;
automatically identifying a bend in the centerline of a particular road that is at least a threshold angle, wherein a segment of the particular road that includes at least a portion of the identified bend has a defined speed limit;
defining a threshold distance by which a vertex can move based on the speed limit of said segment of the particular road; and
based on the defined threshold distance, automatically modifying the vertices of said segment of the particular road around the identified bend in order to smooth the road.

9. The non-transitory machine readable medium of claim 8, wherein roads with higher speed limits are allowed larger vertex movements than roads with lower speed limits.

10. The non-transitory machine readable medium of claim 8, wherein said segment of the particular road is a first road segment, wherein the bend is identified at a meeting of the first road segment and a second road segment.

11. The non-transitory machine readable medium of claim 8, wherein the set of instructions for automatically modifying the vertices of said segment of the particular road comprises a set of instructions for using Laplacian smoothing within a particular distance of the bend to move the vertices near the bend.

12. A non-transitory machine readable medium storing a program for execution by at least one processing unit, the program comprising sets of instructions for:
for a set of road segments that intersect at a junction in a map region, generating an initial set of geometries for use in generating downloadable map information for the map region; and for each corner formed between two geometries at the junction,
determining whether to perform a smoothing operation based on an angle formed at the corner;
when the angle is greater than a first threshold angle, modifying the two geometries to smooth the corner by applying a first smoothing operation;
when the angle is greater than a second threshold angle and less than the first threshold angle, modifying the two geometries to smooth the corner by applying a second smoothing operation; and
when the angle is greater than a third threshold angle and less than a fourth threshold angle, modifying the two geometries to smooth the corner by applying a third smoothing operation.

13. The non-transitory machine readable medium of claim 12, wherein a second set of road segments meet at a second junction, wherein the second set of road segments comprises only a first road segment and a second road segment that are parts of the same road.

14. The non-transitory machine readable medium of claim 13, wherein the initial set of geometries is a first initial set of geometries, wherein the first and second road segments have different widths, the program further comprising sets of instructions for:
generating a second initial set of geometries for the second set of road segments; and
modifying the geometries of the second initial set by tapering at least one side of the first road segment to meet a side of the second road segment.

15. The non-transitory machine readable medium of claim 14, wherein prior to modification the geometry for the first road segment aligns with the geometry for the second road segment on a first side of the road at the junction and does not align with the geometry for the second road segment on a second, opposite side of the road, forming unrealistic 9020 angles in the second side of the road.

16. The non-transitory machine readable medium of claim 14, wherein the first road segment is wider than the second road segment.

17. The non-transitory machine readable medium of claim 14, wherein the first road segment is narrower than the second road segment.

18. The non-transitory machine readable medium of claim 12, wherein the initial geometry for a particular road segment comprises two road sides parallel to a centerline of the road segment.

19. The non-transitory machine readable medium of claim 12, wherein the set of road segments comprises first, second, and third road segments.

20. The non-transitory machine readable medium of claim 19, wherein each pair of subsequent road segments in the junction forms a corner.

21. The non-transitory machine readable medium of claim 20, wherein for the corner formed by the first and second road segments, the two geometries are smoothed in order to remove an unrealistic discontinuity between the first and second road segments.

22. The non-transitory machine readable medium of claim 12, wherein the first smoothing operation tapers a side of a first road segment to line up with a side of a second road segment.

23. The non-transitory machine readable medium of claim 12, wherein the second smoothing operation projects a side of a first road segment to meet a side of a second road segment.

24. The non-transitory machine readable medium of claim 12, wherein the third smoothing operation clips a side of a first road segment to avoid overshooting a side of a second road segment.

25. A mapping service system for generating map tiles, the system comprising:
- a set of processing units; and
- a set of machine-readable media storing:
    - a road graph generation module which when executed by at least one of the processing units aggregates road segments and junctions into roads;
    - a road smoothing module which when executed by at least one of the processing units identifies angled bends in aggregated roads and modifies vertices of the roads in order to smooth the angled bends;
    - a geometry growing module which when executed by at least one of the processing units generates initial geometries for road segments in a road graph; and
    - a geometry smoothing module which when executed by at least one of the processing units smooths corners between pairs of geometries that intersect each other based on angles formed at the corners in order to generate more realistic road geometries, wherein the geometry smoothing module smooths a particular corner by performing (i) a first smoothing operation when a particular angle of the particular corner is greater than a first threshold angle, (ii) a second smoothing operation when the particular angle is greater than a second threshold angle and less than the first threshold angle, and (iii) a third smoothing operation when the particular angle is greater than a third threshold angle and less than a fourth threshold angle.

26. The system of claim 25, wherein the geometry growing module defines vertices for the road segment geometries.

27. The system of claim 26, wherein the geometry smoothing module modifies the road segment geometry vertices defined by the geometry growing module.

* * * * *